United States Patent Office 3,524,862
Patented Aug. 18, 1970

---

3,524,862
(ISOXAZOLYL)(AMINO)-METHYL-
TETRAHYDROANTHRACENES
Lloyd H. Conover, Quaker Hill, Conn., assignor to Chas.
Pfizer & Co., Inc., New York, N.Y., a corporation of
Delaware
No Drawing. Application July 27, 1967, Ser. No. 568,133,
now Patent No. 3,409,616, dated Nov. 5, 1968, which
is a continuation-in-part of application Ser. No. 277,081,
May 1, 1963. Divided and this application Oct. 30,
1967, Ser. No. 679,256
Int. Cl. C07d 85/22
U.S. Cl. 260—307.5                9 Claims

ABSTRACT OF THE DISCLOSURE

The total synthesis of 5a,6-anhydrotetracycline-type antibiotics by a multi-step process comprising: (1) the aldol condensation of a 3,4,10-trioxo-1,2,3,4,4a,9,9a,10-octahydroanthracene with (a) an ester of glyoxalic acid, or (b) a 3- and/or 4-substituted 5-formylisoxazole to produce the corresponding 2-carboxymethylidene-(I–A) or 2-[5'-(3'- and/or 4'-substituted) (isoxazolyl)methylidene] - 3,4,10 - trioxo - 1,2,3,4,4a,9,9a,10 - octahydroanthracene (II–A) aldol condensation products; (2) Michael reaction of the aldol condensation products with an amine to give the corresponding 3,4,10-trioxo-1,2,3,4,-4a,9,9a,10-octahydroanthracenes bearing an $\alpha$-aminoacetic acid ester (I–B) or an isoxazolyl substituted aminomethyl group (II–B) at the 2-position; (3) selective reduction of the trioxo Michael reaction products to the corresponding 3-hydroxy compounds and thence to the 4,10-dioxo compounds, (4) aromatization of the 4,10-dioxooctahydroanthracenes at the 9,9a- and 10,4a-positions by bromination and dehydrobromination to the corresponding 4,10-dioxo-1,2,3,4-tetrahydroanthracenes; (5) the 4,10-dioxo-1,2,3,4-tetrahydroanthracene-2-($\alpha$-amino)acetic acids are converted to mixed anhydrides and then to acyl malonates; (6) the isoxazole ring of the 2-[5'-(isoxazolyl)(amino) methyl] - 4,10 - dioxo - 1,2,3,4 - tetrahydroanthracenes is cleaved to provide the corresponding acyl malononitriles, 4,10 - dioxo - 1,2,3,4 - tetrahydroanthracene 2[$\alpha$-(amino) acetonyl]$\alpha$-nitriles; (7) the acyl malonates and acyl malononitriles are cyclized to 12a - deoxytetracyclines which are then hydroxylated to 5a,6-anhydrotetracyclines.

The 3,4,10 - trioxo - 1,2,3,4,4a,9,9a,10 - octahydroanthracenes are prepared from benzoyl halides by (a) Friedel-Crafts reaction of a benzoyl halide with a pyrocatechol ether, e.g., a di-(lower)alkyl ether, to produce a 3,4-di-(lower)alkoxybenzophenone; (b) conversion of the benzophenone by partial or complete reduction of the carbonyl group by chemical or catalytic methods to a 3,4-di-(lower)alkoxydiphenylmethanol or 3,4-di-(lower) alkoxydiphenylmethane; or to a 3,4-di-(lower)alkoxydiphenylalkane via a Grignard reaction and reduction of the thus-produced alkanol; (c) oxidation of the 3,4-di-(lower) alkoxydiphenylalkane, or the corresponding dihydroxy compound, to a dienedioic acid ester or dienedioic acid; (d) hydrogenation of the dienedioic acid compound to a benzyl adipic acid derivative; (e) cyclization of said compound to a 2-(2-carbalkoxyethyl)-4-tetralone by means of dehydrating or dehydrohalogenating agents; (f) cyclization of the 4-tetralone derivatives by condensation with a dialkyloxalate to give a 2-carbalkoxy 3,4,10-trioxo-octahydroanthracene; and (g) removal of the 2-substituent by decarboxylation. The intermediates and final products are useful as bactericides and/or chelating agents.

CROSS-REFERENCE TO RELATED APPLICATIONS

This application is a divisional of my copending application Ser. No. 568,133, filed July 27, 1966, now U.S. Pat. 3,409,616 which is, in turn, a continuation-in-part of application Ser. No. 277,081, filed May 1, 1963, now abandoned.

BACKGROUND OF THE INVENTION

This invention relates to a process of preparation of antibacterial agents. More particularly, it is concerned with the discovery of new and novel synthetic routes for the preparation of known as well as new 5a,6-anhydrotetracycline products. It is also concerned with the new and useful 5a,6-anhydrotetracycline products obtained thereby, as well as with the new intermediates of the process.

The 5a,6-anhydrotetracycline antibiotics comprise a group of biologically active hydronaphthacene derivatives having the following essential structural features. The numbering system indicated is that employed by "Chemical Abstracts."

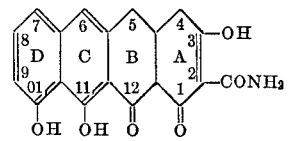

SUMMARY OF THE INVENTION

The present new processes utilize 3,4,10-trioxo-2,3,4-4a,9,9a,10-octahydroanthracenes (Formula I) as starting materials to produce both known and new 5a,6-anhydrotetracyclines having the formulae

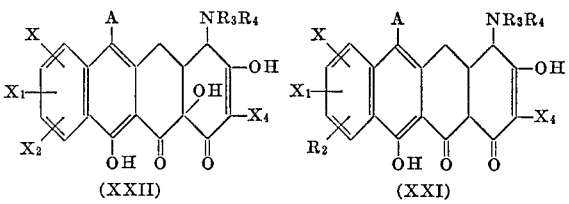

wherein the various terms are as defined below, by the reaction sequence illustrated in Flow Sheets I and II. It will be appreciated by those skilled in the art that several alternative routes exist for the conversion of compounds of Formula I to the final products of Formula XXI and XXII. The particular route adopted for the preparation of a given 5a,6-anhydrotetracycline is largely dependent upon economic factors, such as, availability of materials, and yields of reaction products throughout the sequence.

Further, the conditions for any reaction in the sequence can, unless otherwise indicated, be varied within the skill of the art. The actual conditions employed are determined by the above listed factors as well as by type and availability of equipment.

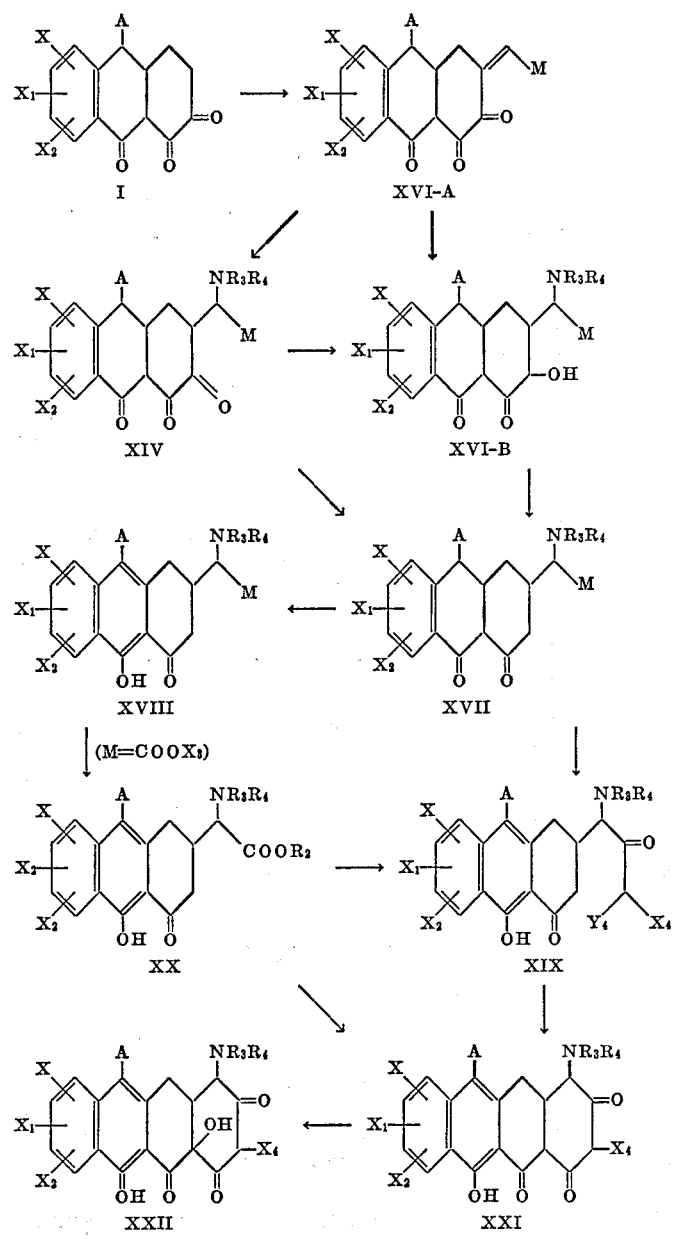
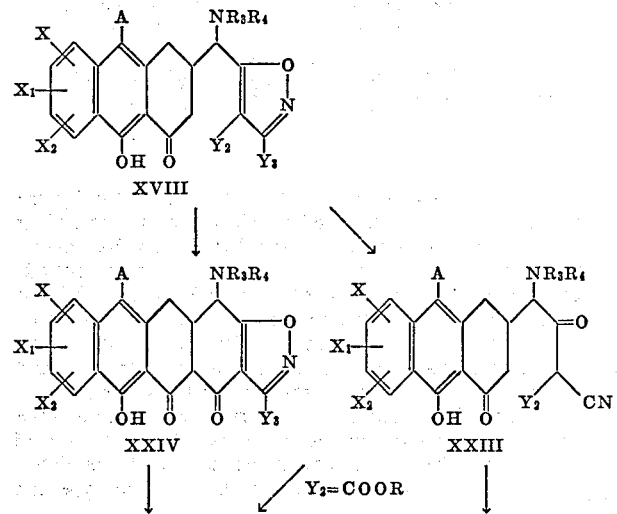
FLOW SHEET I

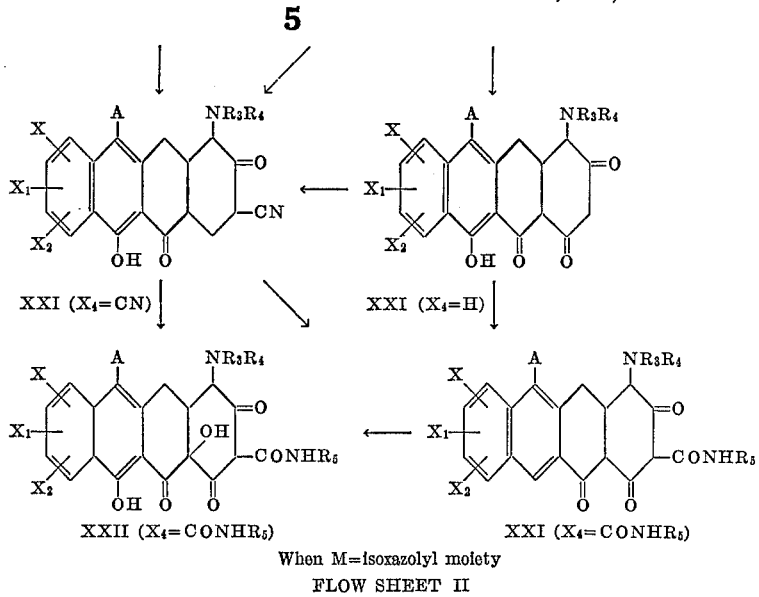

When M=isoxazolyl moiety
FLOW SHEET II

In the compounds of this sequence, X is selected from the group consisting of hydrogen, hydroxy, trifluoromethyl, amino, mono- and di-lower alkylamino, alkanoylamino containing 2 to 4 carbon atoms, lower alkyl, alkanoyloxy containing 2 to 4 carbon atoms; and OR wherein R is selected from the group consisting of lower alkyl and benzyl;

$X_1$ is selected from the group consisting of hydrogen, chloro, lower alkyl and trifluoromethyl;

$X_2$ is selected from the group consisting of hydrogen, hydroxy, and OR in which R is as previously defined;

A is selected from the group consisting of hydrogen, lower alkyl, and $B_2OCH(B_3)$— wherein $B_2$ is lower alkyl and $B_3$ is selected from the group consisting of hydrogen and lower alkyl;

$R_2$ is selected from the group consisting of $X_3$ and $CO_2X_6$ (mixed anhydride in which $X_6$ is lower alkyl;

$X_3$ is selected from the group consisting of hydrogen, lower alkyl and benzyl;

$R_3$ and $R_4$ when taken together with the nitrogen atom to which they are attached form a nitrogen heterocyclic ring selected from the group consisting of piperazino, piperidino, morpholino, pyrrolo, pyrrolidino, 2-(lower carbalkoxy)pyrrolidino, and thiomorpholino.

$R_3$ and $R_4$ when taken separately are each selected from the group consisting of hydrogen, alkanoyl containing 1 to 4 carbon atoms, and $CH_2B_1$ wherein $B_1$ is selected from the group consisting of hydrogen, lower alkyl, and mono-substituted lower alkyl, said substituent being selected from the group consisting of hydroxy and lower alkoxy;

Provided that only one of said $R_3$ and $R_4$ substituents is selected from the group consisting of alkanoyl containing 1 to 4 carbon atoms;

$X_4$ is selected from the group consisting of cyano and $$\overset{O}{\underset{}{\text{C}}}-NHR_5$$

in which $R_5$ is selected from the group consisting of hydrogen and lower alkyl;

M is selected from the group consisting of —$COOR_2$ and

$Y_2$ is selected from the group consisting of cyano, carbobenzoxy, lower carbalkoxy, $CONH_2$, $CONH(CH_3)$ and $CONH(C_2H_5)$;

$Y_3$ is selected from the group consisting of cyano, lower carbalkoxy, carbobenzoxy, carboxy, $CONH_2$, $CONH(CH_3)$, $CONH(C_2H_5)$ and $CON(CH_3)_2$;

$Y_4$ is selected from the group consisting of cyano and lower carbalkoxy.

It should be noted that although the X, $X_1$ and $X_2$ terms in the benzenoid moiety of the above generic structures appear in the same sequence, they need not be present in this sequence in actual practice. This representation is for convenience only and is not to be taken to indicate, for example, that $X_2$ always represents the 5-substituent, or that $X_1$ represents the 6- or the 7-substituent. They can occur in any sequence in the benzenoid moiety.

It should be noted that the various substituents in the final tetracyclines of Formulae XXI and XXII or in the intermediates for their production may be replaced by other groups according to procedures described hereinafter. Thus, X, $X_1$ and $X_2$ may be transformed to hydroxy, hydroxyalkyl, nitro, cyano, carbalkoxy, alkyl sulfonyl, halo sulfonyl, alkyl sulfinyl, and sulfamyl. The A substituent may be transformed to amino, mono- or di-lower alkylamino and —$CH(B_3)OH$ wherein $B_3$ is selected from the group consisting of hfdrogen and alkyl, by appropriate reactions as is discussed below.

A wide variety of 4-aminotetracyclines are, of course, prepared according to the present processes by substituting various primary or secondary alkyl, aralkyl or aryl amines for dimethylamine. Suitable amines include other dialkylamines, e.g. methyl, ethyl, propyl, etc. amines; aralkyl and alkaryl amines, and N-alkyl derivatives thereof, e.g. N-methylaniline, benzylamine, heterocyclic amines, e.g. pyrrolindine, morpholine, aminopyridines and N-alkyl derivatives thereof; arylamines, e.g. aniline and substituted derivatives thereof wherein the substitutent is hydroxy, carbalkoxy, nitro and amino; and ammonia. Further, hydroxyalkyl substituents on the nitrogen, where protected for some of the reaction steps by ether formation or acylation, as discussed below, may subsequently be regenerated, e.g. by HBr cleavage or hydrolysis.

Of the present new compounds of particular value are those containing the following benzenoid moiety:

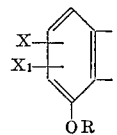

in which X, $X_1$ and OR are as described above since these compounds are suitable for the preparation of known tetracycline compounds, i.e., where OR is OH and, in addition, new and useful tetracycline compounds not previously described.

DETAILED DESCRIPTION OF THE INVENTION

From I to XVI-A is an aldol condensation (followed by dehydration) with a 5-formyl isoxazole or a glyoxalic acid derivative, generally a lower carbalkoxy derivative thereof. The reaction is catalyzed by acids or bases, e.g. preferably by metal alkoxides. It is advantageously conducted in an inert atmosphere, e.g. nitrogen, at a temperature of from about 80°–120° C. for from ¼ to about 24 hours using from about ⅛ to 2.0 moles of metal ion/mole of triketone. The acid catalyzed condensation is conveniently carried out in glacial acetic acid as solvent. Non-hydroxylic solvents such as benzene, xylene, toluene, dioxane, dimethoxyethane, diethyleneglycoldimethylether and dimethylformamide are useful solvents for the metal catalyzed condensation, especially when using metal alkoxides. Magnesium methoxide and aluminum t-butoxide are especially useful in this condensation. When active hydrogen in addition to that of the β-diketone system is present in the reactant, one extra equivalent of alkoxide is used per active hydrogen. The α-hydroxy ester, wherein the elements of water are added to the unsaturated ester, may also be obtained in small yield. Its production is favored by short reaction periods and low temperatures. Dehydrating agents, such as phosphorous oxychloride in pyridine at 0° C. and p-toluenesulfonic acid in benzene permit dehydration and regeneration of the unsaturation.

The conversion of XVI-A to XVI is a Michael reaction with an amine $HNR_3R_4$. The reaction is conducted at a temperature of from about −70° C. to about 10° C. preferably in the lower temperature range, e.g. below −50°. An excess of the amine is employed; a sufficiently large excess frequently being used to serve both as solvent and as reactant. A variety of other solvents can be used and are actually necessary when the amine is a solid at the temperature of the reaction. Such solvents include tetrahydrofuran, ethylene glycol ethers, diethyleneglycol ethers and chloroform. The only criteria essential for the solvent are adequate solubility for the reactants, inertness and a sufficiently low freezing point.

The reaction is run for periods of from 15 minutes to 24 hours depending upon the reactants and temperature employed. Oxygen should be excluded during the period when the product is in contact with the excess amine. The order of addition of the reactants appears in general, to be immaterial to the outcome of the reaction.

When M is —$COOX_3$, the ester group in some instances is transformed to the amide corresponding to the amine reactant. Primary lower alkylamines may also enter into further reaction involving the 3-keto group. This appears to be a transient or intermediate step in the reaction and, as long as the amine addition product is retained in solution, can be directly reduced to the 3-hydroxy amino acid ester (XVI-B). Isolation of the amine addition product, however, produces what is believed to be a fused lactam possibly via formation of a hydroxy amine at the 3-position followed by elimination of alcohol between the ester and amine groups.

The products wherein M is an isoxazolyl moiety are unstable unless kept cold; that is, below 0° C., and desirably at or below −15° C. In spite of their thermal instability they can, if desired, be isolated by working up the reaction mixtures at low temperatures, e.g. in a cold box. The products must, of course, be stored at a low temperature. However, they need not be isolated for utilization in the hereindescribed reaction sequences.

The Michael addition reaction with an amine $HNR_3R_4$ as applied in the above steps wherein the $Y_2$ and/or $Y_3$ substituents of the isoxazolyl moiety of compounds of Formula XVI-A or of the isoxazolyl-5-aldehyde reactant in the step I–XVI are lower carbalkoxy concomitantly effects, to some extent at least, conversion of the lower carbalkoxy group(s) to an amide $CONR_3R_4$. While conversion of the lower carbalkoxy group(s) to amide appears to be the predominating reaction, except where $R_3$ and $R_4$ are both alkyl, the presence of unchanged lower carbalkoxy groups is detectable by such means as infrared spectroscopy. When $Y_2$ is hydrogen, substantial conversion of $Y_3$ (lower carbalkoxy) to an amide occurs even when $R_3$ and $R_4$ are both alkyl.

Retention of the lower carbalkoxy group(s), $Y_2$ and/or $Y_3$, of compounds of Formula XVI-A is realized by conducting the amine addition reaction with the sodium salt of Formula XVI-A compounds as described hereinafter. In one embodiment of this procedure the unsaturated tricyclic triketones (Formula XVI-A) are treated with one equivalent of sodium hydride in an inert solvent, the sodium salt isolated by removal of the solvent and subsequently reacted with the desired amine. In this manner, compounds of Formula XVI-B wherein $Y_2$ and/or $Y_3$ are lower carbalkoxy are obtained.

The lower carbalkoxy groups, $Y_2$ and $Y_3$, of compounds of Formula XVI-A are partially converted to amide groups ($CONR_3R_4$) by treatment of the isoxazolyl esters or a metal chelate thereof, e.g., aluminum chelates, with the desired amine at low temperatures. The thermal instability of the amine addition products of Formula XVI permits their facile conversion to the isoxazolyl amides of Formula XVI-A by removal of the —$NR_3R_4$ groups via heating in vacuo.

The thus produced isoxazolyl amides of Formula XVI-A ($Y_2$ and/or $Y_3$=$CONR_3R_4$) are then subjected to the Michael addition reaction with the same or a different amine to give products of Formulas XVI and XVI-B.

The addition of secondary amines may be facilitated by first converting the ester functions ($Y_2$, $Y_3$) to amides with primary amines. It appears that in the conversion of the unsaturated tricyclic triketone isoxazolyl amides (XVI-A) to the amine addition products (XVI) the equilibrium is shifted in favor of the amine addition product by the presence of amide functions, possibly because of the low solubility of the products in the reaction medium.

The ester groups of structures XVI, XVI-A, XVI-B and other structures in the sequences of Flow Sheets I and II can, if desired, the hydrolyzed under acid conditions to the free carboxy acids and then, if desired, neutralized with an appropriate alkali metal or alkaline earth metal salt, e.g. a hydroxide, to the corresponding alkali or alkali metal salt.

From XVI to XVI-B is a selective reduction with a suitable chemical reducing agent, such as metal hydrides, especially sodium borohydride. The reaction is carried out by dissolving the Mannich base in a suitable reaction-inert solvent such as 1,2-dimethoxyethane, ethyleneglycol ethers, diethyleneglycol ethers and liquid amines. When hydroxylic solvents are employed, e.g. alcohols, an additional excess of sodium borohydride is used. Reaction periods of from about 10 minutes to about 24 hours are required. Of course, when active hydrogen is present in the reactants in addition to the β-diketone system, one additional equivalent of sodium borohydride is required per active hydrogen.

The reduction is advantageously conducted by adding the sodium borohydride all at once to a vigorously stirred solution of the Mannich base (XVI) in one of the aforementioned solvents at −70° C. followed by gradual increase in the temperature to 0° C. In this process, as above, 0.25 to 6.0 moles of reducing agent per mole of Mannich base is used. As much as 20 moles of reducing agent may be used. A ratio of 4–6 is, however, preferred when M is isoxazolyl. When M is —$COOX_3$, a 1–1 ratio is preferred (except in cases where active hydrogen is present). In the case of liquid amine solvents, the reduction is most conveniently conducted by addition of the sodium borohydride to the reaction mixture obtained in the conversion of XVI-A-XVI.

From XVI-A to XVI-B is a selective reduction with a suitable chemical reducing agent, such as sodium borohydride, of the Mannich reaction product XVI. It is represented as a one step conversion since the Michael reaction product need not be separated prior to reduction. Simultaneous formation of the corresponding lactone also occurs.

In the case of compounds of structure XVI-B wherein M is —COOX$_3$, the corresponding lactone, of course, serves as a suitable reactant for the production of XVI-B by cleavage of the lactone ring under mild conditions; e.g. zinc chloride.

XVI-B→XVII.—Conversion to the diketone compound is accomplished by reaction with acetoformic anhydride according to known procedures followed by removal of the 3-formyloxy group generally by treatment with finely divided zinc metal in an organic acid (e.g. formic acid) or with zinc dust in an organic acid in the presence of a metal which forms a chelate with the substrate (zinc chloride in acetic acid). A diluent such as methanol may be employed. Alternatively, zinc chloride in acetic acid, catalytic hydrogenation (5% Pd=C) in tetrahydrofuran or formic acid at elevated pressures is used. Care must be taken to avoid over-reduction, that is, reduction of the 4,10-keto group. For this reason mild conditions are required. When using zinc dust-formic acid, for example, reaction is effected at room temperature with contact times of brief duration.

In an alternative and preferred method when M is —COOX$_3$, the diketo compound XVII is obtained from the hydrochloride of XVI-B via the lactone by treatment with from about 0.5 to about 2 equivalents of p-toluenesulfonic acid in a suitable reaction-inert solvent (benzene, toluene, xylene) for periods of from about 5 hours to about 2 days. A temperature of from about 80°–140° C. is satisfactory. The lactone hydrochloride of XVI-B is then treated with zinc dust-formic acid for a brief period to give XVII wherein X$_3$ is hydrogen. A ratio of from 1 to 20 equivalent of zinc dust is effective in cleaving the lactone to the free acid; 6–7 equivalents are preferred. Formic acid is the solvent of choice. However, mixtures of formic acid-methanol-water or of acetic acid-methanol-water, in approximately 1–1–1 ratio, can also be used. A temperature of about 25° C. is generally used, although this is not a critical level. To avoid reduction of the 4,10-diketo system, it is important that mild reaction conditions and brief contact times be employed. Contact times of from about 30 seconds to several hours depending upon the reactants, are operative. In general, however, periods of from 45 seconds to 120 seconds are favored.

XVI→XVII.—Reduction of the 3-oxo function of the starting compound which may be carried out by standard methods, e.g. catalytic hydrogenation at low temperatures in ethyl acetate (e.g. —70° C.) over palladium to produce the corresponding alcohol which is, as the free alcohol or ester, e.g. acetate, susceptible to further reduction at low temperatures by either catalytic or chemical means, e.g. zinc in acetic or formic acid.

The 8-chloro atom of the diketo octahydroanthracene amino acid (XVII, M=COOH), corresponding to the 7-chloro atom of the final tetracycline products can, if desired, be readily removed by catalytic hydrogenolysis. Pd-C or Pt-C containing 5–10% of the metal are most effective for this purpose. Pd-C (10%) is preferred. From about 0.1 to 1 weight equivalent is used. Dimethylformamide, tetrahydrofuran, water, ethanol and ethylacetate, preferably ethanol, serve as solvents, Pressures of from about 1 atmosphere to high pressures, e.g. 70 atmospheres or higher, and temperatures of from —20° C. to 60° C. or higher can be used. The preferred conditions are atmospheric pressure and room temperature for periods of about 3 hours. A base is required to take up the hydrogen chloride produced. While a variety of bases, both organic and inorganic by nature, can be used, it is preferred to use triethylamine, generally about 4 equivalents.

XVII→XVIII.—Aromatization of the potential C ring is accomplished by known methods such as angular bromination followed by dehydrobromination. The bromination reaction is conducted by adding a solution of bromine-glacial acetic acid to a solution of the diketo compound in glacial acetic acid at a temperature of from about 0° to about 5° C. in the presence of a sufficient quantity of a base, preferably sodium acetate, to neutralize the hydrogen bromide produced. The bromo ketone compound thus produced is treated with a base, preferably an organic base, such as collidine, pyridine, triethanolamine and pyrazine. Inorganic bases such as sodium hydride in dimethylformamide can also be used. The solution is heated to reflux for 10 to 15 minutes, cooled and the product, a highly fluorescent substance, recovered according to known procedures. Sensitive groups such as primary amino groups and hydroxy groups must be suitably protected in order to avoid side reactions and obtain optimum yields.

It should be noted that aromatization of the potential C ring can be effected at any step in the reaction sequence of FIG. 1 beyond that represented by Formula XVII as will be recognized by those skilled in the art. While introduction of the potential double bond in XVII is favored it can, if desired for any reason, be postponed until a later step in the overall reaction sequence, for example, one of the tetracyclic structures, is reached. Aromatization of a 12a-deoxytetracycline structure by the bromination-dehydrobromoination sequence is generally not favored since bromination may occur at the 12a-position. For this reason, if aromatization is postponed, it is advantageously conducted by this procedure on a tetracycline structure bearing a 12a-hydroxyl group. In most instances, however, early introduction of the double bond is favored, indeed preferred, since it involves the use of reactants which, by virtue of their early appearance in the total synthesis sequence, represent more readily available and hence, more economical reactants than do the later produced intermediates.

Alternatively, compounds of Formula XVIII are prepared from the appropriate 2-carboxy-4-oxo-1,2,3,4-tetrahydroanthracene compound, such as 2-carboxy-4-oxo-5,10-dimethoxy-8-chloro - 9 - methyl-1,2,3,4-tetrahydroanthracene, prepared according to the procedure of Muxfeldt, Ber. 92, 3122–50 (1959). The 2-carboxy acid thus produced is converted to the desired 4-oxo-1,2,3,4-tetrahydro-2-anthraldehyde via the acid chloride and subsequent Rosenmund reduction (hydrogenation with a poisoned palladium catalyst). In still another modification the reduction of the acid chloride is accomplished with lithium-tri-t-butoxyaluminohydride (prepared as described in the J. Am. Chem. Soc. 78, 252, (1956).

The 4-oxo-1,2,3,4-tetrahydro-2-anthraldehydes thus obtained are then converted to the compounds of Formula XVIII (M=—COOX$_3$) by the Ugi reaction, i.e. reaction with an isonitrile in the presence of an amine and an acid as described by Ugi, et al., Angew. Chem. 72, 267 (1960). The α-amino acid amide (XX-A), amidine or α-N-acyl amino acid amide thus produced is hydrolyzed to the α-amino acid by known methods.

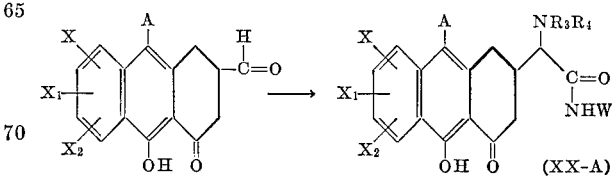

wherein W is selected from the group consisting of lower alkyl, cyclohexyl, phenyl, benzyl, substituted phenyl and substituted benzyl wherein the substituent is selected from the group consisting of lower alkyl, lower alkoxy, and chloro.

The formation of XIX from XVIII (M=$COX_3$, $X_3$=OH) is accomplished by formation of a mixed anhydride XX ($R_2$=$CO_2X_6$) with a haloalkyl carbonate as described in the J. Am. Chem. Soc. 75, 636–9 (1953) and the J. Org. Chem. 22, 248 (1957). Acylation of a malonic acid ester derivative, e.g. malonic diester, cyanoacetic ester, malonic ester half amide, including N-alkylated amides and especially the magnesium salt of ethyl t-butyl-malonamate, etc. with the mixed anhydride produces the malonate. Reaction is conducted in a suitable solvent system such as chloroform, toluene, benzene, diethylether, alkyl cyanides, dimethylformamide, nitromethane, dioxane, glycol at from about −5° to about 35° C. for periods ranging from 25 minutes to up to 3 days. When $X_3$ is (CO)$OR_1$ the malonic acid derivative is employed as a magnesium enolate according to the procedure of Tarbell and Price (J. Org. Chem., Loc. cit. $R_1$=lower alkyl, benzyl).

The conversion of XIX to XXI is accomplished by standard base-catalyzed acylation using, for example, sodium alkoxides, sodamide or preferably sodium hydride. A ratio of at least 4 equivalents of base and desirably a great excess of up to 10 equivalents is employed. A variety of reaction-inert solvents can be used, e.g. benzene, xylene, toluene, anisole, dimethylformamide. Dimethylformamide containing a small amount of methanol is the preferred solvent. Reaction is conducted under nitrogen at a temperature of from about 80° to about 150° C. preferably 120° C., for periods of from about 3 minutes to up to 24 hours depending upon the reactants. A period of 5–7 minutes is adequate, indeed preferred, in most instances. When $Y_4$=CN, the 12-imido group which results is hydrolyzed with aqueous acid to the 12-keto group. Of course, when $Y_4$ is lower carbalkoxy and $X_4$ is CN, the 2-cyano tetracycline (XXI) is obtained.

XVIII→XXIV.—Ring closure of compounds in which $Y_2$ is carbalkoxy or nitrile is conducted in the presence of a base, for example, sodium hydride at a temperature of from about −10° C. to about 10° C. in a reaction insert solvent, e.g., acetonitrile, dioxane, benzene, toluene, ethers of ethylene and diethylene glycol for periods of from about 5 minutes to 24 hours. However, somewhat more vigorous conditions may be necessary to form the requisite dianion of the hydroxyketone system. This may be generally recognized by a color change to a deep reddish color. When using sodium hydride and dimethylformamide, this change occurs, for the most part, upon heating to approximately 80° C. Prolonged reaction times of several days at room temperature also effect the reaction. Alternatively, the 10-methyl ether derivative of XVIII, prepared by the action of diazomethane in methanol on XVIII, can be used as reactant.

Where $Y_2$ is a carboxamide function, a modified ring closure reaction sequence is utilized. Compounds of Formula XVIII are treated with 2–3 moles of a trialkyloxonium salt, such as trimethyl-oxonium fluoborate or trialkyl-oxonium fluoborate (for other such salts see Meerwein, et al. Ber. 89, 2060–2079 (1956)) in a solvent (chloroform, methylene chloride, tetrachloroethane) at about 40°–70° C. for from about 6 to 48 hours under dry nitrogen. (The reaction temperature is, of course, conditioned by the boiling point of the solvent used.) Following this, 3–6 equivalents of sodium hydride is added and the mixture refluxed for from about 5 minutes to one hour after which an additional 2–3 equivalents of sodium hydride followed by 1–3 equivalents of methanol is added. The vigorous exothermic reaction, the cyclization stage, which usually occurs is complete in from 5 to 15 minutes. The crude reaction products appear to be enol ethers which are readily hydrolyzed by gentle warming with dilute acid to the fused isoxazoles of Formula XXIV.

XXIV→XXI and XVIII→XXIII.—Methods for cleavage of the isoxazole ring vary depending upon the nature of the $Y_3$ substituent. When $Y_3$ is carbalkoxy standard alkaline hydrolysis using alkali or alkaline earth metal hydroxides, or acid hydrolysis using mineral acids is employed. Temperatures of from 30° to 100° C. for periods of about 0.5 hour to 12 hours are operative when using 0.5% to 5% of alkaline or acid hydrolyzing agent.

In the case of alkaline hydrolysis cleavage of the isoxazole ring follows conversion ot the carboxylate anion. In the case of acid hydrolysis it is usually necessary to convert the acid to an alkali or alkaline earth metal salt and warm to 50°–80° C. to effect decarboxylation and cleavage. Treatment with aqueous ammonia in the presence of copper powder also cleaves an ester or acid isoxazole derivative.

When $Y_3$ is carboxamido or mono-substituted carboxamido treatment with at least 2 equivalents of sodium hydride or other strong base, e.g. sodium or lithium amide, at 80°–110° C. in a reaction-inert solvent, dimethyl sulfoxide, dimethylformamide, ethylene- and diethylene-glycol ethers, for from 5 minutes to one hour is used.

XXIII→XXI.—Represents ring closure by base catalyzed acylation using, for example, sodamide, sodium triphenyl methyl, potassium or lithium amide alkali metal alkoxides or preferably sodium hydride. This is essentially a reaction of the type described by Hauser and Harris, J. Am. Chem. Soc. 80, 6360 (1958) who described acylation reactions of dianions derived from β-diketones.

A ratio of at least 4 equivalents of base and desirably a great excess of up to 10 equivalents is employed. A variety of reaction-inert solvents can be used, e.g. benzene, xylene, toluene, anisole, dimethylformamide and, in the case of alkali amides, liquid ammonia. Dimethylformamide containing a small amount of methanol is the preferred solvent. Reaction is conducted under nitrogen at temperature of from about 80° to about 150° C. preferably 120° C. for periods of from about 3 minutes to up to 24 hours depending upon the reactants. A period of 5–7 minutes is adequate, indeed preferred, in most instances. When $Y_2$=CN, the 12-imido group which results is hydrolyzed with aqueous acid to the 12-keto group.

Compounds of structure XXIV according to accepted chemical nomenclature are naphthaceno (3, 2–D) isoxazole derivatives with the following nucleus:

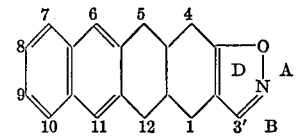

For convenience, these compounds are designated herein as 2,3,5a,6-anhydrotetracyline-4′,5′-isoxazole derivatives with the 1,2 and 3-isoxazole positions designated as 1′, 2′ and 3′. This permits the use of the tetracyline numbering of the ring positions. For example, 1,11,12-trioxo-10-hydroxy-4-dimethylamino - 4,4a,5,12,12a - tetrahydronaphthaceno (3, 2–D) isoxazole-3′-carboxylic acid ethyl ester is conveniently designated as ethyl 6,12a-dideoxy-6-demethyl - 2,3,5a,6-anhydrotetracyline-4′,5′-isoxazole-3′-carboxylate.

XXI, XXII $X_4$=CN→$CONHR_5$.—Conversion of the 2-cyano group to a carboxamido group by the method described in copending application, U.S. Pat. 3,029,284, filed Sept. 14, 1960 wherein is described the conversion of tetracycline nitriles to the corresponding N-alkylated carboxamide (e.g. t-butyl, isopropyl) by the Ritter Reaction followed by dealkylation of the resulting N-alkylated carboxamide with concentrated mineral acid and water. An alternate method of converting the nitrile to the amide is by hydration with mineral acid such as sulfuric or 48% hydrobromic acid preferably at elevated temperatures, e.g., between 50 and 100° C., for from 5-30 minutes or with excess polyphosphoric acid at room temperature for prolonged reaction periods such as 12 to 24 hours.

The compounds of structure XXII and XXI in which $X_4$ is a carboxamide group are biologically active products, the latter being 12a-deoxyanhydrotetracyclines which are converted to 5a,6-anhydrotetracycline compounds XXII by introduction of a 12a-hydroxy group by known procedures such as described in the J. Am. Chem. Soc., 81 4748 (1959) or Angew. Chem. International edition 1, 157 (1962).

A preferred method of 12a-hydroxylation is the method described in U.S. Pat. 3,188,348, issued June 8, 1965 wherein is described the hydroxylation of certain metal chelates of the 12a-deoxytetracyclines. The advantage of this latter process lies in the fact that the hydroxy group is introduced cis- to hydrogen at position 4a.

The 5a,6-anhydrotetracyclines (XXI, XXII) are converted to dehydrotetracyclines by the photooxidation procedure described by Scott and Bedford in the J. Am. Chem. Soc. 84, 2271-2 (1962). In accordance with this procedure the anhydrotetracyline is oxidized to the corresponding 6-deoxy-6-hydroperoxy dehydrotetracycline by contacting a solution of the starting compound in a reaction-inert solvent with oxygen or air while irradiating light of about 300-450 mμ wavelength; and subsequently reducing the hydroperoxy compound to the desired hydrotetracycline, for example, by treatment with an aqueous solution of an alkali metal sulfite or hydrosulfite, or by hydrogenation in the presence of a noble metal catalyst such as palladium or rhodium. In the case of catalytic hydrogenation, continued reaction may lead to further reduction of the dehydrotetracycline product, i.e. to the corresponding tetracycline, as well as to removal of a 7-halo substituted where present, particularly when palladium is employed as catalyst. Thus, where it is desired to remove the thus produced 5,5a-dehydrotetracycline, the reaction should be halted when the calculated proportion of hydrogen has been consumed. The dehydrotetracyclines are then converted to tetracylines by catalytic reduction over noble metal catalysts or microbiologically. This latter process comprises adding the dehydrotetracycline to a fermentation medium inoculated with conventional chlorotetracycline or tetracycline synthesizing strain of Streptomyces aureofaciens such as the publicly available S. auerofaciens N.R.R.L. 2209 (from National Regional Research Laboratory at Peoria, Illinois) under aerobic conditions.

The conditions of the fermentation may be the same as the known methods for producing chlortetracycline and tetracycline by fermentation, except for the addition of one of the new dehydrotetracyclines at the beginning of or during the fermentation.

Alternatively, the conversion of the 5,5a-dehydrotetracyclines of the present invention to the corresponding tetracyclines may be effected by catalytic hydrogenation. The hydrogenation reaction is carried out under conventional conditions. The dehydrotetracycline is dissolved in a reaction-inert solvent and then subjected to treatment with hydrogen gas over a noble metal catalyst, including palladium, platinum, rhodium, and the like. Suitable solvents include dimethyl formamide, dioxane, tetrahydrofuran, the dimethyl ethers of ethylene glycol and diethylene glycol and the like. If desired, the catalyst may be one which is suspended in an inert carrier, such as palladium on carbon. The hydrogenation may be carried out at atmospheric or superatmosphere pressures of hydrogen gas, i.e. up to several thousand pounds per square inch. It is generally preferred, however, to employ pressures of from about 2 to about 4 atmospheres, since there are found most convenient. The reaction temperature does not appear to be critical. Excellent results are obtained with temperatures up to about 50° C. The use of higher temperatures, though operable, is not recommended, since lower yields of the desired product may result.

After the reaction is complete, as indicated by the absorption of one mole of hydrogen, the product is obtained in the usual manner, e.g. filtration of the catalyst and concentration of the reaction mixtures. The products may be further purified by countercurrent distribution in butanol-0.01 N aqueous HCl. In the case of those dehydrotetracyclines containing a 7- or 9-halo group, hydrogenolysis of the latter may concurrently occur, in which case the hydrogen uptake will be correspondingly greater. The latter reaction is facilitated by the presence of a base, e.g. triethylamine. However, under mild conditions, and particularly where rhodium on carbon is employed as catalyst, it is possible to hydrogenate at the 5,5a-position without concurrent removal of halo substituents in the D ring.

The requisite isoxazole-5-aldehydes having the formula

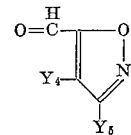

wherein $Y_4$ is selected from the group consisting of hydrogen, cyano, $CONH_2$, carboxy, carbobenzoxy and lower carbalkoxy; and $Y_5$ is selected from the group consisting of cyano, carboxy, $CONH_2$, carbobenzoxy and lower carbalkoxy, can be prepared by any one of several methods. For example, ozonolysis of the corresponding 5-styryl isoxazole obtained by the known procedure (J.C.S. 3663, 1956) which comprises reaction of the appropriate 2,4-diketo-6-phenylhex-5-enoic acid derivative

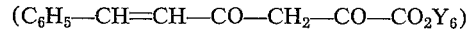

with hydroxylamine where $Y_6$ is lower alkyl.

3,4-dicarbalkoxy-5-formylisoxazoles are obtained by the reaction of the desired alkyl-γ,γ-dialkoxyacetoacetate with ethyl-α-chloro-α-oximinoacetate in the presence of a base, e.g. sodium hydride, followed by cyclization of the thus produced oxime of ethyl-α,γ-diketo-β-carbethoxy-δ,δ-dialkoxy valerate by treatment with p-toluene sulfonic acid or other suitable dehydrating agent in a non-polar solvent, e.g., benzene, for from 15 minutes to 24 hours at 0°–30° C. and preferably at room temperature, with continuous removal of water. The acetal of 5-formyl-3,4-dicarbalkoxy-isoxazole is converted to the 5-formyl derivative by acid hydrolysis.

Alternatively, isoxazoles are prepared by the reaction of an enamine of alkyl-γ,γ-dialkoxy acetoacetate with α-chloroximino acetate.

By ester interchange other alkyl groups or the benzyl group are conveniently introduced into $Y_5$ or $Y_4$ and $Y_5$. The carbobenzoxy derivatives are of value since they afford easy access to the corresponding carboxy acids by catalytic hydrogenolysis. Further, the esters can be converted to amides and thence to nitriles by reaction with ammonia followed by dehydration of the amide with, for example, benzenesulfonyl chloride.

Utilization of a γ,γ-dialkoxyacetoacetamide in lieu of an alkyl-γ,γ-dialkoxyacetoacetate in the above described reaction with ethyl α-chloro-α-oximinoacetate produces the corresponding acetal of 3-carbethoxy-4-carboxamide-5-formylisoxazole. Acid hydrolysis of the acetal by HCl or preferably 48% HBr for about 10 minutes at room temperature yields the 5-formyl derivative.

When the substituents of the present compounds are hydroxy or amino the use of a blocking group is sometimes advantageous in obtaining high yields during their preparation. Especially useful blocking groups are acyl, benzyl, tetrahydropyranyl, methoxymethyl, methyl and ethyl radicals. Benzyl ethers are particularly easily reduced to hydroxyl groups. Tetrahydropyranyl ethers are easily removed under mildly acidic conditions. Acyl groups which may be used include the acetyl, propionyl and butyryl, as well as the benzoyl, succinyl, phthaloyl, and the like. The lower alkyl blocking groups are preferred since these compounds are readily preparable.

In the octahydroanthracene compounds in which the 4a - substituent (11a - substituent in tetracycline compounds) is hydrogen, the reactive 4,10β-diketone system (11,12β-diketone system of tetracycline compounds) may be blocked by formation of derivatives of said system, e.g. 4-enol ethers. It is understood, of course, that enol formation may occur at the 10-position but for the sake of convenience such derivatives will be designated herein as 4-enol derivatives (enol ethers). The enol methyl ethers are prepared by reaction with excess diazomethane in methanol solution at room temperature. Such reactions usually require several days for completion.

When desired the above mentioned blocking groups, i.e. enol ether radicals, may be removed. The enol radicals are hydrolyzed by treatment with aqueous acid as is well known by those skilled in the art. When the ether radical is benzyl, hydrogenolysis over noble metal catalyst may also be used.

In compounds of formula XXI, for example, the compound wherein X, $X_1$, and A are hydrogen; $X_2$ is 10-methoxy; $R_3$ and $R_4$ are methyl and $X_4$ is N-t-butylcarboxamido, the 10-methyl ether and the 5-butyl group at the 2-position are conveniently removed in a single step by treatment with 48% HBr for up to 15 minutes at about 100° C. If shorter periods of time, e.g. 5 minutes, are used only the 10 methyl ether may be cleaved. Alternatively, the protective methyl and t-butyl groups can be removed in stepwise fashion. Treatment with 85% $H_2SO_4$ for 2 hours at about room temperature removes only the t-butyl group to give the 10-methyl ether of 6-demethyl-12a-deoxy - 5a,6 - anhydrotetracycline. The 10 - methyl group is then removed by treatment with 48% HBr, or with hot concentrated HCl, or hot 50% $H_2SO_4$.

The new compounds described herein are useful as chelating, complexing or sequestering agents. The complexes formed with polyvalent metal ions are particularly stable and usually quite soluble in various organic solvents. These properties, of course, render them useful for a variety of purposes wherein metal ion contamination presents a problem; e.g. stabilizers in various organic systems, such as saturated and unsaturated lubricating oils and hydrocarbons, fatty acids and waxes, wherein transition metal ion contamination accelerates oxidative deterioration and color formation, biological experimentation, metal extraction. They are further useful in analysis of polyvalent metal ions which may be complexed or extracted by these materials and as metal carriers. Other uses common to sequestering agents are also apparent for these compounds.

In addition, the compounds of Flow Sheets I and II are especially valuable as intermediates in chemical synthesis particularly in the synthesis of 5a,6-anhydro- and 7 - chloro - 5a,6 - anhydro, tetracycline, 5-oxy- and 7-chlorotetracycline and other novel antimicrobial agents bearing structural similarities to the tetracycline antibiotics. Many of the herein described compounds, especially those containing one or more hydroxy groups in the benzenoid moiety, are useful as antibacterial agents in their own right.

The starting compounds of structure I are prepared according to the following procedure:

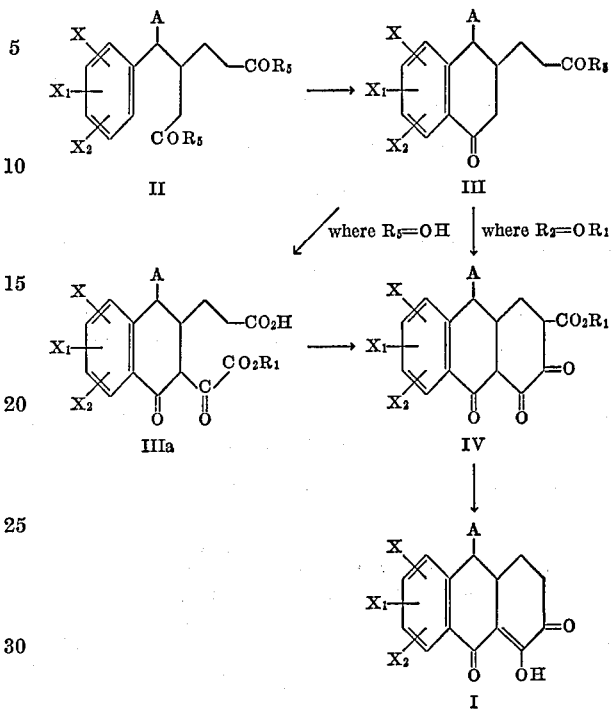

in the above formulae, X, $X_1$, $X_2$, and A are as previously described with the exception that substituent X is preferably not a nitro group since this group deactivates the ring of compounds of structure II in the ring closure reaction to those of structure III; ($R_1$ is lower alkyl or benzyl) and $R_5$ is hydroxyl, benzyloxy, lower alkoxy or halogen (Cl, F, Br, or I). Alternatively, the corresponding nitriles (e.g. where $COR_5$ is replaced by CN) may be used. Further, at least one of the two positions of the benzenoid ring ortho to the diester side chain must be available for the ring closure of structure II compounds. If desired, halogen, (Cl or Br) may be introduced into compounds of structures I, II, III and IV in which at least one of the benzenoid substituents is hydrogen by direct halogenation with a chlorinating or brominating agent by methods generally employed for halogenation of an aromatic ring. A variety of such agents are known to those in the art and include phosphorus pentachloride and pentabromide, sulfuryl chloride, N-chloro or bromoalkanoamides, e.g. N-chlor- and N-bromacetamide; N-chloro (or bromo) alkanedioic acid imides, e.g. N-halosuccinimide; N-halophthalimide; chlorine; bromine; N-haloacylanilides, e.g. N-bromoacetanilide, propionanilide and the like; 3-chloro-, 3-bromo, 3,5-dichloro and 3,5-dibromo-5,5,-dimethylhydantoin; pyridinium perbromide and perchloride hydrohalides, e.g. pyridinium perbromide hydrobromide; and lower alkyl hypochlorites, e.g. tertiary butylhypochlorite.

Of particular value are compounds of the following formula:

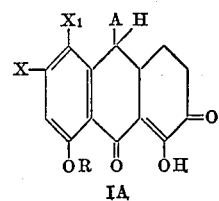

in which X, $X_1$, R and A are as described above, since these compounds are suitable for the preparation of biologically active tetracycline compounds, i.e. where OR is OH, and homologs and analogs thereof.

These compounds are prepared from the corresponding starting compounds of structure II represented by structure IID

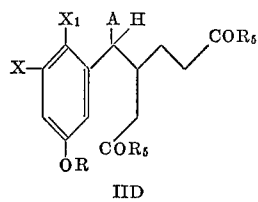

IID through the sequences represented by II→III→IV→I and II→VI→IV→I. In the ring closure reaction of corresponding structure II compounds, it is preferred that the benzenoid substituent ($X_1$) para to substituent OR be other than hydrogen to enable the ring closure reaction to proceed in the position ortho to substituent OR to afford corresponding structure III compounds. If there is no substituent para to OR a halogen group may be introduced by direct halogenation by conventional methods as hereinbefore described. The para halogen substituent may be removed, if desired, by hydrogenolysis, under the usual conditions, of the tetralone resulting from the ring closure.

The ring closure of compounds II to III is accomplished by any of the commonly employed methods for such reactions which generally involve the use of a dehydrating or dehydrohalogenating cyclization agent. With compounds of structure II, a preferred method when $R'_2$ is OH or alkoxy involves treatment of the starting compound with such ring closure agents as hydrogen fluoride or polyphsophoric acid. When $R'_2$ in the starting compound is hydroxyl, it is usually preferred to use hydrogen fluoride; when $R'_2$ is lower alkoxy, polyphosphoric acid. When $R'_2$ is halogen, a Friedel-Craft's catalyst, of course, should be employed, e.g. aluminum chloride. m-Hydroxy- or alkoxy-benzyl compounds of structure II having CN in place of $COR'_2$ lend themselves to the Hoesch synthesis (Berichte, 48, 1122 and 50, 462) wherein treatment with dry hydrogen chloride in the presence of zinc chloride leads to imine formation, and hydrolysis of the latter provides the tetralone keto group.

The condensation of compounds II or III in which $R_5$ is $OR_1$ with oxalic ester as well as ring closure of compounds IIIa (after esterification of the free acid with $R_1OH$) are effected by the general methods for ester condensation reactions of this type. Usually the reaction is carried out in the presence of a strong base such as alkali metal, alkali metal alkoxides and hydrides, sodamide and the like. If the starting compound in the oxalate condensation contains free hydroxyl, or amino groups it is preferred to block such groups by alkylation or acylation by known procedures. After the reaction is completed, the blocking groups may be removed, if desired. The resulting product from structure II, i.e. the corresponding 2-carbalkoxy or carbobenzyloxy compound of structure IV, on hydrolysis and decarboxylation yields compounds of structure I; structure VI compounds are first ring closed, e.g. with polyphosphoric acid and then hydrolyzed and decarboxylated to those of structure I. Cleavage of the ether linkage or other blocking groups by any of the general methods, e.g. treatment with mineral acid such as concentrated hydrobromic or hydriodic acid, or when R is benzyl, hydrogenolysis, gives free hydroxy groups in the benzenoid portion.

The starting compounds of the above described processes, i.e. compounds of structure II, are prepared by the following sequence of reactions:

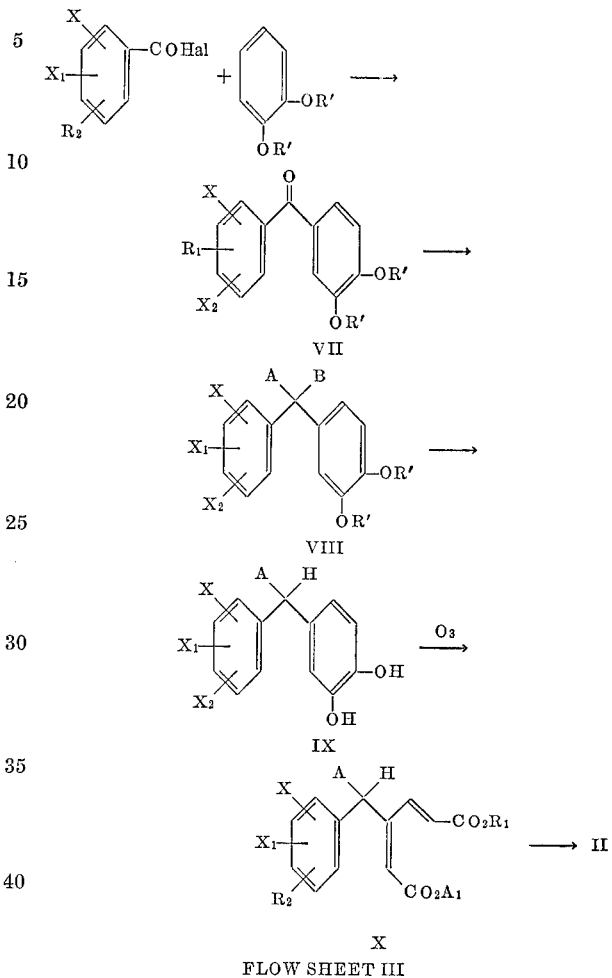

FLOW SHEET III

In the above sequence, R' and $R_1$ are lower alkyl or benzyl; and B is hydrogen or hydroxy. Further, in this sequence a lower alkyl group can be present in the starting diether at the 4-position of the aromatic ring, if desired, to produce 3-benzyl-4-(lower alkyl) substituted adipic acid derivatives (II).

The first of these reactions for the preparation of compounds of structure VII is by means of Friedel-Craft's reaction, e.g. $AlCl_3$ in carbon disulfide. The conversion of compounds of structure VII to those of VIII in which A and B are hydrogen is by catalytic reduction, e.g. over copper chromium oxide or noble metal, e.g. palladium, catalyst at from atmosphere to superatmospheric pressures of hydrogen gas; where A is alkyl and B hydroxyl, by reaction with a suitable Grignard reagent, e.g. AMgHalogen; where A is alkyl or hydrogen and B is hydrogen, by reduction, i.e. hydrogenolysis, of corresponding compounds in which B is hydroxyl. From VIII to IX is a standard ether hydrolysis, e.g. concentrated hydrobromic acid.

From IX to X is an ozonolysis reaction giving rise to the dienedioic acid which on hydrogenation over a noble metal catalyst, e.g. palladium, palladium on carbon, platinum, platinum oxide, etc., gives compounds of structure II. In the ozonolysis reactions to form compounds of structure X it is not possible to employ as starting compounds those of structure IX in which there are adjacent hydroxyl groups in the benzene ring containing X, $X_1$ and $X_2$ as substituents, since such structures are susceptible to the oxidation reaction.

Further, in the ozonolysis reaction compounds of structure IX in which X, $X_1$ and $X_2$ are adjacent ether groups or adjacent ether and hydroxy groups cannot be used since they, too, are susceptible of oxidation. The ozonolysis reaction is applicable to compounds of structure VIII, subject of course to the above limitation, wherein $OR^1$ represents an ether group. In such cases the ester (X) is obtained. In the hydrogenation reaction, compounds of structure X may be used as the free acids or corresponding benzyl or lower alkyl esters to provide corresponding products of structure II. Of course, benzyl esters may undergo hydrogenolysis to the free acid.

In addition, appropriate methods are available for reduction of the benzoyl keto group to a secondary alcohol. For example, IIa and VII can be reduced with sodium borohydride, or by hydrogenation with palladium catalyst in non-acidic media. By other well-known replacement procedures such as the following, the secondary alcohol may be converted to a readily replaceable sulfonic ester group, e.g. the tosylate, mesylate, etc., followed by reaction with an alkali metal cyanide, an amine, a malonic ester, or the like, thus affording means for introduction of a cyano, amino or $—CH(CO_2B_2)_2$ group in the 6-position of the final tetracycline. The secondary alcohol can also be dehydrated and the resulting unsaturated compound reduced to the corresponding benzyl derivative.

In this sequence of reactions, when X and/or $X_1$ are halogen, care should be taken to avoid prolonged hydrogenations which may result in the removal of the halogen atom. The possibility of halogen removal may be minimized by the use of a lower alkanoic acid, e.g. acetic or propionic as solvent for the reaction. Of course, if removed, halogen may be reintroduced if desired by the method hereinbefore described.

In those compounds of structure IX in which there are adjacent hydroxy groups in the benzenoid moiety, such groups must be protected by suitable blocking groups, e.g. etherified with lower alkyl or benzyl groups. Similarly, free amino groups may be acylated. Of course, the etherifying radical of the hydroxy group may differ from that represented by R'. If the etherifying radical is benzyl it may subsequently be removed by hydrogenolysis. Alternatively, all ether groups can be removed by hydrogen iodide treatment.

As will be appreciated from the preceding reaction sequence, it is most convenient to introduce the benzenoid substituents, X, $X_1$ and $X_2$ by employing the appropriately substituted benzoic acid derivative as starting material. Many of these benzoic acid derivatives are commercially available, and others may be readily obtained by those skilled in the art.

It will be noted that a number of the later steps of the preceding sequences involve reaction conditions which may affect certain of the substituent groups signified by X, $X_1$ and $X_2$. For instance, in catalytic hydrogenation; e.g. VII→VIII, halo groups are subject to hydrogenolysis. Therefore, where halo groups are desired in the final product, these are best introduced subsequent to the hydrogenation by an appropriate substitution reaction.

In commencing the sequence with a substituted benzoyl succinate, it is essential that an ortho ring position be unsubstituted, since cyclization to form the center ring of the hydroanthracene occurs at this position. For the preparation of the preferred compounds of structure I, which bear an OR substituent in the 5 position, the position of the benzene ring between the OR group and the keto group in the starting benzoyl succinate should be unsubstituted, to provide for the subsequent ring closure. On the other hand, it is preferred to have a substituent in what corresponds to the 8-position of compound I, since this precludes cyclization to that position in competition with the desired cyclization [II→III]. A $CF_3$, alkyl, or acylamino group can be conveniently carried in this position from the outset. Alternatively, an 8-substituent may be introduced during the reaction sequence, prior to the cyclization. For example, compound II may be halogenated at this position, e.g. by treatment with chlorine in the presence of a catalytic amount of iodine or ferric chloride.

Compounds of structure II are also prepared by the following sequences of reactions.

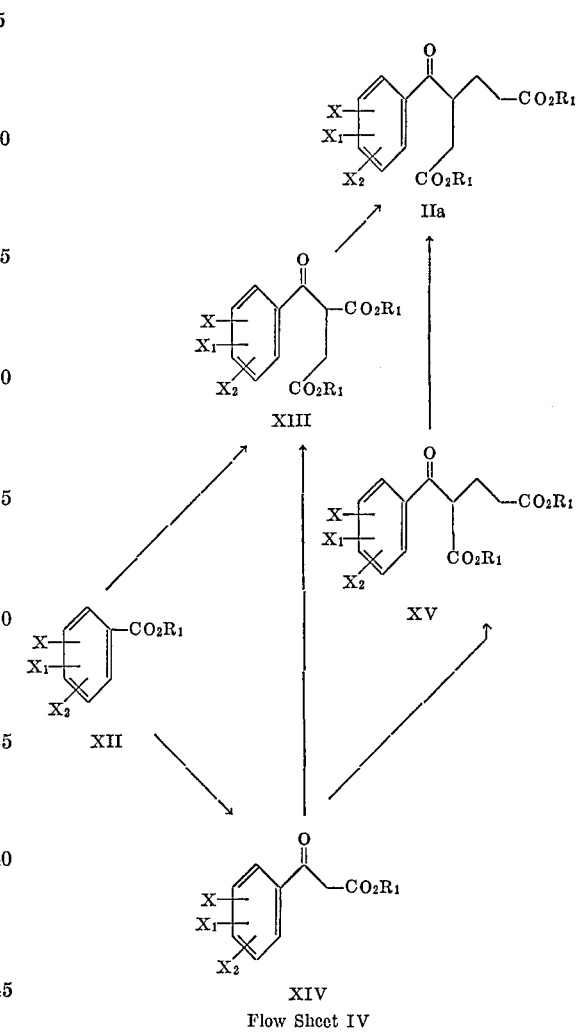

Flow Sheet IV

The conversion of compounds of Formula XII to those of XIII is a Claisen-type condensation of the lower alkyl ester of XII with succinic acid diesters to provide Formula XIII compounds. The conversion of compounds of Formula XII to XIV is similarly a Claisen condensation using acetic acid esters. The conversion of compounds of Formula XIV to XIII is by alkylation reaction with a monohaloacetic acid ester, and the conversion of XV to IIa is such an alkylation followed by hydrolysis and decarboxylation. The preparation of compounds of Formula XV from those of Formula XIV is by standard alkylation procedures preferably using $H_2C=CHCO_2R_1$ or corresponding nitriles. The conversion may also be effected by alkylation with a β-halo acid derivative halogen

or the corresponding nitrile. Each of these reactions are effected under standard conditions known to those skilled in the art, e.g. in a reaction-inert solvent in the presence of a base such as Triton B (benzyltrimethylammonium hydroxide), sodamide, sodium hydride and their obvious equivalents.

The conversion of compounds of Formula XIII to those of IIa is by known standard reactions, e.g. by reaction of Formula XIII compounds with corresponding acrylic acid esters of the formula $H_2C=CH_2CO_2R_1$ in which $R_1$ is as previously described under the conditions of the Michael reaction. It may also be effected by alkylation with β-halo-alkanoic acids of the formula halogen—CH$_2$CH$_2$CO$_2$R$_1$ or of the corresponding nitriles. Hydrolysis and decarboxylation of these compounds gives structure IIa compounds. The conversion of structure IIa compounds to those of structure II is brought about by reactions as previously described for preparing structure VIII compounds.

The present invention additionally is adaptable for the preparation of other tetracycline molecules, as follows.

For compounds in which substitutent X is nitro, the tetralone of structure III is nitrated by standard procedures, e.g., such as nitricacetic anhydride—acetic acid mixtures or nitric acid—sulfuric acid mixtures. Those in which X is halogen, cyano, nitro or other such groups are prepared by a Sandmeyer reaction of the corresponding diazonium salt with suitable salt reagents (Cu$_2$Cl$_2$, Cu$_2$Br$_2$, KI, etc.). The diazonium salt is obtained by diazotization of the amino compound, prepared from compounds of structure II in which X is amino or produced by the reduction of the corresponding nitro compound by conventional means, e.g., chemical means, such as, active metals (Sn) and mineral acids (HCl) or by catalytic hydrogenation, e.g., nickel catalyst and superatmospheric pressure.

The amino group may also be introduced into the benzenoid ring by coupling of aryldiazonium salts, e.g., benzene diazonium chloride or the diazonium salt of p-aminobenzenesulfonic acid, with compounds of structure II or III containing a free hydroxy substituent in the 5-position of the 4-tetralone ring (3-position of the benzene ring) followed by reduction of the resulting phenylazo compound, e.g., catalytic reduction over noble metal catalysts. An amino group may also be introduced in place of the keto carbonyl oxygen of compounds of structure VII and XIV by reduction of the corresponding oxime or hydrazone, by reductive ammonolysis of the keto carbonyl group over noble metal catalyst or by reduction of the keto group to a secondary hydroxy group by sodium borohydride followed by conversion to the tosylate and replacement of the tosylate group by an amino group.

A further modification of the present invention provides a means of introducing a variety of substituents in positions corresponding to the 5a, and 6-positions of the tetracycline nucleus. This involves formation of the secondary alcohol corresponding to structure II-A compounds represented by the formula:

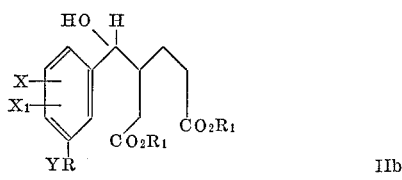

IIb by partial reduction of the corresponding ketone over palladium catalyst at superatmospheric pressure until only one molar equivalent of hydrogen is taken up. The secondary alcohol is then dehydrated to the corresponding unsaturated compound. Compounds of structure IIb are also intermediates for the preparation of 6-demethyltetracyclines.

In lieu of proceeding through IIb as described above, the secondary alcohols corresponding to IIa can be used as intermediates in the sequence for producing 5a,6-disubstituted tetracyclines. In this method lactone formation poses a problem. For this reason the reduction to the secondary alcohol is conducted under neutral conditions. The benzoyl keto group of compounds of structure IIa may be subjected to the Wittig reaction as described in Angewandt Chemie 71, 260–273 (1959) to produce the alkylidene derivatives IIc

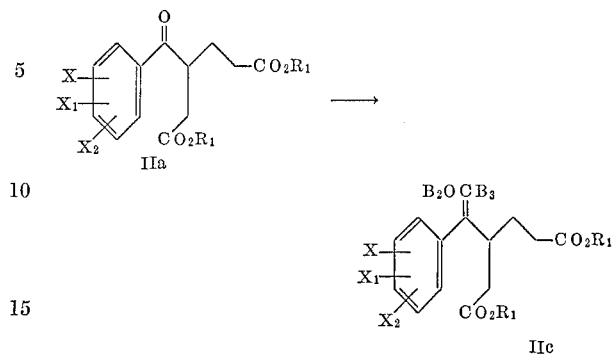

by treatment with the ylid prepared from a chloroether of the formula (B)$_3$CHClOB$_2$ (where B$_2$ is lower alkyl and B$_3$ is hydrogen or lower alkyl). The necessary chloroethers are obtained by standard treatment of aldehyde acetals of the formula (B$_3$)CH(OB$_2$)$_2$ with an acid chloride (J. Org. Chem. 231, 1936).

Treatment of compounds IIa in this fashion with the ylid from chloromethyl ether, for example, converts the keto group to a methoxymethylene group, which may be reduced to methoxymethyl. The later group may be carried through the subsequent steps herein described to the 6-methoxymethyltetracycline. At this point, the elements of methanol may be split out by standard procedures to obtain the 6-methylene-6-deoxy-6-demethyltetracycline.

The products of the above reaction may in turn be hydrogenated with noble metal catalysts:

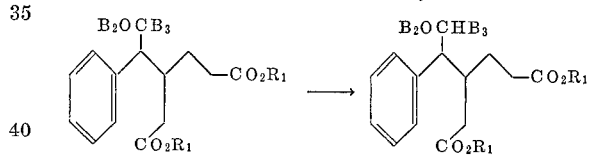

Subjecting the reduction products to the further synthetic sequences illustrated herein yields tetracyclines having a 6-CH(B$_3$)OB$_2$ substituent. Treatment of such tetracyclines with liquid hydrogen fluoride results in the elimination of a mole of alcohol B$_2$OH and provides tetracyclines having a CHB$_3$ at the 6-position. The latter treatment is for example, conveniently effected after the introduction of the 12a-hydroxyl group. Alternatively, treatment of such tetracyclines having a 6-CH(B$_3$)OB$_2$ group converts this group to CH(B$_3$)OH with concurrent hydrolysis of any ether groups in the aromatic D-ring.

The products of the Wittig reaction IIc may also be hydrolyzed to aldehydes and the resulting aldehyde group in turn converted by catalytic hydrogenation to a hydroxymethyl group. The latter may be carried through the subsequent reactions of synthetic sequence with its free hydroxyl group, or preferably, in the form of a lower alkyl ether.

The described procedures are adaptable to the preparation of a variety of tetracycline molecules, as follows:

For introduction of aromatic nitro groups, the given compound, e.g. tetralone III, is nitrated by standard procedures, such as treatment with nitric acid-acetic anhydride-acetic acid mixtures, or nitric-sulfuric acid mixtures. Those in which X is halogen, cyano, halo sulfonyl nitro or other such groups may be prepared by Sandmeyer reaction of the corresponding diazonium salt with suitable salt reagents (Cu$_2$Cl$_2$, Cu$_2$Br$_2$, etc.). The diazonium salt is obtained by diazotization of the amino compound, which may in turn be prepared by reduction of the corresponding nitro compound by conventional means, e.g. chemical reduction with active metals (Sn) and mineral acids (HCl) or catalytic hydrogenation, e.g. with nickel catalyst at superatmospheric pressure. Aromatic cyano groups may be further converted to carboxy or carbalkoxy groups where desired by standard hydrolysis and esterification.

The amino group may also be introduced into the benzenoid ring, e.g. in compounds of structure II having a phenolic hydroxyl group, by coupling with aryldiazonium salts such as benzene diazonium chloride or the diazonium salt of p-aminobenzenesulfonic acid, followed by reduction of the resulting phenylazo compound, e.g. by catalytic hydrogenolysis with noble metal catalysts.

As has been previously pointed out, normal discretion must be employed in subjecting certain of the substituted intermediates to the herein described reaction steps. In the base condensation reactions, the presence of a substituent having an active hydrogen (e.g. a hydroxyl, or amino group) will necessitate the use of an additional mole of the sodium hydride or other base. The presence of more than one such substituent per molecule is preferably avoided in these reactions, e.g. by the use of protective ether groups as previously described. The same considerations apply to Grignard reactions and hydride reductions. Hydroxyl groups can be subsequently regenerated from their ethers by conventional hydrolitic procedures such as treatment with hydrogen bromide. Similarly, protective benzyl ether groups can subsequently be hydrogenolyzed to obtain hydroxyl groups where desired.

In the reduction of benzoyl adipate IIa or benzophenone VII to the corresponding benzyl derivatives II and VIII, chemical reduction with amalgamated zinc and HCl by the well-known Clemmensen procedure may be employed in place of catalytic hydrogenolysis. Any ester groups which may be present in the molecule are concurrently hydrolyzed in the Clemmensen procedure, and re-esterification will therefore be necessary.

Alternative routes or procedures can be used in place of the Clemmensen reduction. Thus, in the reduction of benzoyl adipate IIa to corresponding benzyl derivative II, the three-step procedure previously referred to is an appropriate alternative to direct reduction; i.e. (1) conversion of the keto group to hydroxyl, e.g. with sodium borohydride or by mild reduction at room temperature with palladium on carbon in alcohol or other neutral solvent; (2) conversion of the resulting alcohol to the unsaturated compound by dehydration in anhydrous hydrogen fluoride; and (3) rapid hydrogenation of the resulting double bond, e.g. with palladium at room temperature and moderate hydrogen pressure, until one mole of hydrogen has been consumed. Another alternative reduction procedure which is suitable is the Wolf-Kishner reaction (Annalen, 394, 90, 1912 and J. Russ. Phys. Chem. Soc. 43, 582, 1911) wherein the benzoyl derivative is converted to a hydrazone, and the latter is in turn reduced to the corresponding benzyl derivative by heating with a base such as sodium ethoxide.

By application of the Grignard reaction to structure II–A compounds, intermediates of great value in the production of 5a,6-anhydrotetracyclines and ultimately of tetracyclines bearing a 6-alkyl group are obtained. Thus,

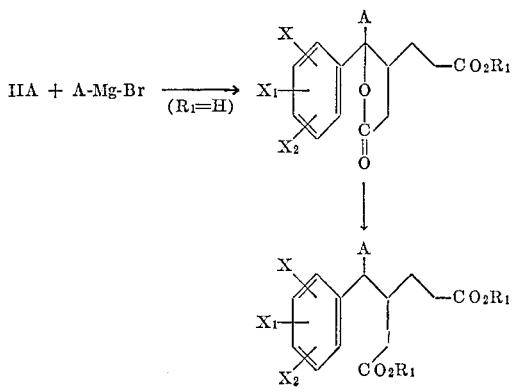

The intermediate lactone is readily reduced by known methods, e.g. catalytic hydrogenation in acetic acid over palladium on carbon in a Parr shaker at about 40 p.s.i. and 50° C. Alternatively, the reduction can be conducted catalytically at super-atmospheric pressures, e.g. 1000 p.s.i. in a suitable autoclave.

Of particular value are compounds of the following formula:

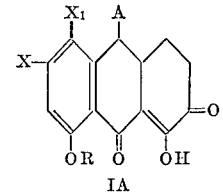

IA in which X, $X_1$, R, and A are as described above, since these compounds are suitable for the preparation of known tetracycline compounds, i.e. where OR is OH, and homologs and analogs thereof.

These compounds are prepared from the corresponding starting compounds of structure II represented by structure II–D

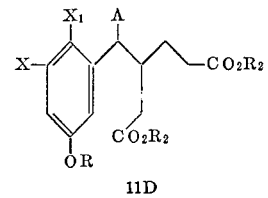

IID through the sequences represented by II→III→IV→I and II→VI→IV→I. In the ring closure reaction to corresponding structure III compounds, it is preferred that one of the benzenoid substituents (X or $X_1$) be para to substituent OR so that the ring closure reaction proceed in the position ortho to substituent OR to afford corresponding structure III compounds. If there is no substituent para to OR a halogen group may be introduced by direct halogenation by conventional methods as hereinbefore described. The para halogen substituent may be removed, if desired, by hydrogenolysis, under the usual conditions, of the tetralone resulting from the ring closure.

The present invention provides a means of synthesizing 5a,6-anhydro tetracycline compounds including new 5a,6-anhydro tetracyclines, which are therapeutically useful by virtue of their antimicrobial activity.

Of particular significance in accordance with this invention are those final tetracycline products (XXI and XXII) wherein a hydroxy group or a group readily convertible to a hydroxy group (alkoxy or alkanoyloxy) is present at the 8-position. An additional substituent of importance in accordance with this invention is the trifluoromethyl group when present at the 7- and or 8- positions of the final tetracyclines.

Some of the new 5a,6-anhydro tetracyclines of the present invention are homologs, isomers or closely related analogs of known 5a,6-anhydro tetracyclines. Many of the new 5a,6-anhydro tetracyclines are distinguished from prior art compounds by their possession of important and desirable properties, such as extended in vitro antibacterial spectra and activity against organisms which have inherent or acquired resistance to known antibiotics. They are active versus antibiotic resistant staphylococci, Candida albicans and Trichomonas vaginalis and are particularly valuable for topical use against a variety of skin infections. The new 5a,6-anhydro tetracyclines are useful in therapy, in agriculture, and in veterinary practice both therapeutically and as growth stimulants. In addition, they may be employed as disinfectants and bacteriostatic agents, in industrial fermentations to prevent contamination by sensitive organisms, and in tissue culture, e.g. for vaccine production.

The various new 5a,6-anhydro tetracyclines of the present invention which do not share the antibacterial activity of the known tetracyclines are valuable intermediates in the preparation of other compounds of classes known to contain biologically active members. Thus, many of the 5a,6-anhydrotetracyclines can be biologically rehydrated to the corresponding tetracycline using *Streptomyces aureofaciens* or *Streptomyces rimosus* as described by McCormick et al. in J. Am. Chem. Soc. 84, 3023–5 (1962). Further, the D-ring can be nitrated directly and the nitro derivative reduced catalytically to an aminotetracycline. Further, the tetracycline products of this invention can be halogenated by known methods at the 11a-, or in the case of a 7-unsubstituted tetracycline, in the 7,11a-positions by treatment with such halogenating agents as perchloryl fluoride, N-chlorsuccinimide, N-bromsuccinimide and iodobromide.

The present invention embraces all salts, including acid-addition and metal salts, of the new antibiotics. Such salts are formed by well known procedures with both pharmaceutically acceptable and pharmaceutically unacceptable acids and metals. By "pharmaceutically acceptable" is meant those salt-forming acids and metals which do not substantially increase the toxicity of the antibiotic.

The pharmaceutically acceptable acid addition salts are of particular value in therapy. These include salts of mineral acids such as hydrochloric, hydriodic, hydrobromic, phosphoric, metaphosphoric, nitric and sulfuric acids, as well as salts of organic acids such as tartaric, acetic, citric, malic, benzoic, glycollic, gluconic, gulonic, succinic, arylsulfonic, e.g. p-toluenesulfonic acids, and the like. The pharmaceutically unacceptable acid addition salts, while not useful for therapy are valuable for isolation and purification of the new substances. Further, they are useful for the preparation of pharmaceutically acceptable salts. Of this group, the more common salts include those formed with hydrofluoric and perchloric acids. Hydrofluoride salts are particularly useful for the preparation of the pharmaceutically acceptable salts, e.g. the hydrochlorides, by solution in hydrochloric acid and crystallization of the hydrochloride salt formed. The perchloric acid salts are useful for purification and crystallization of the new products.

Whereas all metal salts may be prepared and are useful for various purposes, the pharmaceutically acceptable metal salts are particualrly valuable because of their utility in therapy. The pharmaceutically acceptable metals include more commonly sodium, potassium and alkaline earth metals of atomic number up to and including 20, i.e., magnesium and calcium and additionally, aluminum, zinc, iron and manganese, among others. Of course, the metal salts include complex salts, i.e. metal chelates, which are well recognized in the tetracycline art. The pharmaceutically unacceptable metal salts embrace most commonly salts of lithium and of alkaline earth metals of atomic number greater than 20, i.e., barium and strontium, which are useful for isolating and purifying the compounds.

It will be obvious that, in addition to their value in therapy, the pharmaceutically acceptable acid and metal salts are also useful in isolation and purification.

The new tricyclic intermediates of the present invention, in addition to their value in synthesis, exhibit valuable antimicrobial activity. They may be employed as bacteriostatic agents, and are further useful in separation and classification of organisms for medical and diagnostic purposes. These new intermediates, by virtue of their β-diketone structure, are also valuable chelating, complexing or sequestering agents, and form particularly stable and soluble complexes with polyvalent cations. They are therefore useful wherever removal of such polyvalent ions is desired, e.g., in biological experimentation and in analytical procedures. Of course, as is well known to those skilled in the art, such β-diketones may exist in one or more of several tautomeric forms as a result of their ability to enolize. It is fully intended that the β-diketone structures herein employed embrace such tautomers.

The starting compounds of the present invention are readily preparable by known procedures. Many of these compounds, including both benzoic acid esters and benzophenone starting compounds, have been described in the literature.

The following examples are given by way of illustration and are not to be construed as limitations of this invention, many variations of which are possible within the scope and spirit thereof.

EXAMPLE I

Monoethyl ester of 3-(3-methoxybenzyl)adipic acid

*Method A.*—Five grams of diethyl 3(3-methoxybenzoyl)adipate and 2 g. of 5% palladium on carbon in 30 ml. of acetic acid are treated in a conventional Parr shaker at a presure of 40 p.s.i. of hydrogen gas at 50° C. until 2 moles of hydrogen are taken up. The first mole of gas is taken up rapidly and the second more slowly over a total reaction time of up to about 30 hours. The mixture is filtered, concentrated under reduced pressure to an oil which is vacuum-distilled to obtain the product.

*Method B.*—The γ-lactone of the enol form of the monoethyl ester of the starting compound is hydrogenated over palladium on carbon by this same method to obtain this product, B.P. 190–1° C. (0.3 mm.). Elemental analysis gives the following results:

Calc'd for—$C_{15}H_{22}O_5$ (percent): C, 65.29; H, 7.53. Found (percent): C, 65.25; H, 7.68.

The corresponding diethyl ester is prepared by refluxing this product in ethylene dichloride containing ethanol and sulfuric acid. The diester is obtained by diluting the reaction mixture with water, separating, drying and concentrating the ethylene dichloride layer, and vacuum-distilling the residual oil, $n_D^{25} = 1.4973$. Elemental analysis gives the following results: Calc'd for—$C_{18}H_{26}O_5$ (percent): C, 67.06; H, 8.13. Found (percent): C, 67.02; H, 8.31.

The starting compound together with the corresponding γ-lactone are prepared by hydrolysis and decarboxylation of diethyl 3-carbo-t-butoxy-3-(3-methoxybenzoyl)adipate (Example XLV) by refluxing in dry xylene containing p-toluenesulfonic acid. The products are separated by fractional distillation or may be used together as starting compound for this hydrogenation reaction.

EXAMPLE II 3-(3-methoxybenzyl)adipic acid

*Method A.*—Amalgamated zinc is prepared by shaking for 5 minutes a mixture of 120 g. of mossy zinc, 12 g. of mercuric chloride, 200 ml. of water and 5 ml. of concentrated HCl in a round-bottom flask. The solution is decanted and the following reagents added: 75 ml. of water and 175 ml. of conc. HCl, 100 ml. of toluene and 52 g. of 3-(3-methoxybenzoyl)adipic acid. The reaction mixture is vigorously boiled under reflux for 24 hours. Three 50 ml. portions of concentrated HCl are added at intervals of 6 hours during reflux.

After cooling to room temperature, the layers are separated, the aqueous layer diluted with 200 ml. of water and extracted with ether. The ether extract is combined with the toluene layer, dried and concentrated under reduced pressure to obtain the product.

*Method B.*—A solution of 625.4 grams (22.1 mole) 3-(3-methoxybenzoyl)-adipic acid in 38.5 liters of glacial acetic acid is hydrogenated in a 15 gal. stirred autoclave in the presence of 2.5 kg. 5 percent palladium-on-carbon catalyst at 1000 p.s.i.g. and 50° C. until the theoretical amount of hydrogen has been absorbed. The catalyst is filtered off and the solvent removes from the filtrate by distillation at reduced pressure. This gives 5432 grams of product in the form of an oil. It is further purified by conversion to the dimethyl ester, fractional distillation, and hydrolysis, as follows:

A solution of 5432 grams (20.4 mole) of the crude 3-(3-methoxybenzyl)adipic acid, 3410 grams (106.0 mole) methanol, 10.6 liters ethylenedichloride and 106 ml. concentrated sulfuric acid is stirred and refluxed for 15 hours. The mixture is cooled and washed with water (3× 5 l.), 5 percent aqueous sodium hydroxide (1× 2 l.) and again with water (3× 5 l.) The ethylene-dichloride solution is dried over 3 lb. anhydrous magnesium sulfate (with 2 lb. Darco G60 activated carbon). The drying agent and carbon are filtered off and the filtrate concentrated at reduced pressure to remove solvent. The residue is distilled through a 3″ x 16″ vacuum-jacketed fractionating column packed with porcelain saddles. After a forerun of 934.1 grams, the product is collected at 172.0° C/0.2 mm. to 183° C/0.35 mm. This amounts to 3076.6 g. of 95 percent pure ester.

The ester, 2943.4 grams (10.00 mole) is hydrolyzed by heating over a steam bath for 19 hours with 1 kg. (25.0 mole) sodium hydroxide in 6 liters of water. The hydrolysis mixture is acidified to pH ca. 1.0 addition of concentrated hydrochloric acid and the product is extracted into methylene chloride (1× 4 l. and 2× 2 l.). The methylene chloride extract is washed with water (1× 4 l. +1× 8 l.), dried over magnesium sulfate, filtered and freed of solvent by distillation at reduced pressure. This gives 2506 grams of 3-(3-methoxybenzyl)-adipic acid in the form of a very sticky oil.

*Method C.*—A solution of dimethyl 3-(3-methoxybenzyl)adipate (0.01 mole) in 280 ml. of 1:1 tetrahydrofuran: 1,2-dimethoxyethane at a temperature of about −10° C. is treated with a solution of sodium borohydride (0.005 mole) in 30 ml. of 1,2-dimethoxyethane and 10 ml. of water. After 15 minutes, 5 ml. of glacial acetic acid is added and the mixture stirred for 5 minutes, hydrochloric acid (3 ml. of 6 N) is then added, the mixture stirred for an additional 0.5 hour, then poured into water. The product, 3-[α - hydroxy - (3-methoxybenzyl]adipic acid dimethyl ester, is recovered by evaporation.

The hydroxy ester is placed in 150 ml. of anhydrous hydrogen fluoride and allowed to stand overnight. The hydrogen fluoride is then evaporated and the thus produced dimethyl 3(3-methoxy benzylidene)adipate dissolved in dioxane (300 ml.), treated with 0.3 g. of palladium on charcoal (5%) and subjected to 50 p.s.i. at room temperature until an equimolar proportion of hydrogen is consumed. The mixture is filtered and the filtrate evaporated to dryness under reduced pressure to give the desired compound as the methyl ester. It is hydrolyzed to the acid by the procedure of method B.

EXAMPLE III

Dimethyl 3-(2-chloro-5-methoxybenzyl)adipate

*Method A.*—A mixture of 3.2 g. of dimethyl 3-(3-methoxybenzyl)adipate and 1.4 g. of N-chlorosuccinimide in 30 ml. of trifluoracetic acid is stirred and heated on a steam bath for 30 minutes. The reaction mixture is then poured into 5% aqueous sodium bicarbonate with stirring, and the mixture extracted with ether. The combined extracts are dried over anhydrous sodium sulfate and then concentrated under reduced pressure to an oil which is vacuum-distilled to obtain the product, B.P. 200° C. (1.1 mm. Hg).

*Method B.*—A mixture of 3.2 g. of dimethyl (3-(3-methoxybenzyl)adipate and 2.1 g. of phosphorus pentachloride in 100 ml. of dry benzene is refluxed for 30 minutes. The reaction mixture is carefully poured into ice and water, the benzene layer separated, washed with water and dried. Concentration of the dried benzene solution under reduced pressure yields an oil which is vacuum-distilled to obtain the product.

Similarly, the diethyl, dibenzyl and dipropyl chloroesters are prepared.

*Method C.*—A solution of 1688 g. of 3-(3-methoxybenzyl)adipic acid and 50 mg. of iodine in 9 liters of glacial acetic acid is stirred while a solution of 450 g. of chlorine in 8 liters of glacial acetic acid is added during about 2 hours. The mixture is kept in the dark during the procedure and the temperature maintained at 10°–15° C. The solvent is then removed by concentration under reduced pressure to give 1902 g. of a dark amber oil.

This procedure is repeated with ferric chloride in lieu of iodine with comparable results.

*Method D.*—A mixture of 30.4 g. of diethyl 3-(3-methoxybenzyl)adipate and 12.75 g. of sulfuryl chloride in 250 ml. of benzene is allowed to stand for 3 days at room temperature. At the end of this period, the reaction mixture is concentrated under reduced pressure to a gummy residue which is vacuum-distilled to obtain the product.

*Method E.*—The procedure of Method B is repeated using as starting compound the corresponding dicarboxylic acid to obtain 3-(2-chloro-5-methoxybenzyl(adipic acid dichloride.

EXAMPLE IV

Diethyl 3-(2-chloro-5-ethoxybenzyl)adipate

This product is obtained by the procedure of Method A of Example III employing diethyl 3-(3-ethoxybenzyl) adipate in lieu of dimethyl 3-(3-methoxybenzyl)adipate.

EXAMPLE V

2(2-carbethoxyethyl)-5-methoxy-8-chloro-4-tetralone

*Method A.*—A mixture of 2 g. of diethyl-3-(2-chloro-5-methoxybenzyl)adipate (Example III) and 30 g. of polyphosphoric acid is heated on a steam bath for 30 minutes and then poured into ice water. The oil then separates and is collected.

*Method B.*—A mixture of 2.0 g. of the di-acid chloride of 3-(2-chloro-5-methoxybenzyl)adipic acid in 30 ml. of carbon disulfide is cooled to 0° C. and 4 g. of aluminum chloride added portionwise to the cooled mixture. The mixture is stirred for 30 minutes and then allowed to warm to room temperature where a vigorous reaction ensures. After the vigorous reaction subsides the mixture is warmed on a steam bath, cooled, diluted with water and the carbon disulfide steam distilled. The mixture is extracted with chloroform and the product obtained by drying and concentrating the chloroform extract. The product is the free acid which, if desired, is converted to the desired lower alkyl ester by conventional methods. For example, the methyl ester is prepared as follows:

A mixture of 2002 g. (7.1 moles) of the tetralic acid, 3 l. chloroform, 682 g. (21.3 moles) methanol and 21.2 ml. conc. sulfuric acid is refluxed with stirring on a steam bath for 20 hours. The reaction mixture is then chilled and 2 l. each of chloroform and water are added. The organic phase is separated and washed successively with two × 2 l. water, one × 1 l. 2% aqueous sodium hydroxide and three × 4 l. water to a final pH of about 7.5. After drying over anhydrous sodium sulfate and treatment with Darco KB activated carbon the solution is filtered and concentrated to a dark oil at reduced pressure. The oil is taken up in 6 l. hot ethyl acetate and 11 l. hexane added. The solution is chilled to −5° C. with stirring and 1404 g. 2-(2-carbomethoxyethyl)-5-methoxy-8-chloro-4-tetralone recovered by filtration, hexane-washing and air-drying. The product melts at 101.0–102.4° C.

EXAMPLE VI 2-(2-carboxyethyl)-5-methoxy-8-chloro-4-tetralone

A polyethylene container is charged with 1809 g. (6.03 mole) 3 - (2 - chloro-5-methoxybenzyl)adipic acid and chilled in an ice bath while 7 kg. liquid hydrogen fluoride is introduced from an inverted, chilled tank. The mixture is swirled to make homogeneous and then left to evaporate partially overnight in a hood. Most of the hydrogen fluoride that remains is removed by placing the polyethylene container in warm water to cause rapid evaporation. The remainder is removed by quenching in about 10 l. water. The product is then extracted into chloroform, washed with water and dried over magnesium sulfate. Removal of the drying agent by filtration and the solvent by distillation gives a gum that is triturated with ether and filtered. This gives 1031 g. of crude product that is recrystallized from a mixture of 16 l. ethanol, 2 l. acetone and 1 l. ethylene dichloride, with activated carbon treatment. The first two crops amount to 863.9 grams of white crystalline product melting at 175.0–180.5° C.

Elemental analysis gives the following results:

Calcd. for: $C_{14}H_{15}O_4Cl$ (percent): C, 59.47; H, 5.35; Cl. 12.54. Found (percent): C, 59.51; H, 5.42; Cl, 12.60.

Ultraviolet absorption shows λ max. at 223 mμ ($\epsilon$=24,650), 255 mμ ($\epsilon$=7,900) and 326 mμ ($\epsilon$=4,510). Infrared absorption maxima appear at 5.76 and 5.99μ.

This product is also obtained by hydrolysis of the product of Method A, Example V, by treatment with HCl in acetic acid.

The methyl ester, ethyl ester (M. 57–59° C.) and benzyl ester (M. 84–85° C.) are prepared by conventional methods.

3-(3-methoxybenzyl)adipic acid, treated with HF as described, yields 2 - (2-carboxyethyl)-7-methoxy-4-tetralone, which melts at 158–9° C. after two recrystallizations from benzene-hexane and exhibits ultraviolet absorption maxima at 225 mμ ($\epsilon$=13,500) and 276 mμ ($\epsilon$=16,000) in methanolic HCl and NaOH.

*Analysis.*—Calcd. for $C_{14}H_{16}O_4$ (percent): C, 67.73; H, 6.50. Found: C, 67.67; H, 6.48.

EXAMPLE VII

2(2-carboxyethyl)-6-chloro-7-methoxy-4-tetralone

This substance is a byproduct of the cyclization of the products of Example III. It is separated from the crude 2-(2-carboxyethyl)-5-methoxy-8-chloro-4-tetralone of Example VI by virtue of its chloroform insolubility. 2900 g. of the crude tetralone are leached six times with 8 liter portions of hot chloroform. 170 g. of white solid remain, melting at 236–239° C. The methyl ester is prepared by the procedure of Example V, Method B.

EXAMPLE VIII 2-(2-carbomethoxyethyl)-5-benzyloxy-8-chloro-4-tetralone 2-(2-carboxyethyl)-5-methoxy-8-chloro-4-tetralone (25 g.), glacial acetic acid (200 ml.) and 48% hydrobromic acid (50 ml.) are heated at 90° under nitrogen for twenty-four hours. The cooled solution deposits a crystalline solid. The mixture is poured over two parts ice and the total solid crop isolated by filtration and thoroughly washed with water. The crude 2-(2-carboxyethyl)-5-hydroxy-8-chloro-4-tetralone obtained in this way is recrystallized from acetonitrile to obtain 18.8 g. melting at 164–8° C.

*Elemental analysis.*—Calcd. for $C_{13}H_{13}ClO_4$ (percent): C, 58.11; H, 4.88; Cl, 13.20. Found (percent): C, 57.99; H, 4.87; Cl, 12.73.

14.5 g. of this product is placed in 200 ml. dry methanol and the mixture refluxed for 30 minutes as anhydrous HCl is passed through. The now clear yellow solution is allowed to stand overnight, and the methanol is then removed in vacuo. The residual gum is extracted exhaustively with hexane and the combined extracts are concentrated and cooled. 11.8 g. of the white, crystalline methyl ester separates and is filtered off and recrystallized from hexane. The ester melts at 68–69.5° C. and analyzes as follows:

Calcd. for $C_{14}H_{15}ClO_4$ (percent): C, 59.45; H, 5.35; Cl, 12.6. Found (percent): C, 59.16; H, 5.38; Cl, 12.6.

5.6 g. (0.02 mole) of this substance is dissolved in 500 ml. anhydrous methanol and to this is added 0.02 mole sodium methoxide and 500 ml. benzene. The mixture is concentrated to dryness in vacuo at room temperature, then heated at 100° C. and 0.1 mm. for 10 minutes. The residue is maintained under high vacuum at room temperature for 16 hours, and the dry solid added to 50 ml. benzyl bromide together with sufficient dimethyl formamide to solubilize. The mixture is heated at 100° C. for 48 hours with stirring, then cooled and filtered. The filtrate is concentrated at reduced pressure and the residual oil chromatographed on acetone-washed and dried silicic acid in chloroform. The first effluent fraction consists of unchanged starting material. The main fraction, recognized by a negative ferric chloride test, deposits crystalline 2-(2-carbomethoxyethyl) - 5-benzyloxy-8-chloro-4-tetralone on standing.

EXAMPLE IX 2-carbomethoxy-5-methoxy-8-chloro-3,4,10-trioxo-1,2,3,4,4a,9,9a,10-octahydroanthracene 30 grams of 2-(2-carbomethoxyethyl)-5-methoxy-8-chloro-4-tetralone (0.1 mole), prepared as described in Example V, Method B, is dissolved together with 24 grams dimethyloxalate (0.2 mole) by warming with 135 ml. freshly distilled dimethyl formamide in a well dried two liter flask which has been flushed with dry nitrogen. The solution is cooled to 20° C. and to it is added all at one time 0.4 mole sodium hydride in the form of a 50% oil dispersion which has been exposed to the atmosphere for 24 hours in order to produce a deactivating coating. The reaction mixture is maintained at 20–25° C. with an ice bath. 0.1 mole dry methanol is now added, and the temperature rises spontaneously to 40–50° C. When the temperature begins to fall (about 5 minutes after addition of the methanol) the reaction vessel is removed from the ice bath and quickly placed in an oil bath at 110° C. The reaction temperature is brought with dispatch to 90° C. and maintained there for 10 minutes, or until active bubbling ceases if this occurs sooner.

The flask is now immediately transferred back to the ice bath, and when the temperature reaches 15° C., 100 ml. of glacial acetic acid is added at such a rate that the temperature does not exceed 30° C. At this point, a golden yellow precipitate appears. 150 ml. methanol and 50 ml. water are added and the mixture is digested at 45° C. for 15 minutes and then stirred in an ice bath for an hour. If only a scanty crop of crystals is present at this time the mixture may be stored in the refrigerator overnight before proceeding. It is now transferred to a separatory funnel to permit separation of the oil from the sodium hydride oil dispersion. The suspension is then filtered with suction, and the filter cake triturated three times with 100 ml. portions of hot hexane to extract impurities. The washed solid is next stirred with 200 ml. water, filtered, and then digested with 500 ml. refluxing methanol for 20 minutes, to effect further purification. 15–16 grams of bright yellow needles are obtained. The product melts at 200–205° C. and exhibits no carbonyl absorption below 6μ. In 0.01 N methanolic HCl it exhibits ultraviolet absorption maxima at 406 mμ ($\epsilon$=14,200) and at 275–290 mμ ($\epsilon$=5,940). In 0.01 N methanolic NaOH it exhibits maxima at 423 mμ ($\epsilon$=13,950) and at 340 mμ ($\epsilon$=7,120).

EXAMPLE X 2-carbomethoxy-6-chloro-7-methoxy-3,4,10-trioxo-1,2,3,4,4a,9,9a,10-octahydroanthracene 2 - (2 - carbomethoxyethyl) - 6-chloro-7-methoxy-4-tetralone, prepared in Example VII, 30 g., is dissolved in 24 g. dimethyl oxalate in 300 ml. dry distilled dimethyl formamide by warming. The solution is then cooled under nitrogen in an ice-salt bath and 19.86 g. sodium hydride (51.2% in oil) added all at once as the temperature is maintained below 20° C. The ice bath is removed and the temperature rises spontaneously to 30° C., whereupon the bath is replaced briefly to control the vigorous reaction. The reaction mixture is then heated to 70–80° C. for 5–8 minutes, cooled to below 0° C., and treated with 100 ml. acetic acid, added at such rate that the temperature does not reach 25° C. The reaction mixture is now poured into four volumes of chloroform. The chloroform solution is washed with water, then with saturated brine, and dried over anhydrous sodium sulfate. The solvent is removed in vacuo, and the residue is treated with 350 ml. methanol. After standing for several hours at room temperature the slurry is filtered to obtain 12.5 g. yellow crystalline product, melting at 228–231° C. with decomposition and gas evolution. Recrystallization from chloroform-methanol raises the melting point to 235.6–236.8° C.

*Analysis.*—Calcd. for $C_{17}H_{15}O_6Cl$ (percent): C, 58.21; H, 4.31; Cl, 10.11. Found (percent): C, 58.53; H, 4.43; Cl, 10.10.

EXAMPLE XI 2-carbobenzyloxy-5-methoxy-8-chloro-3,4,10-trioxo-1,2,3,4,4a,9,9a,10-octahydroanthracene 2 - (2 - carboxyethyl)-5-methoxy-8-chloro-4-tetralone, 0.02 mole, is combined with 500 ml. anhydrous methanol and to this is added 0.02 mole sodium methoxide and 500 ml. benzene. The mixture is concentrated to dryness in vacuo at room temperature, then heated at 100° C. and 0.1 mm. for 10 minutes. The residue is maintained under high vacuum at room temperature for 16 hours, and the dry solid added to 50 ml. benzyl bromide together with sufficient dimethyl formamide to solubilize. The mixture is heated at 100° C. for 48 hours with stirring, then cooled and filtered. The filtrate is concentrated under reduced pressure to obtain the benzyl ester as residue. Purification is effected by washing of a chloroform solution with aqueous sodium bicarbonate.

This substance is dissolved together with 0.04 mole dibenzyl oxalate in 50 ml. dry, distilled dimethyl formamide. To this is added 0.08 mole sodium hydride in the form of a 50% oil dispersion, while maintaining the temperature at about 20–25° C. Benzyl alcohol, 0.02 mole, is added, and the mixture is heated to 80° C. for 5 minutes, then cooled to 20° C. and slowly acidified with glacial acetic acid. The reaction mixture is next evaporated to dryness under reduced pressure and the residue is taken up in chloroform. The chloroform solution is washed with water, then with brine, dried over sodium sulfate, treated with activated carbon and filtered. The filtrate is evaporated at reduced pressure to obtain the product as residue. It is purified by evaporation of the highly fluorescent, less polar eluate fraction from silicic acid chromatography in chloroform.

EXAMPLE XII 2-carbomethoxy-5-methoxy-8-chloro-3,4,10-trioxo-1,2,3,4,4a,9,9a,10-octahydroanthracene Clean sodium metal (3.68 g.) is dissolved in methanol (50 ml.) and the solution evaporated to a dry white solid in vacuo (this is most successfully carried out by using rotary vacuum equipment). Dimethyloxalate (9.44 g.) and benzene (100 ml.) are then added to the flask and refluxing is carried out for about 10 minutes under nitrogen (not all of the solids dissolve but the cake is broken up). The solution is cooled and dimethylformamide (50 ml.) then added followed by the dropwise addition of a solution of 2-(2-carboxyethyl)-5-methoxy-8-chloro-4-tetralone (Example VI) (11.3 g.) in dimethylformamide (100 ml.) during one hour at 20° under $N_2$ with stirring, and stirring at room temperature under $N_2$ is continued overnight. The solution is then poured into cold water (1 l.) and extracted twice with chloroform. The chloroform extract is discarded and the aqueous solution acidified with 10% HCl solution. The product is obtained by extraction with chloroform (3×200 ml.), backwashing once with water, drying over anhydrous $Na_2SO_4$, treatment with charcoal, filtration and evaporation of the solvent in vacuo to give a red gum (16.4 g.) which is 2-(2-carboxyethyl)-3-methyloxalyl - 5 - methoxy-9-chloro-4-tetralone.

U.V. absorption maxima in 0.01 N NaOH at 258 and 363 m$\mu$. maximum in 0.01 N HCl at 347 m$\mu$, minimum at 277 m$\mu$.

The gum gives a deep red color with ferric chloride in methanol and liberates $CO_2$ from a saturated $NaHCO_3$ solution.

The acid is esterified by dissolving in chloroform (1 l.), methanol (50 ml.) and conc. $H_2SO_4$ (10 ml.) and refluxing gently for 15 hours. The solution is cooled, poured into excess water and the chloroform layer separated. The aqueous layer is extracted with chloroform (250 ml.) and the combined chloroform extracts are backwashed twice with cold water. The extract is then dried over anhydrous sodium sulphate, treated with activated charcoal, filtered and evaporated to a red gum vacuo. This gum does not liberate $CO_2$ from saturated bicarbonate solution, and gives a deep red color with ferric chloride in methanol.

The ester product, 3.825 grams, and 1.275 g. of sodium hydride (56.5% solution in oil) are dissolved in 25 ml. of dimethylformamide. An exothermic reaction sets in with the evolution of hydrogen gas. After the evolution of gas ceases the mixture is warmed at 40° C. for ½ hour where further evolution of hydrogen gas occurs and the reaction mixture darkens. The reaction mixture is finally digested on a steam bath for 10 minutes after which it is cooled and acidified with glacial acetic acid (15 ml.). The product is then obtained by dilution of the mixture with water followed by extraction with chloroform. The dried chloroform solution is concentrated under reduced pressure to obtain a gummy residue which crystallizes on trituration in methanol. The orange-yellow crystalline product, 2-carbomethoxy-5-methoxy-8-chloro - 3,4,10 - trioxo - 1,2,3,4,4a,9,9a,10 - octahydroanthracene, (1.2 g.) melts at 196–201.5° C.

EXAMPLE XIII 2-carbomethoxy-5-hydroxy-8-chloro-3,4,10-trioxo-1,2,3,4,4a,9,9a,10-octahydroanthracene Dimethyl oxalate, 0.84 g., and 2-(2-carbomethoxyethyl)-5-hydroxy-8-chloro-4-tetralone, 2.0 g., are added to a suspension of 0.34 g. sodium hydride in 10 ml. dimethyl formamide and the mixture is heated to 70° C. for three minutes. After cooling, the reaction mixture is treated with 10 ml. acetic acid and evaporated to dryness at reduced pressure. The residual gum is triturated with water to remove sodium acetate and chromatographed on silicic acid in chloroform. The main effluent fraction is dried to a bright yellow solid which is crystallized from chloroform-hexane to provide 380 mg. product melting at 218–219.5° C.

*Elemental analysis.*—Calculated for $C_{16}H_{13}O_6Cl$ (percent): C, 56.7; H, 3.9; Cl, 10.5. Found (percent): C, 56.86; H, 3.89; Cl, 10.8.

EXAMPLE XIV

Diethyl-3-($\alpha$-hydroxy-3-methoxybenzyl)adipate

This product is obtained by treating 5 g. diethyl 3-(3-methoxybenzoyl)adipate and 2 g. 5% palladium on carbon in ethanol with 40 p.s.i. hydrogen gas at room temperature until one molar equivalent of hydrogen is consumed. The reaction mixture is filtered and concentrated at reduced pressure to obtain the product.

It is further converted to diethyl 3-($\alpha$-N,N-dimethylamino-3-methoxybenzyl)adipate in the following manner:

The $\alpha$-hydroxy benzyl adipate ester, 0.01 mole in 15 ml. dimethoxyethane, is added to a stirred mixture of 1.9 g. (0.01 mole) p-toluenesulfonyl chloride and 2.5 ml. dry pyridine in an ice bath. When the reaction subsides the mixture is permitted to warm to room temperature, stirred for three hours, and poured into 50 ml. water. The pH is adjusted to 5 and the resulting tosyl ester recovered by filtration.

The tosylate (0.0025 mole) is combined with 25 ml. dimethoxyethane and added dropwise to a stirred solution of 0.015 mole dimethylamine in 50 ml. dimethoxyethane of 0° C. After addition is complete, stirring is continued for an hour at 0° and the reaction mixture is then heated at 60° for three hours under a Dry Ice condenser. The mixture is next evaporated in vacuo and the residue washed with water to remove dimethylammonium toluenesulfonate. The product is recovered by filtration from the water. Substitution of monomethylamine for dimethylamine in this procedure provides the corresponding α-N-methylamino derivative.

EXAMPLE XV

2-(2-carbomethoxyethyl)-5-methoxy-4-tetralone 2-(2-carbomethoxyethyl) - 5 - methoxy - 8 - chloro-4-tetralone (1.5 g.) is combined with 5% palladium-on-charcoal (0.37 g.), triethylamine (0.5 g.) and methanol 270 ml. in a standard Parr hydrogenation bottle and subjected to fifty pounds of hydrogen pressure. The absorption of hydrogen levels off at approximately one molar equivalent. The catalyst is filtered off, the solution taken to dryness, and triethylamine hydrochloride is removed by washing with water. The residual white solids weigh 1.1 g. and melt at 63–66° C. After two recrystallizations from hexane and one from ether the product melts at 85–87° C.

*Analysis.*—Calcd. for $C_{15}H_{18}O_4$ (percent): C, 68.68; H, 6.92. Found (percent): C, 68.59; H, 6.98.

EXAMPLE XVI

2-(2-carboxyethyl)-7-hydroxy-4-tetralone 3-(3-methoxybenzyl)adipic acid, 22.46 g., is heated at reflux with hydriodic acid (specific gravity 1.5) for 3 hours and the methyl iodide formed is separated. The solution is evaporated in vacuo and the resulting gum triturated with cold water to yield 14.7 g. of yellow crystalline product. Dried and recrystallized from aqueous acetone the product is obtained in the form of white crystals melting at 183.5–185.5° C. Elemental analysis, calculated for $C_{13}H_{14}O_4$: C, 66.65; H, 6.02. Found (percent): C, 66.60; H, 6.02.

The same product is obtained by refluxing a mixture of 0.5 g. of the 3-(3-methoxybenzyl)adipic acid with 25 ml. 48% HBr for 18 hours, then pouring the reaction mixture into 3 volumes of water, and filtering the resulting 0.4 g. of crystalline precipitate.

EXAMPLE XVII

2-(2-carbomethoxyethyl)-5-methoxy-8-nitro-4-tetralone

One gram of the Example XV product is slowly added to 10 ml. of concentrated sulfuric acid containing 2 ml. of 70% nitric acid at a temperature of 0°–5° C. The solution is stirred for 15 minutes and allowed to warm to room temperature. The mixture is poured into ice-water mixture and extracted with chloroform, the chloroform layer separated, dried and concentrated to obtain the product.

EXAMPLE XVIII

2-(2-carboxyethyl)-5-hydroxy-8-amino-4-tetralone

One molecular proportion of aniline is dissolved in 2 N HCl, employing about 20 ml. thereof per gram of aniline, and the solution treated with one moelcular proportion of $NaNO_2$ at 0° to 10° C. The benzenediazonium chloride solution is then mixed with stirring at 0° to 20° C. with an aqueous solution of 2-(2-carboxyethyl)-5-hydroxy-4-tetralone sodium salt and sufficient sodium carbonate to neutralize the excess HCl in the diazotised aniline solution. The pH of the solution is in the range 8–10. Stirring is continued at 0° for approximately two hours after which careful neutralization of the reaction mixture yields the 8-phenylazo compound. The product is collected on a filter, washed and dried.

One part by weight of 2-(2-carboxyethyl)-5-hydroxy-8-phenylazo-4-tetralone is mixed with 20 parts by weight of methanol and 1/3 part by weight of 5% palladium-on-carbon catalyst is added to the mixture which is then hydrogenated at 30–45 p.s.i. of hydrogen gas in a conventional shaker apparatus at 30° C. until two molar equivalents of hydrogen are taken up.

After filtration, the product is recovered by high vacuum distillation of the residue obtained by removal of the solvent in vacuo. Care must be exercised to protect the amino phenol from air. It can be stabilized by acetylation, as follows:

The crude amine is placed in 20 parts water containing one molar equivalent of HCl, and 2.2 molar equivalents of acetic anhydride are added. Sufficient sodium acetate is then added to neutralize the HCl and the solution is warmed to 50° C. After 5 minutes the mixture is cooled and the crude acetate separated by filtration. The solid is then dissolved in cold 5% sodium carbonate solution and reprecipitated with 5% HCl. The 2-(2-carboxyethyl)-5-hydroxy-8-N-acetylamino-4-tetralone obtained in this manner is a preferred form of the amino compound for further reaction sequences.

EXAMPLE XIX

3-(2-amino-5-hydroxybenzyl)adipic acid

The procedure of Example XVII is repeated using 3-(3-hydroxybenzyl)adipic acid as starting compound to obtain this product. It may be converted to the product of Example XVIII by the ring closure procedure of Example VI.

EXAMPLE XX

3-(2-chloro-5-hydroxybenzyl)adipic acid

Three parts by weight of the product of Example XIX (obtained by evaporating the methanol) is protected from air, immediately mixed with 10 parts by weight of 10% aqueous hydrochloric acid at 0° C., and diazotized by gradual addition of 20% aqueous sodium nitrile solution. Addition of sodium nitrate is continued until a positive starch iodide test on a few drops of the reaction mixture is obtained in the convention fashion. The resulting solution is then added to 15 parts of a boiling 10% solution of cuprous chloride in aqueous hydrochloric acid. The mixture is boiled for 10 minutes and allowed to cool. The product separates from the cooled mixture and is collected in the conventional manner.

EXAMPLE XXI

3-[α-(2-chloro-5-methoxyphenyl)ethyl]adipic acid diethyl ester

To a solution of 3-(2-chloro-5-methoxybenzoyl)adipic acid diethyl ester in dimethoxyethane is added dimethoxyethane solution containing a molar equivalent of methyl magnesium bromide. After standing for 30 minutes the reaction mixture is acidified cautiously with ice and aqueous 6 N, HCl, and extracted with methylene chloride. The extracts are combined, washed with water, dilute aqueous sodium bicarbonate and water, dried and concentrated under reduced pressure to obtain 3[α-hydroxy-α-(2-chloro-5-methoxy-phenyl)ethyl]adipic acid diethyl ester.

The α-hydroxy product, 2 g., is dissolved in 150 ml. of glacial acetic acid and hydrogenated at a pressure of 40 p.s.i. of hydrogen gas for 24 hours at room temperature in the presence of 2 g. of 5% palladium-in-carbon catalyst. The mixture is filtered and then concentrated. The product is obtained by vacuum distillation of the residue.

EXAMPLE XXII

3-[α-(3-methoxyphenyl)ethyl]adipic acid

To a solution, under nitrogen, of 3-(3-methoxy benzoyl) adipic acid (100 g., 0.36 mole) in 500 ml. of tetrahydrofuran, there is added dropwise with stirring 600 ml. of a 3-molar solution of methyl magnesium bromide in ether (Arapahoe) over a 30-minute period with cooling. A heavy precipitate and gas evolution results. The mixture is refluxed for 3 hours and then kept at room temperature overnight. The mixture 10% aqueous ammonium chloride is cautiously added with cooling until all solids dissolve. Concentrated hydrochloric acid (200 ml.) is then added and the oil which separates extracted with chloroform. The chloroform extract is washed with water then dried over sodium sulphate and evaporated to give a clear gum (90 g.) which in the infrared region exhibits carbonyl absorption bonds at $5.67\mu$, $5.81\mu$ and $5.84\mu$. Maxima occur in the ultraviolet region at $273\mu$ and $280\mu$ with $E_{1\%}^{1\text{ cm.}}$ values of 3,900 and 3,600 respectively.

The gum thus obtained (70 g.) is refluxed in a mixture of 250 ml. methanol, 2000 ml. chloroform and 10 ml. concentrated sulfuric acid for 3 hours. The solution is then distilled at atmospheric pressure to about one half volume and the concentrate diluted with water, the chloroform phase separated, dried and evaporated in vacuo to give 68 g. of a gum. (Infra red carbonyl absorption at 5.68 and $5.78\mu$.) Distillation of the gum give a main fraction boiling at 202°–206° C. at 3 mm., $n_D^{24}=1.5281$. Redistillation at 1 mm. gave 25 g. of product B.P. 180°–184° C. (IR carbonyl absorption at $5.66\mu$ and $5.74$–$5.75\mu$, split peak).

Hydrogenation of 5 grams of this compound in 30 ml. acetic acid over 5% palladium on carbon at 40 p.s.i. hydrogen pressure in a Parr shaker at 50° C. until 1 mole of hydrogen is taken up produces the desired product. It is isolated by filtration, subsequent concentration of the reaction mixture and distillation in vacuo.

EXAMPLE XXIII

3,3′,4-trimethoxybenzophenone

A mixture of 40 g. of 3-methoxybenzoyl chloride, 32 g. of veratrole and 250 ml. of carbon disulfide in a 3 neck round bottom flask fitted with reflux and stirrer is cooled to 0° C. Then 40 g. of aluminum chloride is added portionwise to the cooled mixture and the mixture stirred for 45 minutes, after which it is allowed to warm to room temperature. A vigorous reaction ensues with the separation of a yellow precipitate. The mixture is carefully warmed on a steam bath and stirred for 1½ hours. Water is then added to the cooled mixture and the carbon disulfide is steam distilled off. The resultant mixture is then extracted with chloroform and the chloroform layer separated, washed with dilute hydrochloric acid, followed by dilute sodium hydroxide and then dried and concentrated under reduced pressure. The residual oil is distilled to obtain the product, B.P. 216–218° C. at 1.5 mm. mercury. A 65% yield of product is obtained. The viscous product is stirred in absolute methanol and crystallizes, M. 85–86° C.

EXAMPLE XXIV

3,3′,4-trimethoxydiphenylmethane

*Method A.*—A solution of 5 g. of 3,3′,4-trimethoxybenzophenone in 200 ml. of ethanol containing 1 g. of copper chromium oxide is hydrogenated at 180° C. and 100 atmospheres of hydrogen gas for 1.5 hours. The resultant solution is filtered and concentrated under reduced pressure. The residual oil is distilled to obtain the product B.P. 192–194° C. at 2.5 mm. mercury. The product crystallizes on standing, the melting point of the crystals being 45–46° C. Elemental analysis gives the following results:

Calcd. for $C_{16}H_{18}O_3$ (percent): C, 74.39; H, 7.02. Found (percent): C, 74.50; H, 7.18.

*Method B.*—This product is also obtained by hydrogenation of the starting compound of Method A using 10% palladium on carbon in ethanol at 50° C. and 40 p.s.i. of hydrogen gas. The hydrogenation procedure is also carried out at room temperature, although the uptake of hydrogen is considerably slower than at 50° C. The product is obtained by filtration and concentration of the hydrogenation mixture.

EXAMPLE XXV

3,3′,4-trihydroxydiphenylmethane

Two grams of 3,3′,4-trimethoxydiphenylmethane are dissolved in 10 ml. of acetic acid and 10 ml. of 48% hydrobromic acid and the mixture refluxed for 5 hours. The reaction mixture is concentrated under reduced pressure to obtain a residual gum which is vacuum-distilled (B.P. 230° C. at 0.5 mm. of mercury). The distillate, a colorless gum, crystallizes. A 62% yield of product is obtained, M. 103.5–104° C.

EXAMPLE XXVI

3-(3-hydroxybenzyl)hexa-2,4-dienedioic acid

A mixture of 3.5 g. of 3,3′4-trihydroxydiphenylmethane in 50 ml. of acetone and 50 ml. of 10% aqueous sodium hydroxide is cooled to 0° C. Thirty ml. of 35% aqueous hydrogen peroxide solution is then added dropwise, the mixture turning pale pink after 5 to 10 minutes. An exothermic reaction occurs with considerable boiling and foaming. The mixture is allowed to stand for 1 hour and is then extracted with ethyl acetate, the extract being discarded. The aqueous solution is then acidified and extracted with ethyl acetate. Concentration of the ethanol acetate extract after drying gives the product as a gummy residue.

EXAMPLE XXVII

3-(3-hydroxybenzyl)adipic acid

The product of the preceding example (105 mg.) is dissolved in 13 ml. of ethanol containing 1 drop of concentrated hydrochloric acid and hydrogenated over platinum oxide at 1 atmosphere of hydrogen gas at room temperature. The hydrogen uptake is exactly 2 molecular equivalents. Filtration and concentration of reaction mixture gives the product.

EXAMPLE XXVIII

3-(3-methoxybenzyl)adipic acid dimethyl ester

The acid product of the preceding example is dissolved in aqueous sodium hydroxide (4 molar equivalents) and agitated with 3 molar equivalents of dimethyl sulfate at 40° C. for 6 hours. The resultant solution is then diluted with water and extracted with chloroform. The chloroform layer is separated, dried and concentrated under reduced pressure to yield an oil, B.P. 205 to 210° C. at 0.2 mm. mercury. This product is also obtained by treatment of the starting compound with diazomethane in diethyl ether.

In a similar manner the corresponding ethyl and propyl esters are prepared.

EXAMPLE XXIX

3-(3-methoxybenzyl)hexa-2,4-dienedioic acid

Five grams of 3,3′4-trimethoxydiphenylmethane are dissolved in 50 ml. of acetic acid containing about 10 drops of water and ozonized air containing about 4% $O_3$ is then passed into the mixture for 1.5 hours (total of about 6 moles of ozone). The resultant yellow solution is poured into 1 liter of water and extracted with chloroform. The chloroform layer is separated, washed with aqueous sodium bicarbonate solution and concentrated under reduced pressure. The residue is dissolved in ethanol containing 2 g. of KOH and the mixture allowed to stand at room temperature for 2 days after which it is diluted with water and extracted with chloroform. After separation of the chloroform layer the aqueous alkaline solution is acidified with dilute hydrochloric acid and extracted with chloroform. Concentration of the chloroform extract gives the acid product.

The methyl, ethyl and propyl diesters of this acid are prepared by refluxing the acid for 3 days in ethylene dichloride containing the appropriate alcohol and sulfuric acid.

EXAMPLE XXX

3-(3-methoxybenzyl)adipic acid dimethyl ester

The ester of the preceding example is hydrogenated in ethanol over 10% palladium on carbon at 1 atmosphere of hydrogen gas at room temperature. The theoretical uptake of hydrogen gas (2 molar equivalents) is very rapid. The product is obtained by filtration and concentration of the hydrogenation mixture.

In similar fashion the corresponding free acid is obtained by hydrogenation of the free acid of the preceding example.

EXAMPLE XXXI

The following monoester compounds are prepared by reduction of corresponding benzoyl diesters according to the methods of Example I. The free adipic acid derivatives are prepared by the methods of Example II from the corresponding benzoyl adipic acids. The products are subsequently converted to the corresponding diesters by conventional procedures, e.g. Example II, Method B.

3-benzyladipic acid monoethyl ester
3-(2-ethyl-5-hydroxybenzyl)adipic acid monoethyl ester
3-(2-chloro-5-methoxybenzyl)adipic acid monomethyl ester
3-(2-dimethylamino-5-methoxybenzyl)adipic acid monomethyl ester
3-(2-amino-5-methoxybenzyl)adipic acid
3-(2-acetamido-5-methoxybenzyl)adipic acid
3-(3-hydroxy-benzyl)adipic acid monoethyl ester
3-(3-methyl-5-hydroxybenzyl)adipic acid monoethyl ester
3-(2,3-dimethyl-5-hydroxybenzyl)adipic acid monoethyl ester
3-(2-methyl-5-hydroxybenzyl)adipic acid monoethyl ester
3-(3-dimethylamino-5-hydroxybenzyl)adipic acid monoethyl ester
3-(2,3-dimethylbenzyl)adipic acid monomethyl ester
3-(3,5-dimethoxybenzyl)adipic acid monoethyl ester
3-(3-hydroxybenzyl)adipic acid monoethyl ester
3-(3-isopropyl-5-hydroxybenzyl)adipic acid monoethyl ester
3-(2,3-diethyl-5-hydroxybenzyl)adipic acid monoethyl ester
3-(5-benzyloxybenzyl)adipic acid monoethyl ester
3-(2-chloro-5-benzyloxybenzyl)adipic acid monoethyl ester
3-(3-propionyloxybenzyl)adipic acid monoethyl ester
3-(3-acetyloxybenzyl)adipic acid monoethyl ester
3-(2-amino-5-benzyloxybenzyl)adipic acid monobenzyl ester
3-(2-propyl-5-propoxybenzyl)adipic acid monomethyl ester
3-(2-methoxy-3,5-ditrifluoromethylbenzyl)adipic acid monomethyl ester
3-(2-trifluoromethyl-3,5-dibutoxybenzyl)adipic acid monoethyl ester
3-(2-trifluoromethyl-3-ethylamino-5-methoxybenzyl)adipic acid monoethyl ester
3-(3-butyrylamidobenzyl)adipic acid monoethyl ester
3-(2-trifluoromethyl-5-hydroxybenzyl)adipic acid monobenzyl ester
3-(2-chloro-5-hydroxybenzyl)adipic acid monobenzyl ester
3-(2-chloro-3-methyl-5-hydroxybenzyl)adipic acid monoethyl ester
3-(2-chloro-3-isopropyl-5-hydroxybenzyl)adipic acid monomethyl ester
3-(2-chloro-3-amino-5-hydroxybenzyl)adipic acid monoethyl ester
3-(2-chloro-3-methyl-5-methoxybenzyl)adipic acid monobenzyl ester
3-(2-chloro-3-ethyl-5-methoxybenzyl)adipic acid monobenzyl ester
3-(2-chloro-3-dimethylamino-5-hydroxybenzyl)adipic acid
3-(3,5-dimethoxybenzyl)adipic acid monoethyl ester
3-(2-methylamino-5-propoxybenzyl)adipic acid monoethyl ester
3-(2-methyl-5-hydroxybenzyl)adipic acid
3-(2-amino-5-benzyloxybenzyl)adipic acid monomethyl ester
3-(3-acetamido-5-hydroxybenzyl)adipic acid monomethyl ester
3-(2-chloro-3,5-dihydroxybenzyl)adipic acid monomethyl ester
3-(3-trifluoromethyl-5-hydroxybenzyl)adipic acid monoethyl ester
3-(3-hydroxybenzyl)adipic acid monoethyl ester The corresponding diesters are prepared by esterification of these compounds with the selected alcohol by the usual method.

Those compounds having a benzyloxy substituent are reduced by the procedures of Methods A or C of Example II. Of course, the procedure of Example II, Method A, results in hydrolysis of the ester groups and necessitates re-esterification.

Those compounds having a benzyloxy substituent are reduced by the procedures of Methods A or C of Example II. Of course, the procedure of Example II, Method A, results in hydrolysis of the ester groups and necessitates re-esterification.

EXAMPLE XXXII

Alpha-hydroxybenzyladipic acid compounds corresponding to the products of Example XXXI are prepared by hydrogenation of corresponding benzoyladipic acid compounds according to the method of Example XIV.

EXAMPLE XXXIII

The procedure of Example XXI is repeated to produce the following compounds from corresponding benzoyladipic acid compounds using lower alkyl-magnesium halides via the precursor α-hydroxy compounds.

The α-hydroxy substituted intermediates are hydrogenolyzed to afford the following compounds:

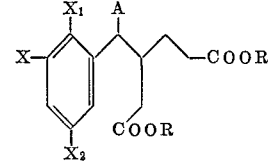

| X | $X_1$ | $X_2$ | A | R |
|---|---|---|---|---|
| H | H | H | Me | Et |
| H | 2-Et | 5-OMe | Me | Et |
| H | 2-Cl | 5-OH | Me | Me |
| N | 2-NMe₂ | 5-OMe | Me | Me |
| N | 2-NH₂ | 5-OMe | Me | Me |
| N | 2-NHCOMe | 5-OMe | Et | Me |
| 3-OH | H | H | Me | Et |
| 3-Me | H | 5-OH | Me | Et |
| 3-OMe | H | 5-OMe | Me | Et |
| 3-OMe | H | H | Et | Et |
| H | 2-Cl | 5-OMe | Et | Et |
| H | 2-Cl | 5-OMe | Pr | Et |
| 3-OMe | H | 5-OBz | Me | Et |
| H | 2-Cl | 5-OBz | Me | Et |
| 3-NHCOMe | H | H | Me | Et |
| 3-OMe | H | 5-OMe | Pr | Me |
| 3-OMe | H | H | Pr | Me |
| 3-OBz | H | 5-OBz | Me | Et |
| 3-NMe₂ | H | 5-OH | Et | Me |
| 3-i-Pr | 2-Cl | 5-OH | Et | Me |
| 3-NEt₂ | H | 5-OMe | Me | Bz |
| H | 2-NH₂ | 5-OBz | Me | Me |
| H | 2-CF₃ | 5-OMe | Me | Et |
| H | 2-CF₃ | H | Me | Et |
| 3-NMe₂ | H | 5-OMe | Me | Bz |
| 3-NHMe | H | 5-OMe | Me | Me |
| H | H | 5-OEt | Me | Me |
| H | H | 5-OCOMe | Et | Me |
| H | H | 5-OCOBu | Me | Me |
| H | 2-Pr | 5-OPr | Me | Et |
| H | 2-HCOMe | 5-OMe | Me | Me |
| H | 2-Cl | 5-OMe | Me | Me |
| 3-i-Pr | H | 5-OMe | Et | Me |

In the case of the precursors to the compounds listed above which possess an active hydrogen, 2.5 moles of Grignard reagent are employed.

The compounds containing an amino-substituent are isolated from the reaction mixture by the substitution of saturated aqueous ammonium chloride for 6N HCl.

EXAMPLE XXXIV

The procedure of Example XXII is repeated to produce the following 3-(substituted benzyl) adipic acid derivatives from the appropriate reactants.

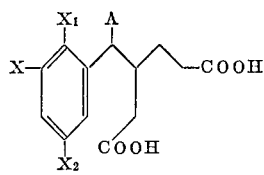

| X | $X_1$ | $X_2$ | A |
|---|---|---|---|
| H | 2-Cl | 5-OBz | Me |
| 3-OMe | H | H | Me |
| H | 2-Cl | 5-OBz | Me |
| 3-OMe | H | H | Me |
| 3-OH | H | H | Me |
| 3-Et | 2-Cl | 5-OMe | H |
| 3-NHCOMe | H | H | Me |
| 3-OMe | H | H | Pr |
| 3-OMe | H | 5-OMe | Pr |
| 3-OBz | H | 5-OMe | Me |
| 3-NHCOMe | H | 5-OMe | Me |
| 3-NMe$_2$ | H | 5-OH | Et |
| H | H | H | Me |
| H | 2-Et | 5-OMe | H |
| H | 2-NMe$_2$ | 5-OMe | Me |
| H | 2-NH$_2$ | 5-OMe | Me |
| H | 2-NHCOMe | 5-OMe | H |
| H | 2-Cl | 5-OH | Me |
| 3-Me | H | 5-OH | Et |
| 3-i-Pr | 2-Cl | 5-OH | Et |
| 3-Et | 2-Et | 5-OH | H |
| H | 2-NHCOMe | 5-OMe | H |
| 3-NEt$_2$ | H | 5-OMe | Me |
| 3-Me | H | 5-OMe | Me |
| H | 2-NH$_2$ | 5-OBz | H |
| 3-OEt | H | 5-OEt | MeOCH$_2$ |
| 3-CF$_3$ | H | 5-OMe | H |
| H | 2-Cl | 5-OPr | H |
| H | 2-Cl | 5-OBz | H |
| H | 2-CF$_3$ | H | Me |
| H | 2-CF$_3$ | 5-OMe | Me |
| 3-Et | 2-Et | 5-OH | H |
| 3-NMe$_2$ | H | 5-OMe | Me |
| H | H | 5-OMe | H |
| 3-Et | H | 5-OMe | H |
| H | H | 5-OCOBu | Me |
| H | H | 5-OCOMe | Et |
| H | H | 5-OEt | Me |
| H | H | 5-OMe | MeOCH$_2$ |
| 3-OMe | H | 5-OMe | Me |
| 3-OCOMe | H | 5-OMe | H |
| 3-Me | H | 5-OH | Me |
| 3-NH$_2$ | 2-Cl | 5-OMe | H |
| 3-NMe$_2$ | 2-Cl | 5-OH | H |
| H | 2-Cl | 5-OH | MeOCH(Me) |
| H | 2-Cl | 5-OMe | MeOCH$_2$ |
| H | H | 5-OH | Me |
| 3-NHMe | H | 5-OMe | Me |
| 3-CF$_3$ | 2-CF$_3$ | 5-OMe | H |
| 3-NHEt | 2-CF$_3$ | 5-OMe | H |
| 3-NHCOPr | H | H | Me |
| 3-OCOEt | 2-Me | H | EtOCH(CH$_3$) |
| H | 2-Pr | 5-OPr | Me |
| 3-Me | 2-Me | 5-OH | H |
| 3-i-Pr | H | 5-OH | H |
| H | 2-Cl | 5-OMe | Et |
| H | 2-Cl | 5-OMe | Pr |
| 3-OMe | H | H | Et |
| H | 2-NHCOMe | 5-OMe | Me |
| H | 2-Cl | 5-OMe | Me |
| 3-i-Pr | H | 5-OMe | Et |
| H | H | 5-OCOEt | H |
| H | 2-Cl | 5-OCOMe | H |
| 3-NH$_2$ | H | 5-OBz | H |

Those compounds wherein A is B$_2$OCH(B$_3$)— are prepared by the procedure of Example LV.

The aromatic chloro compounds can be subsequently hydrogenolyzed to the corresponding deschloro compounds by the procedure of Example XV.

Those compounds of the above list which contain no amino or hydroxy groups are also prepared by the methods of Example V.

EXAMPLE XXXV

The following substituted tetralones are prepared according to the methods of Example VI by ring closure of the corresponding precursor compounds.

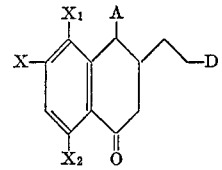

| X | $X_1$ | $X_2$ | A | D |
|---|---|---|---|---|
| H | 8-Cl | 5-OBz | Me | COOBz |
| 7-OMe | H | H | Me | COOEt |
| 7-OH | H | H | Me | COOEt |
| 7-Et | 8-Cl | 5-OMe | H | COOBz |
| 7-NHCOMe | H | H | Me | COOH |
| 7-OMe | H | H | Pr | COOMe |
| 7-OMe | H | 5-OMe | Pr | COOMe |
| 7-OBz | H | 5-OBz | Me | COOEt |
| 7-NHCOMe | H | 5-OMe | Me | CN |
| 7-NMe$_2$ | H | 5-OH | Et | COOMe |
| H | H | H | Me | COOEt |
| H | 8-Et | 5-OMe | H | CN |
| H | 8-NMe$_2$ | 5-OMe | Me | COOBz |
| H | 8-NH$_2$ | 5-OMe | Me | COOBz |
| H | 8-NHCOMe | 5-OMe | H | COOPr |
| H | 8-Cl | 5-OH | Me | COOBz |
| 7-Me | H | 5-OH | Et | COOEt |
| 7-i-Pr | 8-Cl | 5-OH | Et | COOH |
| 7-Et | 8-Et | 5-OH | H | COOH |
| H | 8-NHCOMe | 5-OMe | H | COOH |
| 7-NEt$_2$ | H | 5-OMe | Me | COOBz |
| 7-Me | H | 5-OMe | Me | COOBz |
| H | 8-NH$_2$ | 5-OBz | H | COOMe |
| 7-OEt | H | 5-OEt | MeOCH$_2$ | COOMe |
| 7-CF$_3$ | H | 5-OMe | H | COOMe |
| H | 8-Cl | 5-OPr | H | COOEt |
| H | 8-Cl | 5-OBz | H | COOEt |
| H | 8-CF$_3$ | H | Me | COOEt |
| H | 8-CF$_3$ | 5-OMe | Me | COOEt |
| 7-Et | 8-Et | 5-OH | H | COOMe |
| 7-NMe$_2$ | H | 5-OMe | Me | COOBz |
| H | H | 5-OMe | H | COOEt |
| 7-Et | H | 5-OMe | H | COOEt |
| 7-OCOMe | H | 5-OMe | H | COOH |
| 7-Me | H | 5-OH | Me | COOBz |
| 7-NH$_2$ | 8-Cl | 5-OMe | H | COOBz |
| 7-NMe$_2$ | 8-Cl | 5-OH | H | COOH |
| H | H | 5-OCOBu | Me | COOMe |
| H | H | 5-OCOMe | Et | COOMe |
| H | H | 5-OEt | Me | COOMe |
| H | H | 5-OMe | MeOCH$_2$ | COOEt |
| H | 8-Cl | 5-OH | MeOCH(Me) | COOMe |
| H | 8-Cl | 5-OMe | MeOCH$_2$ | COOMe |
| H | H | 5-OH | Me | CN |
| 7-NHMe | H | 5-OMe | Me | COOMe |
| 7-CF$_3$ | 8-CF$_3$ | 5-OMe | H | COOMe |
| 7-NHEt | 8-CF$_3$ | 5-OMe | H | COOMe |
| 7-NHCOPr | H | H | Me | COOBz |
| 7-OCOEt | 8-Me | H | EtOCH(Me) | COOBz |
| H | 8-Pr | 5-OPr | Me | COOEt |
| 7-Me | 8-Me | 5-OH | H | COOEt |
| 7-i-Pr | H | 5-OH | H | COOMe |
| 7-OMe | H | 5-OMe | Me | COOMe |
| H | 8-Cl | 5-OMe | Et | COOMe |
| H | 8-Cl | 5-OMe | Pr | COOMe |
| 7-OMe | H | H | Et | COOMe |
| H | 8-NHCOMe | 5-OMe | Me | COOMe |
| H | 8-Cl | 5-OMe | Me | COOEt |
| 7-i-Pr | H | 5-OMe | Et | COOPr |
| H | H | 5-OCOEt | H | COOEt |
| H | 8-Cl | 5-OCOMe | H | COOMe |
| 7-NH$_2$ | H | 5-OBz | H | COOMe |

The aromatic chloro compound can be subsequently hydrogenolyzed to the corresponding deschloro compounds by the procedure of Example XV.

Those compounds of the above list which contain no amino or hydroxy groups are also prepared by the methods of Example V.

EXAMPLE XXXVI

Example XXXV products and other analogous products prepared as described herein, as lower alkyl or benzyl esters or nitriles, are condensed with diethyl oxalate according to the method of Example IX to obtain 3,4,10-trioxoanthracene derivatives of the general formula wherein X, $X_1$, $X_2$, A, and D are as defined in Example XXXV.

Those compounds having an active hydrogen require the use of an additional mole of sodium hydride.

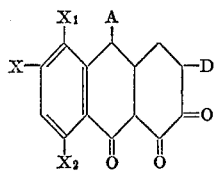

The reaction mixtures are worked up as follows: after 10 minutes, or when active bubbling ceases if this occurs sooner, the reaction mixture is chilled to 15° C. and carefully acidified with glacial acetic acid. The dimethyl formamide and excess acetic acid are then removed in vacuo and the residue partitioned between water and chloroform. The aqueous phase is re-extracted with chloroform, the combined chloroform extracts treated with activated carbon, dried, and filtered. The chloroform solution is chromatographed on silicic acid or acid-washed Florisil. The highly fluorescent product fraction is collected and evaporated to obtain the desired substance.

Ether substituents are converted to hydroxy groups by HBr cleavage; and acylamido groups to amino groups by hydrolysis.

EXAMPLE XXXVII 5-methoxy-8-chloro-3,4,10-trioxo-1,2,3,4,4a,9,9a,10-octahydroanthracene

*Method A.*—A mixture of 10 g. of the ester product of Example XII, 250 ml. of glacial acetic acid, 125 ml. conc. HCl and 25 ml. of water is heated at 95° C. for 1 hour. During the first 45 minutes considerable effervescence occurs and the suspended matter gradually dissolves to give a deep red-brown solution. The reaction mixture is then poured into 2 liters of cold water and extracted with chloroform. The combined extracts are washed with water, decolorized with activated carbon, dried and evaporated to an orange-crystalline solid (6.9 g.) which melts at 171–172.8° C. After recrystallization from acetone-hexane, the product melts at 172–173° C.

*Method B.*—The 2-carbobenzyloxy compound (5 g.) corresponding to that of Example XII is treated with hydrogen gas at room temperature in acetic acid and in the presence of 0.5 g. of 5% palladium on carbon at 50 p.s.i.g. until one molar equivalent of gas is taken up. The product is obtained by filtration and concentration of the reaction mixture after warming to 60° C. for 20 minutes to ensure complete evolution of carbon dioxide.

*Method C.*—The product of Example XII (3 g.) is refluxed for 3 hours in 10 ml. of acetic acid, 10 ml. of concentrated sulfuric acid and 1 ml. of water after which chloroform is added to the mixture which is then poured into excess water. The product is obtained by separation of the chloroform layer, washing, drying over sodium sulfate and concentration. A solid residue is obtained and recrystallized from methanol.

If desired, further purification is achieved by chromatography on silicic acid with chloroform elution. The product is contained in the less polar effluent fraction.

EXAMPLE XXXVIII

The products of Example XXXVI are decarboxylated (benzyl esters by hydrogenolysis according to Method B, Example XXXVII, and lower alkyl esters and nitriles by the procedure of Method C, Example XXXVII) to produce the following compounds (nitriles require a 24-hour reflux period):

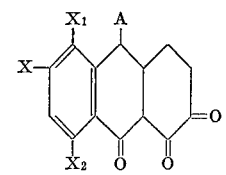

| X | $X_1$ | $X_2$ | A | D |
|---|---|---|---|---|
| H | 8-Cl | 5-OBz | Me | |
| 7-OMe | H | H | Me | |
| 7-OH | H | H | Me | |
| 7-Et | 8-Cl | 5-OMe | H | |
| 7-NHCOMe | H | H | Me | |
| 7-OMe | H | H | Pr | |
| 7-NHCOMe | H | H | Me | |
| 7-OMe | H | H | Pr | |
| 7-OMe | H | 5-OMe | Pr | |
| 7-OBz | H | 5-OBz | Me | |
| 7-NHCOMe | H | 5-OMe | Me | |
| 7-NMe2 | H | 5-OH | Et | COOMe |
| H | H | H | Me | COOEt |
| H | 8-Et | 5-OMe | H | CN |
| H | 8-NMe2 | 5-OMe | Me | COOBz |
| H | 8-NH2 | 5-OMe | Me | COOBz |
| H | 8-NHCOMe | 5-OMe | H | COOPr |
| H | 8-Cl | 5-OH | Me | COOBz |
| 7-Me | H | 5-OH | Et | COOEt |
| 7-i-Pr | 8-Cl | 5-OH | Et | COOH |
| 7-Et | 8-Et | 5-OH | H | COOH |
| H | 8-NHCOMe | 5-OMe | H | COOH |
| 7-NEt2 | H | 5-OMe | Me | COOBz |
| 7-Me | H | 5-OMe | Me | COOBz |
| H | 8-NH2 | 5-OBz | H | COOMe |
| 7-OEt | H | 5-OEt | MeOCH2 | COOMe |
| 7-CF3 | H | 5-OMe | H | COOMe |
| H | 8-Cl | 5-OPr | H | COOEt |
| H | 8-Cl | 5-OBz | H | COOEt |
| H | 8-CF3 | H | Me | COOEt |
| H | 8-CF3 | 5-OMe | Me | COOEt |
| 7-Et | 8-Et | 5-OH | H | COOMe |
| 7-NMe2 | H | 5-OMe | Me | COOBz |
| H | H | 5-OMe | H | COOEt |
| 7-Et | H | 5-OMe | H | COOEt |
| 7-OCOMe | H | 5-OMe | H | COOH |
| 7-Me | H | 5-OH | Me | COOBz |
| 7-NH2 | 8-Cl | 5-OMe | H | COOBz |
| 7-NMe2 | 8-Cl | 5-OH | H | COOH |
| H | H | 5-OCOBu | Me | |
| H | H | 5-OCOMe | Et | |
| H | H | 5-OEt | Me | |
| H | H | 5-OMe | MeOCH2 | |
| H | 8-Cl | 5-OH | MeOCH(Me) | |
| H | 8-Cl | 5-OMe | MeOCH2 | |
| H | H | 5-OH | Me | |
| 7-NHMe | H | 5-OMe | Me | |
| 7-CF3 | 8-CF3 | 5-OMe | H | |
| 7-NHEt | 8-CF3 | 5-OMe | H | |
| 7-NHCOPr | H | H | Me | |
| 7-OCOEt | 8-Me | H | EtOCH(Me) | |
| H | 8-Pr | 5-OPr | Me | |
| 7-Me | 8-Me | 5-OH | H | |
| 7-i-Pr | H | 5-OH | H | |
| 7-OMe | H | 5-OMe | Me | |
| H | 8-Cl | 5-OMe | Et | |
| H | 8-Cl | 5-OMe | Pr | |
| 7-OMe | H | H | Et | |
| H | 8-NHCOMe | 5-OMe | Me | |
| H | 8-Cl | 5-OMe | Me | |
| 7-i-Pr | H | 5-OMe | Et | |
| H | H | 5-OCOEt | H | |
| H | 8 Cl | 5-OCOMe | H | |
| 7-NH2 | H | 3-OBz | H | |

The aromatic chloro compound can be subsequently hydrogenolyzed to the corresponding deschloro compounds by the procedure of Example XV.

Those compounds of the above list which contain no amino or hydroxy groups are also prepared by the methods of Example V.

EXAMPLE XXXIX

Compounds of Structure IX are oxidized using ozone according to the method of Example XXIX to obtain acids of the formula:

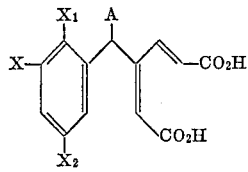

| X | X₁ | X₂ | A |
|---|----|----|---|
| H | 2-Cl | 5-OBz | Me |
| 3-OMe | H | H | Me |
| 3-OH | H | H | Me |
| 3-Et | 2-Cl | 5-OMe | H |
| 5-NHCOMe | H | H | Me |
| 3-OMe | H | H | Pr |
| 3-OMe | H | 5-OMe | Pr |
| 3-OBz | H | 5-OBz | Me |
| 3-NHCOMe | H | 5-OMe | Me |
| 3-NMe₂ | H | 5-OH | ET |
| H | H | H | Me |
| H | 2-Cl | 5-OH | MeOCH(Me) |
| H | 2-Cl | 5-OMe | MeOCH₂ |
| H | H | 5-OH | Me |
| 3-NHMe | H | 5-OMe | Me |
| 3-CF₃ | 2-CF₃ | 5-OMe | H |
| 3-Me | H | 5-OH | Et |
| 3-i-Pr | 2-Cl | 5-OH | Et |
| 3-Et | 2-Et | 5-OH | H |
| H | 2-NHCOMe | 5-OMe | H |
| 3-NEt₂ | H | 5-OMe | Me |
| 3-Me | H | 5-OMe | Me |
| H | 2-NH₂ | 5-OBz | H |
| 3-OEt | H | 5-OEt | MeOCH₂ |
| 3-CF₃ | H | 5-OMe | H |
| H | 2-Cl | 5-OPr | H |

Compounds of structure IX are oxidized with hydrogen peroxide according to the method of Example XXVI to give the same compounds.

These acids are converted to corresponding lower alkyl or benzyl esters by conventional procedures.

In the case of both oxidation procedures the acidification is effected by means of acetic acid and the product is extracted into n-butanol and recovered therefrom by evaporation.

The thus produced hexadienedioic acids and their esters are reduced to the corresponding adipic acid derivatives by the procedures of Example XXVII and XXX, respectively.

EXAMPLE XL

Methyl, ethyl and propyl esters of (3-methoxybenzoyl) acetic acid

To a mixture of 16.6 g. (0.1 mole) of methyl 3-methoxybenzoate and 10 g. (0.2 mole) of sodium hydride (48% dispersion in oil) in 300 ml. of dry dimethylformamide is added a solution of 8.0 g. of methyl acetate in 150 ml. of dry dimethylformamide dropwise with stirring at room temperature during a period of 4 hours. The mixture is then stirred for an additional two hours, after which it is acidified slowly with glacial acetic acid. The acidified mixture is poured into excess water which is next extracted with chloroform. The chloroform extract is dried over anhydrous sodium sulfate and then evaporated under reduced pressure to an oil. The residual oil is washed with hexane and distilled in vacuo to obtain 10.57 g. of the methyl ester product, B.P. 128–131° C./(0.5 mm.), $n_D^{25}=1.5428$. Infrared analysis shows characteristic peaks at 5.73 and 5.92$\mu$.

Elemental analysis gives the following results:
Calcd. for $C_{11}H_{12}O_4$ (percent): C, 63.45; H, 5.81. Found (percent): C, 63.28; H, 5.89.

The ethyl and propyl esters are prepared in the same manner (but heating at 50° C. for 15 minutes to insure complete reaction) using ethyl or propyl acetate in lieu of methyl acetate.

EXAMPLE XLI t-Butyl ester of (3-methoxybenzoyl)acetic acid

To a stirred suspension of sodamide in liquid ammonia (prepared from 11.5 g. of sodium in 400 ml. of liquid ammonia) is added 54 g. of t-butyl acetate in 50 ml. of dry ether followed by a solution of 41.5 g. of methyl-3-methoxybenzoate in 50 ml. of dry ether. The ammonia is then replaced by 100 ml. of ether and the mixture refluxed for 2 hours. After standing at room temperature for 12 hours, the mixture is poured into 400 ml. of ice water containing 28.8 ml. of acetic acid. The mixture is then extracted with ether, the etherate washed with 2% sodium bicarbonate solution and then dried over anhydrous sodium sulfate. After removal of the ether at reduced pressure, the residual oil is distilled in vacuo to obtain 33.5 g. of product, B.P. 126–128° (0.3 mm.). Infrared absorption of the product shows characteristic maxima at 5.75 and 5.90.

EXAMPLE XLII

Ethyl 3-carbomethoxy-3-(3-methoxybenzoyl)propionate

*Method A.*—To a suspension of 26 g. of sodium hydride in 250 ml. of dry dimethylformamide is added dropwise with stirring at room temperature a solution of 108 g. of the Example XL methyl ester in 250 ml. of dry dimethylformamide over a period of 45 minutes. The mixture is stirred for an additional 30 minutes and there is then added dropwise with stirring a solution of 104 g. of ethyl bromoacetate in 250 ml. of dry dimethylformamide. The mixture is allowed to stand for 12 hours and is then evaporated under reduced pressure. The residual oil is dissolved in chloroform and the solid sodium bromide filtered. The chloroform solution, after water-washing and drying over sodium sulfate, is evaporated and the residual oil distilled in vacuo to obtain 112.5 g. of product, B.P. 182–188° C. (1.4–1.5 mm.). Infrared analysis of the product shows characteristic peaks at 5.75 and 5.91 microns.

Elemental analysis gives the following results:
Calcd. for $C_{15}H_{18}O_6$ (percent): C, 61.21; H, 6.17. Found (percent): C, 61.39; H, 6.23.

Ethyl and propyl 3-carbethoxy-3-(3-methoxybenzoyl) propionate are prepared in similar fashion.

*Method B.*—To a mixture of 29 g. of methyl 3-methoxybenzoate and 15 g. of sodium hydride in 75 ml. of dry dimethylformamide is added a solution of 19 g. of dimethyl succinate in 175 ml. of the same solvent dropwise with stirring at room temperature during 12–14 hours. The mixture is carefully acidified with 25 ml. of acetic acid and stirred at room temperature for an additional 3 hours. The filtered reaction mixture is next evaporated to a residue consisting of an oil and solid which is treated with ether to dissolve the oil. The ether solution is filtered and evaporated under reduced pressure to yield 18.29 g. of dimethyl α-(3-methoxybenzoyl)succinate, B.P. 162.9° C. (0.4–0.5 mm.). Infrared analysis of the product shows characteristic peaks at 5.75 and 5.90 microns.

Elemental analysis gives the following results:
Calcd. for $C_{14}H_{16}O_6$ (percent): C, 59.99; H, 5.75. Found (percent): C, 59.91; H, 5.79.

In similar manner, the corresponding diethyl, dipropyl and di-t-butyl esters are prepared.

EXAMPLE XLIII

Ethyl 3-carbo-t-butyl-3-(3-methoxybenzoyl)propionate

A mixture of 15.8 g. of the product of Example XLI 10.5 g. of ethyl bromoacetate and 3.02 g. of sodium hydride in 130 ml. of dimethylformamide is treated as in Method A of Example XLII to obtain this product as a yellow oil. Infrared analysis of the product shows characteristic peaks at 5.75 and 5.90μ. The product is used without distillation in the procedure of Example LXVI to produce ethyl 3-[carbo-t-butoxy-3-(2-cyanoethyl)-3-(3-methoxybenzoyl)]-propionate.

EXAMPLE XLIV

Diethyl 3-carbethoxy-3-(3-methoxybenzoyl)adipate

To a mixture of 102 g. of diethyl α-(3-methoxy-benzoyl)succinate in 250 ml. of dioxane and 10 ml. of 35% solution of benzyltrimethylammonium hydroxide in methanol maintained at 50° C. is added 167 g. of ethyl acrylate in one portion with stirring. Heating and stirring are continued for 30 minutes, after which 10 ml. of glacial acetic acid is added. The mixture is evaporated under reduced pressure to a dark oil which is distilled in vacuo to yield 80.5 g. of diethyl ester product, B.P. 197° C. (0.1–0.2 mm.), $n_D^{25}$=1.5043. Infrared analysis shows characteristic peaks at 5.76 and 5.92μ.

Elemental analysis gives the following results:

Calcd. for $C_{21}H_{28}O_8$ (percent): C, 61.75; H, 6.91. Found (percent): C, 61.64; H, 6.90.

Dimethyl and dipropyl β-carbomethoxy-3-(3-methoxybenzoyl)adipate are prepared in similar fashion.

EXAMPLE XLV

Diethyl 3-carbo-t-butoxy-3(3-methoxybenzoyl)adipate

The product of Example XLIII a yellow oil, is dissolved in 80 ml. of t-butanol containing 0.75 g. of potassium t-butoxide and 19 g. of ethyl acrylate. The mixture is refluxed for 1.3 hours and then concentrated under reduced pressure to obtain the adipate ester product, a yellow viscous oil, which is used without distillation in the procedure of Method B of Example XLVII.

EXAMPLE XLVI

α-(3-methoxybenzoyl)-α-(2-cyanoethyl)succinic acid diethyl ester

This compound is prepared according to the procedure of Example XLIV using acrylonitrile or β-bromopropionitrile in lieu of ethyl acrylate. The product is vacuum distilled at 212–218° C. (0.45 mm. Hg). This product is hydrolyzed and decarboxylated to 3-(3-methoxybenzoyl) adipic acid by refluxing in aqueous acetic acid containing sulfuric acid by the procedure of Method A of Example XLVII. Corresponding esters are prepared in the usual manner.

EXAMPLE XLVII

Diethyl 3-(3-methoxybenzoyl)adipate

*Method A.*—A mixture of 25 g. of diethyl-3-carbethoxy-3-(3-methoxybenzoyl)adipate in 30 ml. of acetic acid, 10 ml. of concentrated sulfuric acid and 10 ml. of water is refluxed for 36 hours. The mixture is then poured into excess water and extracted with chloroform, the extract dried and evaporated under reduced pressure to an oil. The oil is dissolved in a mixture of 50 ml. of ethanol, 1 liter of ethylene dichloride and 6 ml. of concentrated sulfuric acid and refluxed for 12 hours. The mixture is then poured into water. The ethylene chloride layer is separated, dried and evaporated in vacuo to an oil which is distilled to obtain 5.5 g. of product, B.P. 169–172° C. (0.05 mm.), $n_D^{25}$=1.5092.

Elemental analysis gives the following results:

Calcd. for $C_{18}H_{24}O_6$ (percent): C, 64.27; H, 7.19. Found (percent): C, 64.09; H, 7.19.

In similar fashion, the dimethyl and dipropyl esters are prepared.

*Method B.*—The product of Example XLV, a yellow viscous oil, is refluxed in 120 ml. of dry xylene containing 3.0 g. of p-toluenesulfonic acid and cooled and extracted with water. The xylene solution, after drying, is concentrated under reduced pressure and the residual oil vacuum distilled to obtain 6.8 g. of product.

There is also obtained 5.86 g. of the enol lactone:

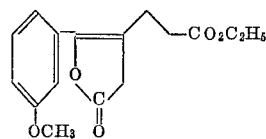

a red oil, which on infrared absorption analysis showed a maximum at 5.58μ.

As is recognized by those in the art, the product of this example is a racemic compound, DL-3-(3-methoxybenzoyl)adipic acid diethyl ester which, as the free acid, lends itself to resolutions into its optical active forms by salt formation with optically active bases such as brucine, cinchonine, cinchonidine, morphine and the like to form diastereoisomers. Such procedures are well known to those skilled in the art. Of course, the optically active forms (antipodes) after separation, may be converted one to the other, as desired, by racemization and resolution. The present compound, in one of its optically active forms, is racemized by treating it with a strong base in solvent, e.g. sodium hydride, hydroxide or alkoxide in a lower alkanol. After racemization, the desired optical form may be resolved and the procedure repeated to produce more of the desired optical form from its antipode.

EXAMPLE XLVIII

Employing the procedure of Example XL the following compounds are prepared from corresponding starting compounds. Those compounds having an active hydrogen require the use of an additional mole of sodium hydride.

methylbenzoylacetate
ethyl (2-ethyl-5-hydroxybenzoyl)acetate
methyl 2-(5-methoxybenzoyl)propionate
methyl 2-(5-methoxybenzoyl)butanoate
methyl 2-(5-methoxybenzoyl)pentanoate
methyl (2-chloro-5-methoxybenzoyl)acetate
methyl (2-dimethylamino-5-methoxybenzoyl)acetate
methyl (2-amino-5-methoxybenzoyl)acetate
methyl (2-acetamido-5-methoxybenzoyl)acetate
ethyl (5-hydroxybenzoyl)acetate
ethyl (2-methoxybenzoyl)acetate
ethyl (3-hydroxybenzoyl)acetate
ethyl (2-methyl-5-hydroxybenzoyl)acetate
ethyl (2,3-dimethyl-5-hydroxybenzoyl)acetate
ethyl (3-isopropyl-5-hydroxybenzoyl)acetate
ethyl (2,3-diethyl-5-hydroxybenzoyl)acetate
ethyl (5-benzyloxybenzoyl)acetate
ethyl (3-methyl-5-hydroxybenzoyl)acetate
ethyl (3-dimethylamino-5-hydroxybenzoyl)acetate
methyl (2,3-dimethylbenzoyl)acetate
ethyl (3,5-dimethoxybenzoyl)acetate
ethyl (2,3-diethyl-5-ethoxybenzoyl)acetate
ethyl (3-isopropyl-5-ethoxybenzoyl)acetate
methyl (2-methylamino-5-methoxybenzoyl)acetate
methyl (3-ethyl-5-methoxybenzoyl)acetate
ethyl (2-methoxy-5-benzyloxybenzoyl)acetate
ethyl (2-propyl-5-propoxybenzoyl)acetate
ethyl (3-trifluoromethyl-5-methoxybenzoyl)acetate
ethyl (3-acetoxy-5-methoxybenzoyl)acetate
propyl (3-propoxybenzoyl)acetate
benzyl (2-chloro-5-methoxybenzoyl)acetate
ethyl (3-benzyloxybenzoyl)acetate
ethyl (3-amino-5-benzyloxybenzoyl)acetate
ethyl (3-propyl-5-methoxybenzoyl)acetate
ethyl (2-isopropyl-3-ethyl-5-methoxybenzoyl)acetate
benzoyl (2-methoxy-5-ethoxybenzoyl)acetate
benzyl (2-chloro-3-methyl-5-methoxybenzoyl)acetate
ethyl (2-chloro-3-dimethylamino-5-methoxybenzoyl) acetate
methyl (2-chloro-4-acetamidobenzoyl)acetate
methyl (2-chloro-3-acetamido-5-methoxybenzoyl)acetate methyl (2,3-ditrifluoromethyl-5-methoxybenzoyl)acetate
methyl (2-methyl-3-propionyloxybenzoyl)acetate
ethyl (2-trifluoromethyl-3,5-dibutoxybenzoyl)acetate
ethyl (2-trifluoromethyl-3-ethylamino-5-methoxybenzoyl)
  acetate
ethyl (3-butyrylamidobenzoyl)acetate
ethyl (2-chloro-3-acetoxy-5-ethoxybenzoyl)acetate
ethyl (2-chloro-3,5-dihydroxybenzoyl)acetate
ethyl (3-acetamido-5-hydroxybenzoyl)acetate
ethyl (3-trifluoromethyl-5-hydroxybenzoyl)acetate

EXAMPLE XLIX

The following carbalkoxybenzoyl propionates are prepared from corresponding benzoyl acetates by reaction with α-haloacetic acid esters according to the procedure of Method A of Example XLII, as well as by the procedure of Method B, Example XLII.

ethyl 3-carbomethoxy-3-benzoylpropionate
methyl 3-carbethoxy-3-(2-ethyl-5-methoxybenzoyl)
  propionate
methyl 3-carbomethoxy-3-(3-methoxybenzoyl)butanate [1]
methyl 3-carbomethoxy-3-(3-methoxybenzoyl)
  pentanoate [1]
methyl 3-carbomethoxy-3-(3-methoxybenzoyl)
  hexanoate [1]
methyl 3-carbomethoxy-3-(2-chloro-5-methoxybenzoyl)
  propionate
methyl 3-carbomethoxy-3-(2-dimethylamino-5-methoxy-
  benzoyl)propionate
benzyl 3-carbomethoxy-3-(2-acetamido-5-methoxy-
  benzoyl)propionate
benzyl 3-carbomethoxy-3-(2-acetamido-5-methoxy-
  benzoyl)propionate
ethyl 3-carbethoxy-3-(3-methoxybenzoyl)propionate
ethyl 3-carbethoxy-3-(2,3-diethyl-5-methoxybenzoyl)
  propionate
ethyl 3-carbethoxy-3-(3-isopropyl-5-methoxybenzoyl)
  propionate
ethyl 3-carbethoxy-3-(2-methyl-5-ethoxybenzoyl)
  propionate
ethyl 3-carbethoxy-3-(3-dimethylamino-5-propoxy-
  benzoyl)propionate
methyl 3-carbomethoxy-3-(2,3-dimethylbenzoyl)
  propionate
ethyl 3-carbethoxy-3-(3-methoxybenzoyl)propionate
ethyl 3-carbethoxy-3-(2-methyl-5-methoxybenzoyl)
  propionate
ethyl 3-carbethoxy-3-(4-methyl-5-methoxybenzoyl)
  propionate
ethyl 3-carbethoxy-3-(2,3-dimethyl-5-methoxybenzoyl)
  propionate
ethyl 3-carbethoxy-3-(3-benzyloxybenzoyl)propionate
ethyl 3-carbethoxy-3-(3,5-dimethoxybenzoyl)propionate
ethyl 3-carbethoxy-3-(2,3-diethyl-5-ethoxybenzoyl)
  propionate
ethyl 3-carbethoxy-3-(3-isopropyl-5-ethoxybenzoyl)
  propionate
methyl 3-carbomethoxy-3-(2-methylamino-5-methoxy-
  benzoyl)propionate
methyl 3-carbomethoxy-3-(3-ethyl-5-methoxybenzoyl)
  propionate
ethyl 3-carbethoxy-3-(2-methoxy-5-benzyloxybenzoyl)
  propionate
ethyl 3-carbethoxy-3-(2-propyl-5-propoxybenzoyl)
  propionate
ethyl 3-carbomethoxy-3-(3-trifluoromethyl-5-methoxy-
  benzoyl)propionate
ethyl 3-carbomethoxy-3-(3-acetoxy-5-methoxybenzoyl)
  propionate
propyl 3-carbomethoxy-3-(3-propoxybenzoyl)propionate
benzoyl 3-carbomethoxy-3-(2-chloro-5-methoxybenzoyl)
  propionate
ethyl 3-carbomethoxy-3-(3-benzoyloxybenzoyl)
  propionate
ethyl 3-carbomethoxy-3-(3-amino-5-benzyloxybenzoyl)
  propionate
ethyl 3-carbomethoxy-3-(3-propyl-5-methoxybenzoyl)
  propionate
ethyl 3-carbomethoxy-3-(2-isopropyl-3-ethyl-5-methoxy-
  benzoyl)propionate
benzyl 3-carbethoxy-3-(3-methoxy-5-ethoxybenzoyl)
  propionate
benzyl 3-carbethoxy-3-(2-chloro-3-methyl-5-methoxy-
  benzoyl)propionate
ethyl 3-carbethoxy-3-(2-chloro-3-dimethylamino-5-
  methoxybenzoyl)propionate
methyl 3-carbethoxy-3-(2-chloro-4-acetamidobenzoyl)
  propionate
methyl 3-carbomethoxy-3-(2-chloro-3-acetamido-5-
  methoxybenzoyl)propionate
methyl 3-carbomethoxy-3-(2,3-ditrifluoromethyl-5-
  methoxybenzoyl)propionate
methyl 3-carbomethoxy-3-(2-methyl-3-propionyloxy-
  benzyl)propionate
ethyl 3-carbethoxy-3-(2-trifluoromethyl-3,5-dibutoxy-
  benzoyl)propionate
ethyl 3-carbethoxy-3-(2-trifluoromethyl-3-ethylamino-5-
  methoxybenzyl)propionate
ethyl 3-carbethoxy-3-(3-butyrylamidobenzoyl)propionate
ethyl 3-carbethoxy-3-(2-chloro-3-acetoxy-5-ethoxy-
  benzoyl)propionate
ethyl 3-carbethoxy-3-(2-chloro-3,5-dihydroxybenzoyl)
  propionate
ethyl 3-carbethoxy-3-(3-acetamido-5-hydroxybenzoyl)
  propionate
ethyl 3-carbethoxy-3-(3-trifluoromethyl-5-hydroxy-
  benzoyl)propionate

EXAMPLE L

The following compounds are prepared from the products of Example XLIX by the procedure of Examples XLVI and XLIV using corresponding β-bromo or α,β-unsaturated esters or nitriles.

diethyl 3-carbomethoxy-3-benzoyladipate
dimethyl 3-carbethoxy-3-(2-ethyl-5-methoxybenzoyl)adipate
dimethyl 3-carbomethoxy-3-(2-chloro-5-methoxybenzoyl)adipate
dimethyl 3-carbomethoxy-3-(2-dimethylamino-5-methoxy-
  benzoyl)adipate
dibenzyl 3-carbomethoxy-3-(2-acetamido-5-methoxyben-
  zoyl)adipate
diethyl 3-carbethoxy-3-(3-methoxybenzoyl)adipate
diethyl 3-carbethoxy-3-(2-methoxybenzoyl)adipate
diethyl 3-carbethoxy-3-(3-methyl-5-methoxybenzoyl)adipate
diethyl 3-carbethoxy-3-(3-dimethylamino-5-methoxyben-
  zoyl)adipate
dimethyl 3-carbomethoxy-3-(2,3-dimethylbenzoyl)adipate
diethyl 3-carbethoxy-3-(3-methoxybenzoyl)adipate
diethyl 3-carbethoxy-3-(2-methyl-5-methoxybenzoyl)adipate
diethyl 3-carbethoxy-3-(4-methyl-5-methoxybenzoyl)adipate
diethyl 3-carbethoxy-3-(2,3-dimethyl-5-methoxybenzoyl)
  adipate
diethyl 3-carbethoxy-3-(3-isopropyl-5-methoxybenzoyl)
  adipate
diethyl 3 - carbethoxy-3-(2,3-diethyl-5-methoxybenzoyl)
  adipate
diethyl 3-carbethoxy-3-(3-benzyloxybenzoyl)adipate
diethyl 3-carbethoxy-3-(3,5-dimethoxybenzoyl)adipate
diethyl 3-carbethoxy-3-(2,3-diethyl-5-ethoxybenzoyl)adipate
diethyl 3-carbethoxy-3-(3-isopropyl-5-ethoxybenzoyl)adipate

---

[1] The higher benzoyl alkanoates, e.g. butanoate, pentanoate and hexanoate, are prepared from the next lower homolog by the procedure of Method A, Example XLII.

dimethyl 3-carbomethoxy-3-(2-methylamino-5-methoxybenzoyl)adipate
dimethyl 3 - carbomethoxy-3-(3-ethyl-5-methoxybenzoyl)adipate
dietehyl 3-carbethoxy-3-(2-methoxy-5-benzyloxybenzoyl)adipate
diethyl 3-carbethoxy-3-(2-propyl-5-propoxybenzoyl)adipate
diethyl 3-carbomethoxy-3-(3-trifluoromethyl-5-methoxybenzoyl)adipate
diethyl 3-carbomethoxy-3-(3-acetoxy-5-methoxybenzoyl)adipate
dipropyl 3-carbomethoxy-3-(3-propoxybenzoyl)adipate
dibenzyl 3-carbomethoxy-3-(2-chloro-5-methoxybenzoyl)adipate
diethyl 3 - carbomethoxy-3-(3-benzyloxybenzoyl)adipate
diethyl 3-carbomethoxy-3-(3-amino-5-benzyloxybenzoyl)adipate
diethyl 3 - carbomethoxy-3-(3-propyl-5-methoxybenzoyl)adipate
diethyl 3-carbomethoxy-3-(2-isopropyl-3-ethyl-5-methoxybenzoyl)adipate
dibenzyl 3-carbethoxy-3-(2-methoxy-5-ethoxybenzoyl)adipate
dibenzyl 3 - carbethoxy-3-(2-chloro-3-methyl-5-methoxybenzoyl)adipate
diethyl 3-carbethoxy-3-(2-chloro-3-dimethylamino-5-methoxybenzoyl)adipate
dimethyl 3-carbethoxy-3-(2-chloro-4-acetamidobenzoyl)adipate
dimethyl 3-carbomethoxy-3-(2-chloro-3-acetamido-5-methoxybenzoyl)adipate
dimethyl 3-carbomethoxy-3-(2,3-ditrifluoromethyl-5-methoxybenzoyl)adipate
dimethyl 3-carbomethoxy-3-(2-methyl-3-propionyloxybenzoyl)adipate
diethyl 3 - carbethoxy-3-(2-trifluoromethyl-3,5-dibutoxybenzoyl)adipate
diethyl 3-carbethoxy-3-(2-trifluoromethyl-3-ethylamino-5-methoxybenzoyl)adipate
diethyl 3 - carbethoxy-3-(3-butyrylamidobenzoyl)adipate
diethyl 3-carbethoxy-3-(2-chloro-3-acetoxy-5-hydroxybenzoyl)adipate
diethyl 3 - carbethoxy-3-(2-trifluoromethyl-5-hydroxybenzoyl)adipate
diethyl 3-carbethoxy-3-(2-chloro-3,5-dihydroxybenzoyl)adipate
diethyl 3 - carbethoxy-3-(3-acetamido-5-hydroxybenzoyl)adipate
diethyl 3-carbethoxy-3-(3-trifluoromethyl-5-hydroxybenzoyl)adipate

EXAMPLE LI

The following compounds are prepared by hydrolysis and decarboxylation of corresponding 3-carbalkoxy compounds according to the procedure of Example XLVII.

methyl 3-(3-methoxybenzoyl)butanoate
methyl 3-(3-methoxybenzoyl)pentanoate
methyl 3-(3-methoxybenzoyl)hexanoate
ethyl 3-(2-methoxyethyl-5-propoxybenzoyl)butanoate

EXAMPLE LII

Diethyl 3-(3-methoxybenzoyl)adipate 3-(3-methoxybenzoyl)propionic acid ethyl ester (16.7 g.) is dissolved in 100 ml. of a 2.5 M solution of methyl magnesium carbonate in methanol and the resulting mixture refluxed for two hours. After cooling, 25 g. of ethyl β-bromopropionate is added and the mixture allowed to stand for 12 hours, after which it is acidified with concentrated HCl. Chloroform is then added and the entire mixture poured into water. The chloroform layer is separated, dried and concentrated under reduced pressure to give the product which is vacuum-distilled.

EXAMPLE LIII

Dimethyl 2-(3-methoxybenzoyl)glutarate

This compound is prepared according to the methods of Examples XLIV and XLVI using methyl (3-methoxybenzoyl)acetate as the starting compound.

In similar fashion, the following compounds are prepared from corresponding starting compounds using one equivalent of alkylating agent:

diethyl 2-benzoylglutarate
dimethyl 2-(3,5-diethylbenzoyl)glutarate
dimethyl 2-(2-ethyl-5-methoxybenzoyl)glutarate
dimethyl 2-(2-chloro-5-methoxybenzoyl)glutarate
dimethyl 2 - (2-dimethylamino-5-methoxybenzoyl)glutarate
dibenzyl 2-(2-acetamido-5-methoxybenzoyl)glutarate
diethyl 2-(3-methoxybenzoyl)glutarate
diethyl 2-(3-methyl-5-methoxybenzoyl)glutarate
diethyl 2-(3-dimethylamino-5-methoxybenzoyl)glutarate
dimethyl 2-(2,3-dimethylbenzoyl)glutarate
diethyl 2-(3-methoxybenzoyl)glutarate
diethyl 2-(2-methyl-5-methoxybenzoyl)glutarate
diethyl 2-(4-methyl-5-methoxybenzoyl)glutarate
diethyl 2-(2,3-dimethyl-5-methoxybenzoyl)glutarate
diethyl 2-(3,5-dimethoxybenzoyl)glutarate
diethyl 2-(2,3-diethyl-5-ethoxybenzoyl)glutarate
diethyl 2-(3-isopropyl-5-ethoxybenzoyl)glutarate
dimethyl 2-(2-methylamino-5-methoxybenzoyl)glutarate
dimethyl 2-(3-ethyl-5-methoxybenzoyl)glutarate
diethyl 2-(2-methoxy-5-benzyloxybenzoyl)glutarate
diethyl 2-(2-propyl-5-propoxybenzoyl)glutarate
diethyl 2-(3-trifluoromethyl-5-methoxybenzoyl)glutarate
diethyl 2-(3-acetoxy-5-methoxybenzoyl)glutarate
dipropyl 2-(3-propoxybenzoyl)glutarate
dibenzyl 2-(2-chloro-5-methoxybenzoyl)glutarate
diethyl 2-(3-benzyloxybenzoyl)glutarate
diethyl 2-(3-amino-5-benzyloxybenzoyl)glutarate
diethyl 2-(3-propyl-5-methoxybenzoyl)glutarate
diethyl 2-(2-isopropyl-3-ethyl-5-methoxybenzoyl)glutarate
dibenzyl 2-(2-methoxy-5-ethoxybenzoyl)glutarate
dibenzyl 2 - (2-chloro-3-methyl-5-methoxybenzoyl)glutarate
diethyl 2-(2-chloro-3-dimethylamino-5-methoxybenzoyl)glutarate
dimethyl 2-(2-chloro-4-acetamidobenzoyl)glutarate
dimethyl 2-(2-chloro-3-acetamido-5-methoxybenzoyl)glutarate
dimethyl 2 - (2,3-ditrifluoromethyl-5-methoxybenzoyl)glutarate
dimethyl 2-(2-methyl-3-propionyloxybenzoyl)glutarate
dibenzyl 2-(2-acetamido-5-methoxybenzoyl)glutarate
diethyl 2 - (2-trifluoromethyl-3,5-dibutoxybenzoyl)glutarate
diethyl 2-(2-trifluoromethyl-3-ethylamino-5-methoxybenzoyl)glutarate
diethyl 2-(3-butyrylamidobenzoyl)glutarate
diethyl 2-(2-chloro-3-acetoxy-5-ethoxybenzoyl)glutarate
diethyl 2-(2-trifluoromethyl-5-hydroxybenzoyl)glutarate
diethyl 2-(3-acetamido-5-hydroxybenzoyl)glutarate
diethyl 2-(2-chloro-3,5-dihydroxybenzoyl)glutarate
diethyl 2-(3-trifluoromethyl-5-hydroxybenzoyl)glutarate

EXAMPLE LIV

The compounds of Example LIII are converted to the corresponding adipic acid derivatives described in Example L by reaction with bromacetic acid ester by the procedure of Method A of Example XLII.

EXAMPLE LV

Dimethyl 3-(α-methoxymethyl-2-chloro-5-methoxybenzyl)adipate

The ylid is prepared from chloromethyl ether in the following manner: triphenylphosphine (52.4 g., 0.2 mole) is dissolved in 100 ml. anhydrous benzene and 16.1 g.

chloromethyl ether added. The mixture is heated at 50° C. for 16 hours. The resulting heavy crystalline mass is filtered off, washed with ether, dissolved in chloroform, and reprecipitated with ethyl acetate. The precipitate is then separated, washed with ether, and dried at 80° C. in high vacuum.

Triphenylmethoxymethylphosphonium chloride, 6.84 g. 0.02 mole, prepared as described above, is suspended in 65 ml. absolute ether. To this suspension is added 19.6 ml. 1.0 N phenyl lithium solution. With slight warming the mixture turns orange-red and then dark red. After five minutes there is added portionwise 0.02 mole dimethyl 3-(2-chloro-5-methoxybenzoyl) adipate in 50 ml. ether. An exothermic reaction occurs causing the ether to reflux. After stirring for 2 hours, the suspension is filtered and the separated solids washed with ether. The combined ether filtrate and washings are dried over anhydrous sodium sulfate, filtered, and evaporated, to obtain dimethyl 3 - ($\alpha$ - methoxymethylene - 2 - chloro-5-methoxybenzyl)adipate as residue. It is further purified by distillation under high vacuum.

The methoxymethylene benzyl adipate, obtained as described, is dissolved in 50 parts by weight dioxane and hydrogenated over 0.1 part 5% palladium on charcoal at 50 p.s.i. and room temperature until one molar equivalent of hydrogen has been absorbed. The hydrogenation mixture is filtered, and the filtrate evaporated to obtain the desired dimethyl 3 - ($\alpha$ - methoxymethyl - 2 - chloro-5-methoxybenzyl)adipate as residue. It is further purified by high-vacuum distillation.

Following the described procedure, the following additional adipates are prepared from the corresponding benzoyl adipates. (For these syntheses the necessary chloromethyl ethers of the formula $B_3CHClOB_2$ are obtained by treatment of aldehyde acetals of the formula $B_3CH(OB_2)_2$ with acetyl chloride, as described in Liebig's Annalen, 493, p. 203, and 498, p. 120 (1932).

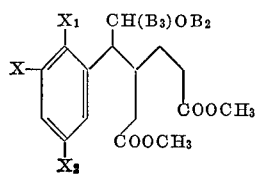

| X | $X_1$ | $X_2$ | $B_3$ | $B_2$ |
|---|---|---|---|---|
| H | 2-Cl | 5-OH | $CH_3$ | $CH_3$ |
| H | 2-NHCOCH$_3$ | 5-OEt | H | $CH_3$ |
| 5-Me | H | 3-OMe | H | n-$C_3H_7$ |
| 3-OMe | H | 5-OMe | H | $CH_3$ |
| H | 2-Me | 5-OMe | $CH_3$ | $CH_3$ |
| 3-EtCO$_2$ | 2-Me | H | $CH_3$ | $C_2H_5$ |
| H | 2-Cl | 5-OMe | H | $CH_3$ |
| H | 2-Cl | 5-OH | $CH_3$ | $CH_3$ |
| 3-Me | 2-Cl | 5-OH | $C_5H_{11}$ | H |
| H | H | 3-OMe | H | $CH_3$ |

The alkoxy alkyl ethers produced in this manner are converted to the corresponding tetralones and thence to the corresponding 9 - alkoxyalkyl - 3,4,10 - trioxo-1,2,3,4,4a,9,9a,10-octahydroanthracenes by the reaction sequences illusrated and exemplified above for the conversion of compounds of structure II to those of structure I.

The methoxymethylene benzyl adipate is also converted to an aldehyde, in the following manner: dimethyl 3 - ($\alpha$ - methoxymethylene - 2 - chloro - 5 - methoxybenzyl) adipate is warmed with a mixture of 1:10 by volume 1% aqueous hydrochloric acid:dioxane for 5 minutes at 60° C. The solvent is then removed by evaporation at reduced pressure, and the residue is converted to the bisulfite addition product by shaking with alcoholic sodium bisulfite as described in Vogel, "A Textbook of Practical Organic Chemistry" Longmans (1948) p. 330. The addition product is then hydrolyzed by treatment with 5% aqueous hydrochloric acid and the resulting dimethyl 3 - ($\alpha$ - formyl - 2 - chloro - 5 - methoxybenzyl) adipate is extracted from the aqueous acid into chloroform and recovered by evaporation of the solvent.

The dimethyl 3 - ($\alpha$ - formyl - 2 - chloro - 5 - methoxybenzyl) adipate prepared as described is hydrogenated in ethylene glycol dimethyl ether solvent at room temperature over platinum oxide catalyst until an equimolar proportion of hydrogen is consumed. The catalyst is then separated by filtration and the resulting $\alpha$ - hydroxymethyl benzyl adipate recovered by evaporation of the solvent under reduced pressure.

These $\alpha$ - alkoxyalkyl benzyl adipates are converted to 9 - alkoxyalkyl - 3,4,10 - trioxo - octahydroanthracenes of Structure IV via the corresponding tetralones of Structure III by applying in order the procedures of Examples XXXV and XXXVI.

EXAMPLE LVI 3-carbomethoxy-5-formylisoxazole (A) A solution of 5 - styryl - 3 - carbomethoxyisoxazole (50 g.) in ethylacetate (200 ml.) is cooled to —70° C. At this temperature crystallization of the isoxazole occurs. Ozonized oxygen is bubbled into the mixture at —70° C. until a clear blue solution is produced. The excess ozone is flushed out with nitrogen while the temperature is maintained at —70° C. Two grams of 5% palladium on carbon is added and hydrogen bubbled into the mixture at —70° C. for 30 minutes. The mixture is then allowed to warm to room temperature, filtered and fractionally distilled to give the product; B.P. 123° C. at 17 mm.; M.P. 72–74° C. (from hexane).

The dinitrophenylhydrazone, prepared according to standard procedure, is obtained as yellow needles from ethanol; M.P. 228° C.

(B) The carbomethoxy group is converted to other ester groups by ester interchange as follows. The 3-carbomethoxy-5-formylisoxazole is dissolved in an excess of the alcohol, the ester of which is desired. A few drops of concentrated sulfuric acid are added as catalyst and the mixture allowed to stand at room temperature for 12 hours. The entire mixture is taken up in chloroform, washed with dilute aqueous sodium bicarbonate followed by water, then dried over anhydrous sodium sulfate and stripped of solvents. The residue, the desired product, crystallizes on standing. The following esters are thus prepared: $Y_5$=methyl, n-propyl, isopropyl, n-butyl, isoamyl benzyl.

Alternatively, the 3 - carboxy - 5 - formylisoxazole esters are prepared by ozonolysis as described above, of the appropriate 5 - styryl - 3 - carboxyisoxazole ester obtained by the method described in J.C.S. 3663 (1956). The ethyl, isoamyl, n-butyl, benzyl and propyl esters are thus prepared.

EXAMPLE LVII 3-carbethoxy-5-formylisoxazole

To 5-styryl-3-carbethoxyisoxazole (10 g.) in 750 ml. of ethyl acetate at —70° C. is added ozone. A precipitate forms and then re-dissolves. The excess ozone is blown out with hydrogen gas while the temperature is maintained at —70° C. One gram of 5% palladium on carbon is added and hydrogen passed through until destruction of the ozonide is complete as indicated by the starch-iodide test. The filtered reaction mixture is concentrated under reduced pressure to obtain a residual oil which is fractionally distilled to obtain first benzaldehyde and then 3-carbethoxy-5-formylisoxazole.

The carbethoxy ester thus produced is transformed to the corresponding carbobenzoxy, carbomethoxy, carbobutoxy and carbopropoxy esters by the method of LVI–B.

EXAMPLE LXIII 3,4-dicarbethoxy-5-formylisoxazole

A solution of 21.9 g. of ethyl-$\gamma,\gamma$-diethoxyacetoacetate in dry benzene (100 ml.) is added dropwise to a suspension of sodium hydride (56%) (4.5 g.) in dry benzene (100 ml.). A vigorous evolution of hydrogen occurs and a clear solution of the sodium salt of starting compound is obtained. After 30 minutes, 15.3 g. of ethyl α-chloro-α-oximinoacetate in dry benzene (100 ml.) is added dropwise and the mixture stirred at room temperature for 12 hours. After filtration, the benzene solution is dried by azeotropic distillation. (The β-keto oxime can be obtained from this solution, if desired, and purified by molecular distillation; B.P. 130°–140° C. $2.08 \times 10^{-5}$ mm.). 1.0 g. of p-toluene-sulfonic acid is then added and the mixture refluxed for one hour while water is continuously removed with a Dean-Stark trap. After cooling, the solution is washed with water and then evaporated to give the crude diethyl acetal of 3,4-dicarbethoxy-5-formyl-isoxazole (29.6 g.) which on fractional distillation (B.P. 118° C. 0.15 mm.) gives 23.5 g. ($n_D^{25}$ 1.4545).

*Analysis.*—Calc'd for $C_{14}H_{21}NO$ (percent): C, 53.32; H, 6.71; N, 4.44; OEt, 57.2. Found (percent): C, 53.52; H, 6.77; N, 4.31; OEt, 55.10.

The diethyl acetal (171.3 g.) and 48% HBr (350 ml.) are mixed and stirred vigorously to produce a homogeneous mixture (10 minutes). The yellow solution is poured into 500 ml. of water and extracted with chloroform (4×100 ml.). The combined extracts are waterwashed and evaporated to an oil (138.4 g.; $n_D^{26}$, 1.4710) which is fractionally distilled under reduced pressure to obtain the product (105 g.): Elemental analysis of the dinitrophenylhydrazone (M.P. 164–165° C.–yellow needles) agree with the calculated values.

Alternatively, this compound is prepared from the corresponding 5-styryl-3,4-dicarbethoxyisoxazole (prepared from cinnamoyl acetic acid ethyl ester and ethyl α-chloro-α-oximino-acetate) by the procedure of Example LVII.

The following 5-formylisoxazole diesters are similarly obtained from the appropriate reactants:

| $Y_2$: | $Y_3$ |
| --- | --- |
| COOMe | COOMe |
| COOPr | COOPr |
| COOBu | COOBu |
| COO-i-Pr | COO-i-Pr |
| COOBz | COOBz |
| COOMe | COOBz |
| COOBz | COOEt |
| COOMe | COOPr |

By application of the ester interchange reaction of Example LVI–B to 3,4-dicarbethoxy-5-formylisoxazole the corresponding methyl, propyl, benzyl, butyl, isopropyl and isoamyl esters are prepared.

EXAMPLE LIX

Carboxylic acid derivatives of 5-formylisoxazoles

To 3,4-dicarbobenzoxy-5-formylisoxazole (1 g.) in dimethoxyethane (15 g.) is added 0.5 g. of 5% palladium on carbon and the mixture hydrogenated at atmospheric pressure until two molar equivalents of hydrogen are taken up. The mixture is filtered and the solvent evaporated to give the desired acid.

The sodium, potassium, calcium, barium and magnesium salts are prepared by the addition of the stoichiometric amounts of the respective hydroxide. The salts are conveniently recovered by freeze-drying or precipitation with a water miscible organic solvent, such as a methanol, ethanol or acetone.

By the same procedure, the 5-formylisoxazole benzyl esters of Examples LVI, LVII, and LVIII are converted to the corresponding carboxy acids and thence to their alkali metal and alkaline earth salts.

EXAMPLE LX

Carboxamide derivatives of 5-formylisoxazoles

The diethylacetal of 3,4-dicarbethoxy-5-formylisoxazole (10 g.) in 25 ml. of saturated aqueous ammonia is stirred at room temperature for 16 hours. The original two phase system changes to a suspension of crystals in the aqueous layer during this period. It is filtered, washed with water and dried; M.P. 129°–130° C. Recrystallization from ethanol raises the melting point to 130°–131.5° C.

*Analysis.*—Calcd. for $C_{10}H_{15}O_5N_3$ (percent): C, 46.65; H, 5.88; N, 16.35. Found (percent): C, 46.65; H, 5.80; N, 16.12.

The diamide diacetal produced above (2 g.) is dissolved in 5 ml. of 48% hydrobromic acid. Crystals begin to form after two minutes and, after a total of ten minutes, the mixture is filtered, with suction. The crystalline product is then washed with water and crystallized from methanol from which it is obtained as the methanol solvate; M.P. 181–182° C. The dinitrophenylhydrazone, when recrystallized from ethyl acetate, did not melt below 260° C.

*Solvate analysis.*—Calc. for $C_7H_9O_5N_3$ (percent): C, 39.07; H, 4.22; N, 19.52. Found (percent): C, 38.84; H, 4.29; N, 19.25.

The remaining products of Example LVIII are transformed to their corresponding amides by means of this procedure.

EXAMPLE LXI 3,4-dicyano-5-formylisoxazole

The diethylacetal of 3,4-dicarboxamido-5-formylisoxazole (3 g.) in 25 ml. of pyridine is treated dropwise at 0° C. with 5 ml. of benzenesulfonyl chloride. External cooling is applied to maintain the temperature below 5° C. The mixture is stirred for 30 minutes following completion of addition then poured into ice/cold water. The product, 3,4-dicyano-5-formylisoxazole diethylacetal, is extracted with chloroform, the chloroform solution washed with water, dried and evaporated to dryness. The product is purified by distillation.

The diethylacetal is hydrolyzed by stirring 2 g. in 15 ml. of 48% HBr for 20 minutes at room temperature. The mixture is diluted with water and extracted with chloroform. The chloroform solution is washed with water, dried and evaporated to dryess to give the dinitrile-aldehyde.

EXAMPLE LXII 3-carbethoxy-4-cyano-5-formylisoxazole (A) This product is prepared by the procedure of Example LVIII using γ,γ-diethoxyacetoacetamide in place of γ,γ-diethoxyacetoacetate. The 3-carbethoxy-4-carboxamido-5-formylisoxazole diethoxy acetal is dehydrated to the corresponding 4-cyano acetal by the procedure of Example LXI prior to hydrolysis of the acetal to the aldehyde.

In this manner, 5-formylisoxazoles containing carboalkoxy groups or a carbobenzoxy group in the 3-position and a carboxamide or cyano group in the 4-position are prepared from the appropriate alkyl (or benzyl) α-chloro-α-oximinoacetate in lieu of ethyl α-chloro-α-oximinoacetate. The following amides are obtained in this fashion and dehydrated to the nitriles:

| $Y_4$: | $Y_5$ |
| --- | --- |
| $CONH_2$ | COOMe |
| $CONH_2$ | COOBz |
| $CONH_2$ | COOPr |
| $CONH_2$ | COOBu |
| $CONH_2$ | COO-i-Pr |

Me=methyl; Bz=benzyl; Pr=propyl; Bu=butyl (B) To 0.2 mole of freshly prepared sodium ethoxide there is added a mixture of 0.065 mole of ethyl diethoxy acetate and 0.13 mole of acetonitrile. The mixture is heated and stirred under nitrogen for 3 hours at 100° C.: The alcohol formed is distilled off under slight vacuum. The process is then repeated until a total of 0.2 mole of the ethyl diethoxyacetate has been added. Following the final addition and heating period, the mixture is cooled, then poured over a mixture of 50 g. of ice and 50 g. glacial acetic acid. The oily layer is immediately separated and the aqueous layer extracted with ether. The combined oil and ether solution is washed with sodium carbonate solution, dried and the solvent removed in vacuo. The residue is then distilled to yield the product, γ,γ-diethoxy acetoacetonitrile. To avoid polymerization it is stored in the refrigerator until ready to use.

This product is converted to 3-carbethoxy-4-cyano-5-formylisoxazole by the procedure of Example LVIII using 17.1 g. of the γ,γ-diethoxyacetoacetonitrile.

(C) Alternatively, γ,γ-diethoxyacetonitrile is prepared as follows:

To 500 ml. of an ether solution of sodium triphenylmethyl (0.1 mole) at 0° C. there is added 3.9 g. of acetonitrile dissolved in 10 ml. of dry ether. To this suspension ethyl diethoxyacetate (0.08 mole) in 10 ml. of dry ether is added and the mixture stirred for 10 minutes. It is then removed from the ice bath and stirred an additional 30 minutes. Ice-water, 200 ml., is added and the alkaline solution quickly extracted with ether and the ether solution backwashed with 5% sodium hydroxide. The combined alkaline solution is acidified with glacial acetic acid and extracted 3 times with ether. The ether extracts are combined, washed with sodium bicarbonate solution, dried and the solvent distilled. The residue is distilled in vacuo to give γ,γ-diethoxyacetoacetonitrile.

EXAMPLE LXIII

Hydrazide of 3,4-dicarboxy-5-formylisoxazole 3,4-dicarbethoxy-5-formylisoxazole diethylacetal (10 ml.) and 100 ml. of 40% aqueous hydrazine are stirred at room temperature overnight. The waxy solid which forms is filtered off, washed with water and dried in air. It is purified by recrystallization from chloroform/hexane; M.P. 94–96° C.

Hydrolysis with 48% aqueous HBr produces the desired product.

EXAMPLE LXIV

Amide of 3-carboxy-5-formylisoxazole 5-styryl-3-carbethoxyisoxazole (3 g.) in 15 ml. of concentrated aqueous ammonia is stirred at room temperature overnight. The suspension of buff colored solid is filtered, washed with water and dried. It is recrystallized from ethanol as needles; M.P. 218–219°. The amide of 5-styryl-3-carboxyisoxazole is then treated with ozone according to the procedure of Example LVI.

Repetition of this procedure but using 40% aqueous hydrazine in place of ammonia produces the hydrazide of 3-carboxy-5-formylisoxazole.

EXAMPLE LXV

Preparation of aminals of isoxazole aldehydes

To a mixture of 10 g. of 3-carbomethoxy-5-formylisoxazole, and 3.38 g. of anhydrous sodium carbonate (½ molar equivalent) in 50 ml. of chloroform, 10.97 g. of piperidine (2 molar equivalents) are slowly added at a rate to maintain the reaction temperature below 50° C. The mixture is stirred for 12 hours at room temperature after the initial exothermic reaction subsides. The mixture becomes viscous. Methanol is next added, the mixture is filtered and the filtrate is concentrated to a viscous gummy residue. The residue is dissolved in chloroform (30 ml.), dried, treated with activated carbon, filtered and concentrated to minimum volume at which crystallization commences. Hexane is then carefully added to crystallize the product, the dipiperidine adduct, which melts at 106°–107.4° (yield 60%).

In this manner, the dimorpholine adduct (M. 125.6°–126.6° C.) and the di-dimethylamine adduct (M. 47°–48.6° C.) of 3-carbomethoxy-5-formylisoxazole are prepared.

EXAMPLE LXVI

Following the procedure of Example LXV the isoxazole-5-aldehydes of Examples LVI, LVII and LVIII are converted to bis-aminals by reaction with the following amines: piperidine, morpholine, dimethylamine.

EXAMPLE LXVII

*Method A.*—2 - carbobutoxymethylidene-5-methoxy-8-chloro - 3,4,10 - trioxo - 1,2,3,4,4a,9,9a,10 - octahydroanthracene.

Under a nitrogen atmosphere, a solution of 1.51 g. (0.0051 mole) of 5-methoxy - 8 - chloro-3,4,10-trioxo-1,2,3,4,4a,9,9a,10 - octahydroanthracene (I), 1.51 g. (0.012 mole) of n-butyl glyoxylate, two drops of piperidine, and 90 cc. of glacial acetic acid is heated under reflux for four hours. The acetic acid is removed by evaporation under reduced pressure, and the residual red gum is dissolved in chloroform. The solution is washed successively with water and brine; and is then dried over anhydrous sodium sulfate. The solvent is evaporated to yield a red gum which crystallizes upon trituration with ethyl acetate and ether. Orange crystals (0.75 g., 36%) melting 121–124° are obtained. The filtrate is chromatographed on silicic acid to afford an additional 0.54 g. of the product. The total yield of product is 62% theory. Two recrystallizations of the material produces an analytical sample as small yellow-orange crystals melting at 127.5–128°.

*Analysis.*—Calcd. for $C_{21}H_{21}O_6Cl$ (404.8) (percent): C, 62.30; H, 5.23; Cl, 8.76. Found (percent): C, 62.58; H, 5.55; Cl, 8.87.

By using an analogous procedure to that above, 2-carbomethoxymethylidene - 5 - methoxy - 8-chloro-3,4,10-trioxo 1,2,3,4,4a,9,9a,10-octahydroanthracene may be obtained from I and methyl glyoxylate. This product is purified by recrystallization from a hot solution of ethyl acetate and hexane; M.P. 161–168°.

*Analysis.*—Calcd. for $C_{18}H_{15}O_6Cl$ (362.7) (percent): C, 59.60; H, 4.35. Found (percent): C, 60.26; H, 4.38.

*Method B.*—Under a nitrogen atmosphere, a solution of 500 mg. (1.7 mmole) of 5-methoxy-8-chloro-3,4,10-trioxo-1,2,3,4,4a,9,9a,10-octahydroanthracene (I), 85 mg. (1.0 mmole) of magnesium methoxide, 500 mg. (3.8 mmole) of n-butyl glyoxylate, and 20 cc. of xylene is heated at 105–110° for three hours. The red brown mixture is evaporated to dryness under reduced pressure, and the residue is shaken with a mixture of chloroform and 2 N hydrochloric acid. The chloroform solution is then washed with water, decolorized with activated carbon, dried over anhydrous sodium sulfate, filtered, and evaporated to give a reddish oil. Upon silicic acid chromatography (eluting with chloroform) or by crystallization from a solution of ether and hexane, 2-carbobutoxymethylidene - 5 - methoxy-8-chloro-3,4,10-trioxo-1,2,3,4,4a,9,-9a,10-octahydroanthracene: M.P. 121–124° (impure) is obtained.

*Method C.*—A mixture of 3 g. of 5-methoxy-8-chloro-3,4,10-trioxo-1,2,3,4,4a,9,9a,10-octahydroanthracene, 1.5 g. of butyl glyoxylate (15% excess) in 180 ml. of glacial acetic acid containing 12 drops of conc. HCl is refluxed under nitrogen for 6 hours. The solvent is then removed under reduced pressure and the residual red gum is chromatographed on a silicic acid column in chloroform. After an initial small fraction of brightly fluorescent solution which yields an orange gum, the next three fractions (2 g.) are combined and recrystallized from ethyl acetate-hexane to give 1.57 g. of product melting at 125.5°–126.5° C. Recrystallization gives a product melting at 127.5°–128° C.

*Elemental analysis.*—Calculated for $C_{21}H_{21}O_6Cl$ (percent): C, 62.30; H, 5.23; Cl, 8.76. Found (percent): C, 62.58; H, 5.55.

In the same manner, the following compounds are prepared:

2-(carbethoxymethylidene)-5-benzyloxy-8-chloro-3,4,10-trioxo-1,2,3,4,4a,9,9a,10-octahydroanthracene 2-(carbethoxymethylidene)-5-benzyloxy-3,4,10-trioxo-1,2,3,4,4a,9,9a,10-octahydroanthracene

*Method D.*—In a flask equipped with a mechanical stirrer a nitrogen inlet, and a reflux condenser fitted with a Dean Stark trap 139.9 g. (0.0476 mole) of 5-methoxy-8 - chloro - 3,4,10 - trioxo - 1,2,3,4,4a,9,9a,10-octahydroanthracene, 1.03 g. (0.012 mole) of magnesium methoxide, 13.9 g. (0.107 mole) of n-butylglyoxylate and one liter of xylene are refluxed for two hours. During this period, the mixture becomes dark orange in color and water is collected in the trap. The mixture is then cooled and shaken intermittently with 6 N hydrochloric acid for 5 min. The organic layer is washed twice with water, once with saturated sodium chloride solution, dried over anhydrous sodium sulfate, treated with Darco,, filtered through Super Cel, and evaporated to a viscous red oil. The oil is dissolved in a limited quantity of ether and the solution seeded with unsaturated ester. More ether is added after some crystallization has occurred. After crystallizing overnight, the orange solid is filtered and washed with ether containing a small amount of ethyl acetate. The unsaturated ester is obtained as small yellow-orange crystals; M.P. 120–123° C.; analytical sample 127–128° C.

An additional quantity of ester may be obtained by Florisil chromatography of the mother liquor and elution with 1:1 carbontetrachloride:chloroform. Elution with carbontetrachloride alone gives the geometric isomer of the unsaturated ester (M.P. 134–135° C.). Elution with chloroform gives the hydroxy ester: n-butyl-5-methoxy-8 - chloro - 3,4,10 - trioxo-1,2,3,4,4a,9,9a,10-octahydroanthracene-2-(α-hydroxy)acetate; M.P. 180°–182° C.

Similarly, the following carboxymethylidene-3,4,10-trioxo-1,2,3,4,4a,9,9a,10-octahydroanthracenes are prepared in the form of their esters from the appropriate triketone and glyoxylic acid ester.

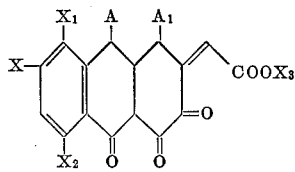

| X | $X_1$ | $X_2$ | A | $X_3$ |
|---|---|---|---|---|
| H | 8-Cl | 5-OBz | Me | Bu |
| 7-OMe | H | H | Me | Bu |
| 7-OM | H | H | Me | Et |
| 7-Et | 8-Cl | 5-OMe | H | Et |
| 7-OMe | H | H | Pr | Me |
| 7-OMe | H | 5-OMe | Pr | Me |
| 7-OBz | H | 5-OBz | Me | Me |
| 7-NHCOMe | H | 5-OMe | Me | Me |
| 7-NMe₂ | H | 5-OH | Et | Me |
| H | H | H | Me | Pr |
| H | 8-Et | 5-OMe | H | Me |
| H | 8-NMe₂ | 5-OMe | Me | Et |
| H | 8-NH₂ | 5-OMe | Me | Et |
| H | 8-NHCOMe | 5-OMe | H | i-Pr |
| H | 8-Cl | 5-OH | Me | i-Pr |
| 7-Me | H | 5-OH | Et | Et |

TABLE—Continued

| X | $X_1$ | $X_2$ | A | $X_3$ |
|---|---|---|---|---|
| 7-i-Pr | 8-Cl | 5-OH | Et | Bu |
| 7-Et | 8-Et | 5-OH | H | Bu |
| H | 8-NHCOMe | 5-OMe | H | Bu |
| 7-Et | H | 5-OMe | H | Me |
| H | H | 5-OCOBu | Me | Me |
| H | H | 5-OCOMe | Et | Me |
| H | H | 5-OEt | Me | Me |
| H | H | 5-OMe | MeOCH₂ | Et |
| H | 8-Cl | 5-OH | MeOCH(Me) | Bu |
| H | 8-Cl | 5-OMe | MeOCH₂ | Bu |
| H | H | 5-OH | Me | Bu |
| 7-CF₃ | H | 5-OMe | H | Me |
| 7-Et | 8-Et | 5-OH | H | Me |
| 7-CF₃ | 8-CF₃ | 5-OMe | H | Et |
| 7-NH₂ | 8-Cl | 5-OMe | H | Bz |
| 7-NHMe | H | 5-OMe | Me | Pr |
| 7-OMe | H | 5-OMe | Me | Bu |
| H | H | 5-OMe | H | Bu |
| H | 8-Pr | 5-OPr | Me | Me |
| H | 8-Cl | 5-OMe | Et | Me |
| 7-OMe | H | H | Et | Et |
| 7-OCOEt | 8-Me | H | EtOCH(Me) | Bz |
| 7-Me | 8-Me | 5-OH | H | Et |
| H | 8-Cl | 5-OMe | Pr | Me |

In the above table, Me=CH₃, Et=C₂H₅, Pr=C₃H₇, Bu=C₄H₉, Bz=CH₂C₆H₅.

Upon hydrolysis the free acids are, of course, obtained.

EXAMPLE LXVIII n-Butyl 5-methoxy-8-chloro-3,4,10-trioxo-1,2,3,4,4a,9,9a,10-octahydroanthracene-2-(α-dimethylamino)acetate A flask equipped with a stirrer and containing 1.31 g. (0.0032 mole) of 2-carbobutoxymethylidene-5-methoxy-8-chloro-3,4,10 - trioxo - 1,2,3,4,4a,9,9a,10 - octahydroanthracene is cooled in a Dry-Ice/acetone bath. Dimethylamine is passed in under nitrogen until about 70 cc. have condensed. The Dry-Ice/acetone bath is replaced with an ice/water bath. After some minutes the solid material dissolves to give a red solution. After 20 minutes a yellow precipitate forms. The dimethylamine is evaporated with a stream of nitrogen, and the residual brown gum is stirred with 10 cc. of ether. The ether is evaporated under nitrogen, and this proces repeated to remove traces of dimethylamine. Crude n-butyl-5-methoxy-8-chloro - 3,4,10 - trioxo - 1,2,3,4,4a,9,9a,10 - octahydroanthracene-2-(α-dimethylamino)acetate is obtained as the residue.

The residue is taken up in chloroform and hydrogen chloride bubbled through the solution for 30 seconds. Removal of the solvent gives the hydrochloride salt. The hydrochloride salt is more stable than the free base and is the preferred form in which this product is stored.

EXAMPLE LXIX

Esters of 3,4,10-trioxo-1,2,3,4,4a,9,9a,10-octahydroanthracene-2-(α-substituted amino) acetic acids.

Following the method of Example LXVIII the products of Example LXVIII are converted to the substituted amino acetate products having the formula:

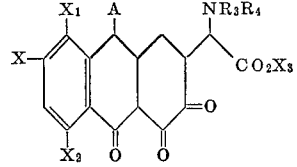

| X | $X_1$ | $X_2$ | A | $X_3$ | $NR_3R_4$ |
|---|---|---|---|---|---|
| H | 8-Cl | 5-OBz | Me | Bu | NMe₂ |
| 7-OMe | H | H | Me | Bu | NMe₂ |
| 7-OH | H | H | Me | Et | NEt₂ |
| 7-Et | 8-Cl | 5-OMe | H | Et | NBz₂ |
| 7-OMe | H | H | Pr | Me | NMe₂ |

TABLE—Continued

| X | X₁ | X₂ | A | X₃ | NR₃R₄ |
|---|----|----|---|----|-------|
| 7-OMe | H | 5-OMe | Pr | Me | HNMe |
| 7-OBz | H | 5-OBz | Me | Me | NHMe |
| 7-NHCOMe | H | 5-OMe | Me | Me | piperidino |
| 7-NMe₂ | H | 5-OH | Et | Me | HNBu |
| H | H | H | Me | Pr | NMe₂ |
| H | 8-Et | 5-OMe | H | Me | HNMe |
| H | 8-NMe₂ | 5-OMe | Me | Et | HNBz |
| H | 8-NH₂ | 5-OMe | Me | Et | NMe₂ |
| H | 8-Cl | 5-OH | Me | i-Pr | N(CH₂CH₂OMe)₂ |
| 7-Me | H | 5-OH | Et | Et | NBz₂ |
| 7-i-Pr | 8-Cl | 5-OH | Et | Bu | HNMe |
| 7-Et | 8-Et | 5-OH | H | Bu | HNMe |
| H | 8-NHCOMe | 5-OMe | H | Bu | NMe₂ |
| 7-Et | H | 5-OMe | H | Me | HNMe |
| H | H | 5-OCOBu | Me | Me | HNEt |
| H | H | 5-OCOMe | Et | Me | HNEt |
| H | 8-NHCOMe | 5-OMe | H | i-Pr | MeNCH₂CH₂OMe |
| 7-CF₃ | H | 5-OMe | H | Me | NMe₂ |
| H | H | 5-OEt | Me | Me | NBu₂ |
| H | H | 5-OMe | MeOCH₂ | Et | NMe₂ |
| H | 8-Cl | 5-OH | MeOCH(Me) | Bu | N[(CH₂)₃OMe]₂ |
| H | 8-Cl | 5-OMe | MeOCH₂ | Bu | NMe₂ |
| H | H | 5-OH | Me | Bu | HNMe |
| 7-CF₃ | H | 5-OMe | H | Me | NPr₂ |
| 7-Et | 8-Et | 5-OH | H | Me | NMe₂ |
| 7-CF₃ | 8-CF₃ | 5-OMe | Me | Et | NMe₂ |
| 7-NH₂ | 8-Cl | 5-OMe | H | Bz | NMe₂ |
| 7-NHMe | H | 5-OMe | Me | Pr | NMe₂ |
| 7-OMe | H | 5-OMe | Me | Bu | morpholino |
| H | H | 5-OMe | H | Bu | NH₂ |
| H | 8-Pr | 5-OPr | Me | Me | thiomorpholino |
| H | 8-Cl | 5-OMe | Et | Me | piperazino |
| 7-OMe | H | H | Et | Et | NMe₂ |
| 7-OCOEt | 8-Me | H | EtOCH(Me) | Bz | NH₂ |
| 7-Me | 8-Me | 5-OH | H | Et | NMe₂ |
| H | 8-Cl | 5-OMe | Pr | Me | pyrrolo |

NOTE: In the above preparations, the reaction is conducted at a temperature 10° above the freezing point of the amine reactant if freezing occurs at Dry Ice/acetone bath temperatures.

In the above table Me=CH₃, Et=C₂H₅, Pr=C₃H₇, Bu=C₄H₉, Bz=CH₂C₆H₅. Upon hydrolysis the free acids are, of course, obtained.

EXAMPLE LXX n-Butyl-3-hydroxy-5-methoxy-8-chloro-4,10 - dioxo-1,2,3, 4,4a,9,9a,10 - octahydroanthracene - 2 - (α-dimethylamino)acetate hydrochloride A flask equipped with a stirrer and containing 1.31 g. (0.0032 mole) of 2-carbobutoxymethylidene-3,4,10-trioxo-5-methoxy-8-chloro - 1,2,3,4,4a,9,9a-10-octahydroanthracene (LXVII) is cooled in a Dry-Ice/acetone bath. Dimethylamine is passed into the flask (under N₂) until 70 cc. have condensed. The Dry-Ice/acetone bath is replaced with an ice/water bath. After some minutes the solid material dissolves to give a red solution. After 20 minutes a yellow precipitate forms. The dimethylamine is evaporated with a stream of nitrogen, and the residual brown gum is stirred with 10 cc. of ether. The ether is evaporated under nitrogen, and this process repeated to remove traces of dimethylamine. The red-brown gum is dissolved in 70 cc. of 1,2-dimethoxy ethanol which is previously cooled to 0°. Two drops of water and 0.070 g. (0.0018 mole) of sodium borohydride are then added to the solution. The mixture is stirred for 30 minutes, and is then treated with 5 cc. of glacial acetic acid. To this point the reaction solution is always maintained at the ice bath temperature. After stirring an additional ten minutes, 150 cc. of 5% hydrochloric acid is added and stirring is continued for 30 minutes. The mixture is poured into water, and is extracted several times with chloroform. The combined organic extracts are dried over anhydrous sodium sulfate, filtered, and evaporated to give a red gum which is redissolved in 10 cc. of chloroform. Hydrogen chloride is passed through the solution for 30 seconds, and the solvent is evaporated. The residual red gum partially crystallizes upon trituration with chloroform and ethyl acetate. After filtration, 0.60 g. (38%) of the hydrochloride salt is obtained as small pale yellow prisms, M.P. 170–176° C.

A high melting pale-yellow solid (0.10 g.) is obtained from the filtrate. Its infrared spectrum with a band at 5.58μ indicates it to be the hydrochloride of the lactone of the above product.

The 3-acetoxy derivative of the title product is prepared by allowing the 3-alcohol to stand at room temperature for four days in a solution of acetic anhydride and pyridine. The product melts 180–182°. An analytical sample of the acetate melts 188.5–189°.

Analysis.—Calcd. for C₂₅H₃₃O₇Cl₂N (530.43) (percent): C, 56.61; H, 6.27. Found (percent): C, 56.61; H, 6.36 (uncor.).

EXAMPLE LXXI n-Butyl - 3 - hydroxy - 5 - methoxy - 8 - chloro - 4,10-dioxo - 1,2,3,4,4a,9,9a,10-octahydroanthracene - 2 - (α-dimethylamino)acetate hydrochloride.

(A) The procedure of Example LXVIII is repeated and the crude product, kept cold in an ice-water bath, is dissolved in 280 ml. of a 1:1 solution of tetrahydrofuran and 1,2-dimethoxyethane at a temperature below —7° C. To this solution is added 0.50 g. (0.013 mole) of sodium borohydride in 50 ml. of 1,2-dimethoxyethane and 15 ml. of water. The reaction mixture becomes a deep, clear red color and, after 15 minutes, 10 ml. of glacial acetic acid added. This is stirred 5 min., 5 ml. of 6 N HCl added and stirring continued 0.5 hr. The mixture is poured into water and extracted several times with chloroform. The combined extracts are dried over anhydrous sodium sulfate. After evaporation of the solvent, a red gum is obtained which is redissolved in 40 ml. of chloroform. Hydrogen chloride is bubbled through the solution for 0.5 min. and the solvent then evaporated. The residual red gum partially crystallizes upon trituration with chloroform and ethylacetate as small pale yellow prisms; M.P. 170–176°. The corresponding lactone is obtained from the filtrate.

In like manner, application of this procedure to the remaining products of Example LXIX produces the corresponding 3-hydroxy compounds together with their corresponding lactones. Moderate treatment of the products bearing ether groups with HBr according to well-known procedures produces the corresponding hydroxy compounds. If desired, the acyl groups also removed by this treatment are replaced by standard acylation procedures.

(B) The product of Example LXVII–A (12.5 g.) in about 250 ml. of liquid dimethylamine is stirred under nitrogen for two hours at 0° C. The intermediate Mannich base crystallizes out during this period. The dimethylamine is evaporated under reduced pressure, nitrogen being passed into the system to avoid the presence of air. The resulting solid is cooled to −70° C., solid sodium borohydride (1.17 g., 1 mole eq.) added, followed by 200 ml. of precooled (−70° C.) 1,2-dimethoxyethane and 1 ml. of water. The Dry Ice-acetone bath is immediately replaced with an ice-salt bath. The mixture is swirled vigorously until solution is complete then stirred for 30 minutes at 0° C.

Glacial acetic acid (30 ml.) is added, the mixture stirred for 5 minutes, then poured into 180 ml. of 6 N HCl. Water (250 ml.) is added and the solution extracted with chloroform. The chloroform extract is washed with water until acid free followed by a single wash with saturated sodium chloride solution. It is dried over anhydrous sodium sulfate, treated with Darco, filtered through Supercel and evaporated to dryness. The residue is taken up in chloroform, hydrogen chloride gas bubbled in and the solvent evaporated. Trituration of the residue with methanol-ethyl acetate gives a pale-yellow crystalline solid (42% yield, 7 g.); M.P. 182–184° C. Recrystallization from methanol-ethyl acetate further purifies the product; M.P. 196–197° C. (dec.).

Additional product is obtained by extracting the aqueous washes with butanol followed by evaporation of the butanol.

The corresponding lactone hydrochloride is obtained by fractional crystallization of the motor liquors; M.P. 280° C.

EXAMPLE LXXII n-Butyl - 3 - formyloxy - 5 - methoxy - 8 - chloro - 4,10-dioxo - 1,2,3,4,4a,9,9a,10-octahydroanthracene - 2 - (α-dimethylamino)acetate hydrochloride To 0.74 g. of n - butyl-3-hydroxy-5-methoxy-8-chloro-4,10-dioxo-1,2,3,4,4a,9,9a10-octahydroanthracene - 2 - (α-dimethylamino)acetate hydrochloride (product of Example LXX) dissolved in 6 ml. pyridine at 0° is added 3 ml. acetoformic anhydride. The mixture is stirred for one half hour then poured into CHCl₃, washed with water twice and saturated sodium chloride once and dried over Na₂SO₄. The filtered solution is charcoaled and concentrated to dryness several times with repeated addition of toluene to remove the pyridine. The residue is then taken up in chloroform, HCl bubbled in, the solution concentrated and the residue triturated with chloroform-ethyl acetate. There is obtained 0.685 g. of the formate, M.P. 180° C.

A chloroform solvate of the formate is obtained as pale yellow rods, M.P. 145–146° dec., by recrystallization from chloroform-ethyl acetate.

*Analysis.*—Calcd. for $C_{24}H_{30}O_7ClN \cdot HCl \cdot \frac{1}{3} CHCl_3$ (percent): C, 52.54; H, 5.68; Cl. 1912; N, 252. Found (percent): C, 52.38; H, 5.66; Cl. 20.2; N, 2.30.

The products of Example LXXI are also converted to their 3-formyloxy derivatives by substantially the same procedure. When one of R₃ and R₄ is hydrogen, N-formylation also occurs if excess acetoformic anhydride is used (see Example LXXX).

Those compounds bearing a free amino group are converted to their acetamido derivatives prior to the formylation reaction.

EXAMPLE LXXIII n-Butyl-5-methoxy-8-chloro-4,10-dioxo-1,2,3,4,4a,9,9a,10-octahydroanthracene - 2 - (α - dimethylamino)acetate hydrochloride A solution of 5 g. of n-butyl-3-formyloxy-5-methoxy-8 - chloro - 4,10 - dioxo-1,2,3,4,4a,9,9a,10-octahydro-2-anthracene-α-dimethylaminoacetate hydrochloride and 30 ml. of 98% formic acid is treated for two minutes with 1.5 g. of zinc dust. The reaction mixture is filtered through Supercel and the filtrate is evaporated under reduced pressure with addition of toluene to give a residue. The residue is dissolved in chloroform, the solution saturated with hydrogen sulfide gas, and filtered through Supercel. The filtrate is reduced to a gum, dissolved in chloroform and the solution saturated with dry hydrogen chloride and filtered. The filtrate is evaporated to a gum, redissolved in a small volume of chloroform and chromatographed on Florisil. The first fraction (fluorescent) is collected, evaporated to a gum and redissolved in a small volume of chloroform. It is converted to the hydrochloride by treatment with dry HCl and the solution concentrated. The residual gum is triturated with ethyl acetate to give a crystalline yellow solid which melts 130–140°. Upon recrystallization from ethyl acetate and chloroform an analytical sample is obtained; M.P. 154–157°.

*Analysis.*—Calcd. for $C_{23}H_{31}Cl_2NO_5$ (MW=472.40) (percent): C, 58.47; H, 6.42. Found (percent): C, 58.88; H, 7.16.

The 3-formyloxy groups of the remaining compounds of Example LXXII are removed by this same procedure to give the corresponding 4,10-dioxo-octahydroanthracenes.

The ether groups of the 4,10-dioxo compounds thus produced are cleaved by treatment with hydrogen bromide according to known procedures. The ester and amide groups hydrolyzed by this treatment are replaced by standard acylation techniques.

EXAMPLE LXXIV 5-methoxy-8-chloro-4,10-dioxo-1,2,3,4,4a,9,9a,10-octahydroanthracene-2-(α-dimethylamino)acetic acid Under a nitrogen atmosphere a solution of 2.0 g. (0.004 mole) of n-butyl 3-hydroxy-5-methoxy-8-chloro-4,10 - dioxo - 1,2,3,4,4a,9,9a,10 - octahydroanthracene 2-(α-dimethylamino)acetate hydrochloride, 1.0 g. of p-toluenesulfonic acid, and 600 cc. of toluene is heated under reflux in a vessel equipped with a Dean-Stark type moisture trap. After 20 hours the reaction mixture is cooled, and the solution is evaporated under reduced pressure. The residue is taken up in chloroform, and the resulting solution washed four times with 50 cc. portions of water and once with 50 cc. of saturated sodium chloride solution. The chloroform solution is dried over anhydrous sodium sulfate, treated with activated carbon, filtered, and evaproated to give a yellow foam. This is dissolved in chloroform and dry hydrogen chloride is passed through the solution for five minutes. The solvent is then evaporated to give a gum which upon trituration with a solution of methanol and ethyl acetate gives a yellow crystalline solid. The mixture is stored overnight in a refrigerator, and then filtered to give the crude lactone hydrochloride. It is purified by recrystallization from a hot solution of methanol and ethyl acetate.

A solution of 4.14 g. (0.01 mole) of the lactone hydrochloride and 98% formic acid is stirred with 4.0 g. of zinc dust for 60 seconds. The mixture is filtered rapidly through diatomaceous earth, and the filtrate is evaporated under reduced pressure to give a yellow gum. This material is dissolved in a mixture of water and methanol (1:2 v./v.) and hydrogen sulfide gas is passed through the resulting solution for three minutes. The reaction mixture is again filtered through diatomaceous earth, and the filtrate is evaporated to give crude 5-methoxy-8-chloro-4,10 - dioxo - 1,2,3,4,4a,9,9a,10 - octahydroanthracene- 2-(α-dimethylamino)acetic acid. The product is recrystallized from a hot solution of methanol and chloroform: M.P. 235–237° C.

EXAMPLE LXXV

5 - methoxy - 8 - chloro - 4,10 - dioxo - 1,2,3,4,4a,9,9a,10-octahydroanthracene - 2 - (α - dimethylamino)acetic acid lactone hydrochloride In a flask equipped with a mechanical stirrer, a nitrogen inlet, and a reflux condenser with a Dean-Stark trap are placed 4.36 g. (0.0089 mole) of n-butyl-3-hydroxy-5-methoxy - 8 - chloro - 4,10 - dioxo - 1,2,3,4,4a,9,9a,10-octahydroanthracene-2-(α-dimethylamino)acetate hydrochloride, 1.0 g. of p-toluene sulfonic acid and 1 liter of toluene. The mixture is refluxed for 17 hours under a nitrogen atmosphere, cooled, and the toluene evaporated under reduced pressure. The residual oily solid is dissolved in 400 ml. of chloroform then washed with water until acid free. After an additional wash with saturated sodium chloride solution, the chloroform solution is dried over anhydrous sodium sulfate and concentrated under reduced pressure to a volme of 100 ml. Hydrogen chloride is then bubbled into the solution and the remainder of the chloroform then evaporated. The residual orange foam is triturated with methanol-ethyl acetate yielding yellow crystals. Filtration gives the yellow crystalline lactone, M.P. 232–234° (darkening at 200°). An analytical sample as a chloroform solvate, pale yellow needles, M.P. 222–225° dec., is prepared from the lactone by recrystallization from methanol-ethyl acetate, then from chloroform-ethylacetate.

*Analysis*—Calcd. for $C_{19}H_{21}O_5ClN\cdot\frac{1}{3}CHCl_3$ (percent): C, 51.13; H, 4.74; Cl, 3.4; N, 3.09. Found (percent): C, 51.33; H, 4.76; Cl, 24.0; N, 3.00.

Repetition of this procedure using 0.5 g. p-toluene-sulfonic per 1.0 g. of hydroxy ester increases the yield from 66% to 80–90%.

By the same procedure, the remaining products of Example LXXI are converted to their corresponding lactones.

EXAMPLE LXXVI 5-methoxy-8-chloro-4,10-dioxo-1,2,3,4,4a,9,9a,10-octahydroanthracene-2-(α-dimtehylamino)acetic acid To a solution of 2.4 g. of the title lactone product of Example LXXV in 50 ml. of 97% formic acid is added 2.4 g. of zinc dust. After being vigorously stirred magnetically for 1.0 minute, the mixture is rapidly filtered through SuperCel. The filter pad is washed thoroughly with 97% formic acid and the filtrate evaporated under reduced pressure to a hard gum. To remove traces of formic acid, the gum is triturated with ether, filtered, washed thoroughly with ether and the residual amber gum dissolved in 150 ml. of 67% methanol in water. Hydrogen sulfide is bubbled through the solution for 3 minutes, the mixture then treated with Darco and filtered through SuperCel, the filter pad being thoroughly washed with the metanol solution. The filtrate is concentrated under reduced pressure. When most of the methanol is removed the product crystallizes as yellow needles. The solution is then heated to dissolve the acid, filtered, and the product allowed to crystallize overnight at 5° C. The acid is filtered, washed with water, followed by a small amount of acetone, and dried. The product is then suspended in dry toluene and heated on the steam bath 20 minutse. After evaporation of the toluene under reduced pressure, the acid is obtained as small pale yellow crystals, M.P. 239–241° dec. (220° previous darkening). Recrystallization from methanol of a sample of acid obtained in an analogous experiment afforded pale yellow needles, M.P. 169°; dec. 225–230°. The analytical data and M.P. of this substance indicate it to be a methanol solvate. A sample of this material after treatment with toluene as above had M.P. 235–237°.

*Analysis*—Calcd. for $C_{19}H_{22}O_5NCl$ (percent): C, 60.08; H, 5.84; N, 3.69; Cl, 9.33. Found (percent): C, 60.29; H, 5.87; N, 3.49; Cl, 9.7.

The remaining lactones of Example LXXV are similarly cleaved to produce the corresponding 4,10-dioxo amino acid compounds. The ether groups present are converted to hydroxy groups by treatment with hydrogen bromide in accordance with known procedures. The amphoteric products are obtained by careful neutralization with $NaHCO_3$.

EXAMPLE LXXVII 5-methoxy-8-chloro-4,10-dioxo-1,2,3,4,4a,9,9a,10-octahydroanthracene-2-(α-dimtehylamino)acetic acid To 480 mg. of the lactone of Example LXXV in 40 ml. of acetic acid there is added 150 mg. of zinc chloride. The mixture is swirled for 5 minutes after which 40 ml. of methanol is added. Zinc dust (500 mg.) is then added, the mixture stirred for 20 minutes under nitrogen and filtered. The filter cake is washed with chloroform and the combined filtrate and washings evaporated to dryness. The yellow-brown foam thus produced is taken up in methanol (100 ml.), hydrogen sulfide bubbled through for 10 minutes and the mixture filtered through Supercel. The filtrate is evaporated to a gum then taken up in 45 ml. of waterlmethanol (1–2) and taken to dryness again. The resulting gum is crystallized from chloroform-methanol as pale yellow crystals; M.P.; gum at 200°, decomposed at 210°. Additional material is recovered from the filtrate.

The remaining products of Example LXXV are similarly converted to their corresponding acids.

EXAMPLE LXXVIII 5-methoxy-4,10-dioxo-1,2,3,4,4a,9,9a,10-octahydroanthracene-2-(α-dimethylamino)acetic acid To 0.76 g. of the 8-chloro substituted analog (Example LXXVI in 150 ml. of absolute ethanol there is added 4.2 equivalents of triethylamine (1.16 ml.) and the mixture stirred until solution is complete. Pd/C (200 mg. of 5%) is added and the mixture hydrogenated at atmospheric pressure and room temperature for about 3 hours when hydrogen uptake ceases. The mixture is filtered through SuperCel then evaporated to a foam. To the combined product from two such runs is added 50 ml. of toluene and the mixture evaporated. This step is repeated once again to insure complete removal of the ethanol.

The residue is chromatographed on 30 g. of silicic acid. The column is eluted with chloroform through 15% methanol in chloroform to remove triethylamine hydrochloride. Elution with methanol followed by evaporation provides the crude acid (1.31 g.) as a pale yellow solid.

EXAMPLE LXXIX n-Butyl-3-hydroxy-5-methoxy-8-chloro-4,10-dioxo-1,2,3,4,4a,9,9a,10-octahydroanthracene-2-(α-ethylamino) acetate hydrochloride Following the method of Example LXX, 2-carbobutoxymethylidene - 5 - methoxy - 8-chloro-3,4,10-trioxo-1,2,3,4,4a,9,9a,10-octahydroanthracene is converted to the title compound by a substituting monomethylamine for dimethylamine.

In the same manner, the following compounds are prepared:

n - butyl-3-hydroxy-5-methoxy-4,10-dioxo-1,2,3,4,4a,9,9a,10-octahydroanthracene-2-(α-methyl amino) acetate hydrochloride.

n - butyl - 3-hydroxy-4,10-dioxo-1,2,3,4,4a,9,9a,10-octahydroanthrancene - 2 - (α - methylamino) acetate hydrochloride.

n - butyl - 3-hydroxy-5-methoxy-8-chloro-4,10-dioxo-1,2,3,4,4a,9,9a,10 - octahydroanthracene-2-(α-amino)acetate hydrochloride.

n - butyl - 3-hydroxy-5-benzyloxy-4,10-dioxo-1,2,3,4,4a,9, 9a-10-octahydroanthracene-2-(α-amino)acetate hydrochloride.

EXAMPLE LXXX n - Butyl-3-formyloxy-5-methoxy-8-chloro-4,10-dioxo-1,2,3,4,4a,9,9a,10 - octahydroanthracene-2-(α-N-methyl-N-formyl amino)acetate The title product of Example LXXIX (0.001 mole) is treated with excess acetoformic anhydride according to the procedure of Example LXXII. However, the residue remaining after removal of the pyridine by repeated evaporation of toluene is extracted with chloroform. The chloroform extract is dried then chromatographed on silicic acid using 5% methanol-chloroform as eluant. The fraction containing the desired product is recognized by a band at about 6μ in the infra red spectrum. The remaining products of Example LXXIX are formylated in like manner.

EXAMPLE LXXXI

3 - Hydroxy - 5-methoxy-8-chloro-4,10-dioxo-1,2,3,4,4a,9,9a,10 - octahydroanthracene-2-[(α-N-formyl-N-methyl)amino] acetic acid lactone The title product of Example LXXX is stirred for 5 minutes at 60° C. under nitrogen in 10 ml. of acetic acid containing 1 ml. of concentrated sulfuric acid and 3 ml. of water. The solution is then cooled, poured into four volumes of water and extracted with chloroform. The chloroform extract is back-washed with sodium bicarbonate solution, water and brine, then dried over anhydrous sodium sulfate. The solvent is removed in vacuo and the residue worked according to the method of Example LXXIV to give the lactone. The residue is taken up in chloroform and the solution is chromatographed on silicic acid with 5% methanol-chloroform as eluant. The product occurs in the major less polar fraction.

The remaining products of Example LXXX are reacted in like manner to produce the corresponding lactones.

EXAMPLE LXXXII

5 - Methoxy - 8-chloro-4,10-dioxo-1,2,3,4,4a,9,9a,10-octahydroanthracene - 2 - [(α-N-formyl-N-methyl)amino] acetic acid The title lactone of Example LXXXI is subjected to the reaction conditions of Example LXXVI. The residue obtained is purified by extraction into saturated sodium bicarbonate solution followed by acidification and extraction into chloroform. The dried chloroform solution is chromatographed on silicic acid using 5% methanol-chloroform as eluant. The product is contained in the polar friction.

Application of this procedure to the remaining products of Example LXXXI produces the corresponding 3-desoxy acids.

EXAMPLE LXXXIII

3 - Acyloxy - 4,10 - dioxo-1,2,3,4,4a,9,9a,10-octahydroanthracene-2-(α-N-acylamino)acetates A variety of products of Formula XVI-B wherein at least one of $R_3$ and $R_4$ is hydrogen are prepared by acylation at the 3-position and at the nitrogen by the procedure which comprises dissolving 0.05 equivalent of the appropriate 3-hydroxy-4,10-dioxo-1,2,3,4,4a,9,9a,10-octahydroanthracene-2-(α-amino)acetate in 0.4 mole of anhydrous pyridine, adding 0.20 equivalent of the desired anhydride (acetic, propionic, butyric) and stirring for 15 minutes at 60°–100° C. The mixture is then poured into an excess of ice water and the diacylated compound separated by filtration if solid, and the product washed thoroughly with water. When the product is not a solid, it is separated by chloroform extraction, thorough washing of the extract with water and evaporation of the solvent after drying.

The following compounds are thus prepared. When the acyl group is formyl, the procedure of Example LXXX is used.

| X | $X_1$ | $X_2$ | A | $NR_3R_4$ | $X_3$ | Acyl group |
|---|---|---|---|---|---|---|
| H | 8-Et | 5-OMe | H | MeNH | Me | Formyl. |
| H | NMe₂ | 5-OMe | Me | BzNH | Me | Do. |
| 7-i-Pr | H | 5-OMe | Et | MeNH | Pr | Butyryl. |
| 7-Et | 8-Et | 5-OH | H | MeNH | Pr | Acetyl. |
| H | H | 5-OMe | H | BzNH | Bu | Formyl. |
| H | H | 5-OMe | Me | NH₂ | Bu | Acetyl. |
| H | H | H | Me | MeNH | Bu | Do. |

Me=CH₃; Et=C₂H₅; Pr=C₃H₇; Bu=C₄H₉; Bz=CH₂C₆H₅.

EXAMPLE LXXXIV

Lactam of 3 - hydroxy - 3-N-methylamino-5-methoxy-8-chloro - 4,10 - dioxo - 1,2,3,4,4a,9,9a-10-octahydroanthracene-2-(α-N-methylamino)-acetic acid Under a nitrogen atmosphere, 2-carbobutoxymethylidene-5-methoxy-8-chloro-3,4,10 - trioxo - 1,2,3,4,4a,9,9a,10-octahydroanthracene (1.00 g.; the product of Example LXVII-A) is dissolved in 25 ml. of liquid monomethylamine and stirred for two hours at —15° C. The amine is then evaporated under reduced pressure (air being excluded) and the residue slurried in ether containing a small amount of ethyl acetate for 2 hours at 0° C., filtered and washed with ether. The orange solid (1.08 g.) gives characteristic absorption maxima in the ultraviolet region:

$$\lambda_{max.}^{MeOH-HCl} 348 \;(\epsilon\; ca.\; 14000)$$

$$\lambda_{max.}^{MeOH-NaOH} 360 \;(\epsilon\; ca.\; 14500)$$

and infrared region: $\lambda_{max.}^{CHCl_3}$ 5.87μ (lactam $\diagdown$C=O)

6.2–6.3μ (broad 3-diketone).

Similarly, the following fused lactams are prepared from the appropriate unsaturated butyl ester and primary amine reactants.

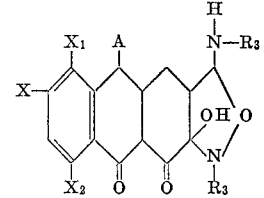

| X | $X_1$ | $X_2$ | A | $R_3$ |
|---|---|---|---|---|
| H | 8-Cl | 5-OMe | Me | Et |
| H | H | 5-OBz | H | Me |
| H | 8-Cl | 5-OBz | Me | Me |
| H | H | H | H | Me |
| H | 8-CF₃ | 5-OMe | Me | Me |
| H | 8-Cl | 5-OMe | H | Et |

EXAMPLE LXXXV

2 - [(5¹ - (3¹-carbomethoxy)-isoxazolyl)methylidene]-5-methoxy - 8 - chloro - 3,4,10-trioxo-1,2,3,4,4a,9,9a,10-octahydroanthracene

*Method A.*—A mixture of 500 mg. of 5-methoxy-8-chloro - 3,4,10 - trioxo - 1,2,3,4,4a,9,9a,10-octahydroanthracene, 85 mg. of magnesium methoxide, 300 mg. of 3-carbomethoxy-5-formylisoxazole in 20 ml. of xylene are stirred and heated at 100–110° C. for one hour on an oil bath. The dark brown reaction mixture is then evaporated to dryness, the residue taken up in chroroform and the chloroform solution extracted with 5–10 ml. of 2 N hydrochloric acid (to decompose magnesium chelates), washed with water and dried. The chloroform solution is decolorized with Darco KB then evaporated to dryness to give a red-brown gum. Trituration of the gum with ethyl acetate produces the crystalline condensation product; M.P. 210–212° C. Recrystallization from ethyl acetate raises the melting point to 222–224° C.

Additional product is obtained by the addition of hexane to the ethyl acetate liquors.

*Method B.*—A mixture of the starting tricyclic ketone of method A (3.0 g.), 3-carbomethoxy-5-formylisoxazole (1.8 g.), acetic acid (redistilled from acetic anhydride) and dry hydrogen chloride gas (120 mg. in ether) are combined and refluxed for 7 hours. The solvent is then evaporated to a small volume, the residue diluted with water and extracted with chloroform. Evaporation of the chloroform extract gives the crude product which is purified by recrystallization from ethylacetate; M.P. 223–224° C.

*Analysis.*—Calc'd for $C_{21}H_{15}O_7N$ Cl (percent): C, 58.83; H, 3.53; N, 3.27. Found percent: C, 58.86; H, 4.03; N, 3.03.

As a by-product of the reaction the 3-enol acetate of 5 - methoxy - 8 - chloro-3,4,10-trioxo-1,2,3,4,4a,9,9a,10-octahydroanthracene is obtained from the aqueous acetic acid liquor. It is purified by partition chromatography and recrystallization from ethylacetate/hexane; M.P. 164–165° C.

The following condensation products are obtained from the proper 3,4,10-trioxooctahydroanthracenes and 5-formylisoxazoles by the above methods.

As by-product there is obtained 2-[5'-(3',4'-dicarbethoxy) isoxazolyl) (hydroxymethyl)]-5-methoxy-8-chloro-3,4,10 - trioxo - 1,2,3,4,4a,9,9a,10-octahydroanthracene; M.P. 200–202° C.

*Analysis.*—Calc'd for $C_{15}H_{22}O_9NCl$ (percent): C, 58.20; H, 4.30; N, 2.72; Cl, 6.87. Found: C, 58.20; H, 4.21; N, 2.61; Cl, 6.94.

Ultraviolet absorption maxima:

MeOH/H+ 325 mµ (E=2,600); 375 mµ (E=3,560)
MeOH/OH− 319 mµ (E=5.920); 470 mµ (E=3,080)

Repetition of this procedure under substantially the same conditions gave a crystalline product melting at 232–234° C. and having ultraviolet absorption maxima at:

MeOH/H+ 325 mµ (E=4,650); 375 mµ (E=6,150)
MeOH/OH− 316 mµ (E=12,300); 470 mµ (E=6,600)

This product, considered to be an isomer of the above-described product, when employed further in the reaction sequence produces the same ultimate product as does the above compound.

The following condensation products are similarly produced from the appropriate reactants.

| X | X₁ | X₂ | A | Y₂ | Y₃ |
|---|---|---|---|---|---|
| H | H | H | Me | H | COOEt |
| H | 8-Et | 5-OMe | H | COOEt | COOEt |
| H | 8-NHCOMe | 5-OMe | H | COOEt | COOEt |
| H | 8-NMe₂ | 5-OMe | Me | COOEt | COOEt |
| H | H | 5-OMe | H | H | COOMe |
| 7-NHCOMe | H | 5-OMe | Me | COOEt | COOEt |
| 7-NEt₂ | H | 5-OMe | Et | CN | COOMe |
| 7-Me | H | 5-OMe | Me | COOPr | COOPr |
| 7-NMe₂ | H | 5-OMe | Me | COO-i-Pr | COO-i-Pr |
| 7-OEt | H | 5-OEt | MeOCH₂ | CN | COOEt |
| 7-CF₃ | H | 5-OMe | H | CN | COOEt |
| H | 8-Cl | 5-OPr | H | CN | COOEt |
| H | 8-CF₃ | 5-OMe | Me | CN | COOEt |
| H | H | 5-OMe | H | H | COOMe |
| 7-OCOMe | H | 5-OMe | H | H | COOEt |
| 7-Me | H | 5-OH | Me | COOPr | COOPr |
| 7-NMe₂ | 8-Cl | 5-OH | H | CN | COOEt |
| 7-NH₂ | 8-Cl | 5-OMe | H | COOMe | CN |
| H | 8-NHCOMe | 5-OMe | Me | COOPr | COOPr |
| H | 8-Cl | 5-OMe | Me | CN | COOBz |
| H | 8-Cl | 5-OBz | H | CN | COOMe |
| 7-i-Pr | H | 5-OMe | Et | H | COOPr |
| H | H | 5-OCOEt | H | CH | COOEt |
| H | 8-CF₃ | H | Me | CN | COOMe |
| H | 8-Cl | 5-OMe | H | H | COOBz |
| H | 8-Cl | 5-OMe | H | H | COO-i-amyl |
| H | 8-NH₂ | 5-OBz | H | CN | COOBu |
| H | 8-Cl | 5-OCOMe | H | CN | COOEt |
| 7-NHEt | 8-CF₃ | 5-OMe | H | COOMe | COOMe |
| 7-NHCOPr | H | H | Me | COOPr | COOPr |
| 7-i-Pr | H | 5-OH | H | COOMe | COOMe |
| H | 8-NHCOMe | 5-OMe | H | COOMe | CN |
| 7-Me | 8-Cl | 5-OH | HOCH(C₆H₁₁) | COOBu | COOBu |

EXAMPLE LXXXVI

2-[5¹-(3¹-4¹ - dicarbethoxy-isoxazolyl)methylidene] - 5-methoxy - 8 - chloro - 3,4,10 - trioxo-1,2,3,4a,9,9a,10-octahydroanthracene 400 mg. of 5-methoxy-8-chloro-3,4,10-trioxo-1,2,3,4,4a, 9,9a,10-octahydroanthracene, 363 mg. of 3,4-dicarbethoxy 5-formylisoxazole, 60 mg. of magnesium methoxide and 20 ml. of xylene are combined and heated with stirring on an oil bath at 100° C. for one hour. The dark red-brown mixture is evaporated to dryness, the residue dissolved in chloroform and extracted with 5 ml. of 2 N hydrochloric acid to decompose magnesium chelates present. The chloroform solution is then washed with water, dried and evaporated to dryness to give a brown residue. Upon trituration with ethylacetate, yellow needles are obtained. Recrystallization from acetone gives the pure product; M.P. 215–217° C.

| X | X₁ | X₂ | A | Y₂ | Y₃ |
|---|---|---|---|---|---|
| 7-NMe₂ | H | 5-OMe | Et | H | COOEt |
| H | 8-Pr | 5-OPr | H | COOEt | COOEt |
| H | H | 5-OMe | MeOCH | COOEt | COOEt |
| H | H | 5-OCOMe | Et | COOEt | COOEt |
| H | H | 5-OMe | Et | H | COOMe |
| H | H | 5-OCOBu | Me | H | COOMe |
| H | H | 5-OEt | Me | H | COOPr |
| H | H | 5-OMe | Me | H | COO-i-Pr |
| H | 8-Cl | 5-OMe | Pr | H | COOMe |
| H | H | 5-OH | Me | CN | COOMe |
| H | H | 5-OCOMe | H | CN | COOMe |
| H | 8-Cl | 5-OH | MeOCH(Me) | CN | COOMe |
| H | 8-Cl | 5-OMe | MeOCH₂ | COOEt | COOEt |
| H | 8-CF₃ | 5-OMe | Me | COOPr | COOPr |
| 7-OMe | H | 5-OMe | Me | COOEt | COOEt |
| 7-CF₃ | 8-CF₃ | 5-OMe | H | COOMe | COOMe |

EXAMPLE LXXXVII

2 - [(5'-(3',4'-Di(N - methylcarboxamido) - isoxazolyl) methylidene]-5-methoxy-8-chloro-3,4,10 - trioxo - 1,2, 3,4,4a,9,9a,10-octahydroanthracene.

The title product of Example LXXXVI (3.0 g.) is dissolved in monomethylamine (ca. 50 ml.) at −70° C.

under an inert atmosphere (nitrogen). The solution is held at −70° C. for 20 hours at the end of which time most of the excess amine is removed by evaporation in vacuo. Final traces of amine are removed by evaporation with chloroform. The residual brown foam is dissolved in chloroform and the solution washed successively with 2 N hydrochloric acid, dilute sodium hydroxide, 2 N hydrocloric acid, water and then dried over anhydrous sodium sulfate. Evaporation of the solvent gives the product as a tan solid which is obtained as yellow prisms by chromatograph on acid washed Florisil and crystallization from chloroform:acetone:hexane; M.P. 216–218° C.

In like manner but substituting the appropriate amine for monomethylamine the following isoxazole amides are prepared from the products of Example LXXXV and LXXXVI.

shaken with 0.5 N NaOH and the resulting mixture (both phases) acidified with 2 N HCL. The chloroform layer is separated, washed, successively with 0.5 N HCl, water and saturated salt solution.

The residue obtained on evaporation of the chloroform is crystallized from ethanol/water 1.83 g.; M.P. 235–237° C.

*Analysis*—Calcd. for $C_{24}H_{19}ClN_2O_8$ (percent): 57.58 C; 4.25 H; 5.59 N; 7.08 Cl. Found (percent): 57.27 C; 4.68 H; 5.92 N; 8.11 Cl.

The infrared spectrum showed the presence of both ester and amide groups.

By means of this procedure the remaining diester isoxazole compounds of Examples LXXXVI and those of Example LXXXV are converted to their corresponding monoamides.

| X | $X_1$ | $X_2$ | A | $Y_2$ | $Y_3$ |
|---|---|---|---|---|---|
| H | H | H | Me | H | $CONMe_2$ |
| H | 8-Et | 5-OMe | H | $CONHMe$ | $CONHMe$ |
| H | 8-NHCOMe | 5-OMe | H | $CONH_2$ | $CONH_2$ |
| H | 8-NMe$_2$ | 5-OMe | Me | $CONHMe$ | $CONHMe$ |
| H | H | 5-OMe | H | H | $CONH_2$ |
| 7-NHCOMe | H | 5-OMe | Me | $CONHMe$ | $CONHMe$ |
| 7-NEt$_2$ | H | 5-OMe | Et | H | $CONMe_2$ |
| 7-Me | H | 5-OMe | Me | $CONHMe$ | $CONHMe$ |
| 7-NMe$_2$ | H | 5-OMe | Me | $CONHMe$ | $CONHMe$ |
| 7-OEt | H | 5-OEt | $MeOCH_2$ | CN | $CONHEt$ |
| 7-CF$_3$ | H | 5-OMe | H | H | $CONH_2$ |
| H | 8-Cl | 5-OPr | H | $CONHMe$ | CN |
| H | 8-NHCOMe | 5-OMe | H | $CONH_2$ | CN |
| 7-Me | 8-Cl | 5-OH | $HOCH(C_6H_{11})$ | $CONHMe$ | $CONHMe$ |
| H | 8-CF$_3$ | 5-OMe | Me | CN | $CONHEt$ |
| H | H | 5-OMe | H | H | $CONHMe$ |
| 7-OCOMe | H | 5-OMe | H | $CONH_2$ | CN |
| 7-Me | H | 5-OH | Me | H | $CONMe_2$ |
| 7-NME$_2$ | 8-Cl | 5-OH | H | H | $CONHEt$ |
| 7-NH$_2$ | 8-Cl | 5-OMe | H | CN | $CONHEt$ |
| H | 8-NHCOMe | 5-OMe | Me | $CONH_2$ | $CONH_2$ |
| H | 8-Cl | 5-OMe | Me | CN | $CONH_2$ |
| H | 8-Cl | 5-OBz | H | $CONH_2$ | $CONH_2$ |
| 7-i-Pr | H | 5-OMe | Et | H | $CONHMe$ |
| H | H | 5-OCOEt | H | CN | $CONHMe$ |
| H | 8-CF$_3$ | H | Me | CN | $CONH_2$ |
| H | 8-Cl | 5-OMe | H | H | $CONMe_2$ |
| H | 8-Cl | 5-OMe | H | H | $CONHMe$ |
| H | 8-NH$_2$ | 5-OBz | H | CN | $CONHMe$ |
| H | 8-Cl | 5-OCOMe | H | $CONHEt$ | $CONHEt$ |
| 7-NHEt | 8-CF$_3$ | 5-OMe | H | $CONH_2$ | $CONH_2$ |
| 7-NMe$_2$ | H | 5-OMe | Et | H | $CONMe_2$ |
| H | 8-Pr | 5-OPr | H | $CONHMe$ | $CONHMe$ |
| H | H | 5-OMe | $MeOCH_2$ | $CONHMe$ | $CONHMe$ |
| H | H | 5-OCOMe | Et | $CONHMe$ | $CONHMe$ |
| H | H | 5-OMe | Et | H | $CONH_2$ |
| H | H | 5-OCOBu | Me | H | $CONHEt$ |
| H | H | 5-OEt | Me | H | $CONHMe$ |
| H | H | 5-OMe | Me | H | $CONHMe$ |
| H | 8-Cl | 5-OMe | Pr | H | $CONMe_2$ |
| H | H | 5-OH | Me | CN | $CONH_2$ |
| H | H | 5-OCOMe | H | H | $CONHMe$ |
| H | 8-Cl | 5-OH | $MeOCH(Me)$ | CN | $CONHMe$ |
| H | 8-Cl | 5-OMe | $MeOCH_2$ | $CONHEt$ | $CONHEt$ |
| H | 8-CF$_3$ | 5-OMe | Me | $CONHMe$ | $CONHMe$ |
| 7-OMe | H | 5-OMe | Me | $CONHMe$ | $CONHMe$ |
| 7-CF$_3$ | 8-CF$_3$ | 5-OMe | H | $CONH_2$ | $CONH_2$ |
| H | 8-CF$_3$ | H | Me | $CONHEt$ | $CONHEt$ |
| H | H | 5-OCOMe | H | CN | $CONHMe$ |

EXAMPLE LXXXVIII

2 - [(5′ - (3′ - N - methylcarboxamido - 4′ - carbethoxy)-isoxazolyl)methylidene] - 5 - methoxy - 8 - chloro - 3,4,10-trioxo - 1,2,3,4,4a,9,9a,10 - octahydroanthracene The title product of Example LXXXVI (2.0 g.) is weighed into an Erlenmeyer flask which is then attached to a 3-necked round-bottom flask by a length of Gooch tubing. The flask and the attached Erlenmeyer are evacuated and flushed with nitrogen. This process is repeated two more times. The Erlenmeyer is closed off from the flask by means of a clamp and 20 ml. monomethylamine is distilled into the 3-necked flask and cooled to −70° C. The vapor above the amine is replaced with nitrogen then the isoxazole diester added in one portion to the liquid monomethylamine. The clear amber solution which forms is held at −70° C. for 15 minutes then poured into a crushed ice-concentrated HCl mixture. The product is extracted with chloroform, the chloroform extract

EXAMPLE LXXXIX

2 - [(5$^1$ - (3$^1$ - N,N-dimethylcarboxamido)-isoxazolyl) (N,N-dimethylamino)methyl] - 5 - methoxy - 8-chloro-3,4,10-trioxo-1,2,3,4,4a,9,9a,10-octahydroanthracene The product of Example LXXXV (200 mg.) is dissolved in dimethylamine (10 ml.) in a tightly capped polyethylene bottle and maintained at 0° for 16 hours. The red solution becomes amber in color and a yellow crystalline solid separates. The reaction mixture is dissolved in ether at −10° and the amine evaporated in a stream of nitrogen (more dry ether is added to the mixture when necessary). The suspension is filtered under $N_2$, the crystalline residue washed with dry ether, and dried in a stream of $N_2$ at 0° C. M.P.; becomes red at 60°, finally melts at 215–217° C.

A crystalline dihydrochloride (unstable at room temperature) is prepared in dry ether, HCl; M.P. becomes orange at 100° C., finally melts at 207–209° C.

By means of this procedure, the remaining products of Examples LXXXV and those of LXXXVI are converted to the corresponding compounds of the formula

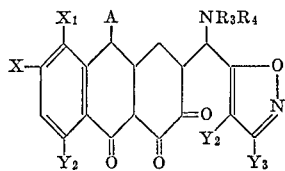

EXAMPLE XC

2 - (5' - (3' - N,N-dimethylcarboxamido)isoxazolyl)methylidene - 5 - methoxy - 8-chloro-3,4,10-trioxo-1,2,3,4,4a,9,9a,10-octahydroanthracene The product of Example LXXXV (150 mg.) is dissolved in liquid dimethylamine (17 ml.) and held at 0° C. for 18 hours. The excess amine is then removed by evaporation under nitrogen at room temperature to give the desired product. For purification the product is dissolved in hot chloroform and precipitated therefrom as crystals by the addition of hexane; M.P. 211–212° C.

Analysis.—Calcd. for $C_{22}H_{19}N_2O_6Cl$ (percent): C, 59.60; H, 4.32; N, 6.32. Found (percent): C, 59.34; H, 4.47; N, 6.8.

By this procedure the corresponding cyclic amides from pyrrolidine, morpholine and piperidine are prepared, substituting the desired amine for dimethylamine.

EXAMPLE XCI

The isoxazole amide products of Examples LXXXVII and LXXXVIII are reacted according to the procedure of Example LXXXIX with the appropriate amine $HNR_3R_4$ in place of dimethylamine to give compounds of Formula XVI-A.

EXAMPLE XCII

2 - [$5^1$($3^1$ - N,N - dimethylcarboxamido-isoxazolyl)(N-N - dimethylamino)methyl] - 3 - hydroxy-5-methoxy-8 - chloro - 4,10 - dioxo-1,2,3,4,4a,9,9a,10-octahydroanthracene A solution of 2.24 g. of the Example LXXXV title product is dissolved in 50 ml. of liquid dimethylamine in a tightly capped polyethylene bottle and stirred at 0° C. for 18 hours. The initial red solution becomes amber and yellow crystals begin to separate after 1.5 hours. The entire mixture is added to 100 ml. of dry Ansul ether at −5° to −10° C. in a nitrogen atmosphere. 500 g. of sodium borohydride in Ansul ether is added and the mixture stirred for 2.5 hours. Acetic acid (22 ml.) is added to the mixture which is then diluted to 250 ml. with water and then extracted several times with chloroform. The combined chloroform extracts are washed with water and evaporated to a red gum which is shaken vigorously with 50 ml. of 2 N HCl for 15–20 minutes. The mixture is filtered, the pH adjusted to 6–7 with 2 N KOH and the solution extracted 4 times with chloroform. The extracts are combined, washed with water and concentrated to yield a yellow solid which is dissolved in chloroform and precipitated as the hydrochloride by addition of HCl in ether.

EXAMPLE XCIII

2 - ($5^1$ - ($3^1$,$4^1$ - di-(N-methylcarboxamido)-isoxazolyl)-(N - methylamino)methyl - 3 - hydroxy-5-methoxy-8-chloro - 4,10 - dioxo - 1,2,3,4,4a,9,9a,10 - octahydroanthracene 500 mg. of the title product of Example LXXXVI is added to a 3 neck flask, equipped with a magnetic stirrer, gas inlet and outlet adapters and a rubber cap, and the flask connected to a nitrogen manifold and a tank of monomethylamine. The entire system is evacuated and

| X | $X_1$ | $X_2$ | A | $Y_2$ | $Y_3$ | $NR_3R_4$ |
|---|---|---|---|---|---|---|
| H | H | H | Me | H | $CONMe_2$ | $NMe_2$ |
| H | 8-Et | 5-OMe | H | $CONHMe$ | $CONHMe$ | $HNCOMe$ |
| H | 8-NHCOMe | 5-OMe | H | $CONH_2$ | $CONH_2$ | $NMe_2$ |
| H | 8-$NMe_2$ | 5-OMe | Me | $CONHMe$ | $CONHMe$ | $HNBz$ |
| H | H | 5-OMe | H | H | $CONH_2$ | morpholino |
| 7-NHCOMe | H | 5-OMe | Me | $CONHMe$ | $CONHMe$ | $HNMe$ |
| 7-$NEt_2$ | H | 5-OMe | Et | H | $CONMe_2$ | NBuz |
| 7-Me | H | 5-OMe | Me | $CONHMe$ | $CONHMe$ | $NMe_2$ |
| 7-$NMe_2$ | H | 5-OMe | Me | $CONHMe$ | $CONHMe$ | $NMe_2$ |
| 7-OEt | H | 5-OEt | $MeOCH_2$ | CN | $CONHEt$ | $NMe_2$ |
| 7-$CF_3$ | H | 5-OMe | H | H | $CONH_2$ | thiomorpholino |
| H | 8-Cl | 5-OPr | H | $CONHMe$ | CN | $NMe_2$ |
| H | 8-$CF_3$ | 5-OMe | Me | CN | $CONHEt$ | $NMe_2$ |
| H | H | 5-OMe | H | H | $CONHMe$ | $NMe_2$ |
| 7-OCOMe | H | 5-OMe | H | $CONH_2$ | CN | $NEt_2$ |
| 7-Me | H | 5-OH | Me | H | $CONMe_2$ | $NMe_2$ |
| 7-$NMe_2$ | 8-Cl | 5-OH | H | H | $CONHEt$ | $N[(CH_2)_2OMe]_2$ |
| 7-$NH_2$ | 8-Cl | 5-OMe | H | CN | $CONHEt$ | $NPr_2$ |
| H | 8-NHCOMe | 5-OMe | Me | $CONH_2$ | $CONH_2$ | $NMe_2$ |
| H | 8-Cl | 5-OMe | Me | CN | $CONH_2$ | $N(CH_2CH_2OMe)_2$ |
| H | 8-Cl | 5-OBz | H | $CONH_2$ | $CONH_2$ | HNBu |
| 7-i-Pr | H | 5-OMe | Et | H | $CONHMe$ | $HNCOMe$ |
| H | H | 5-OCOEt | H | CN | $CONHMe$ | $HMCOMe$ |
| H | 8-$CF_3$ | H | Me | CN | $CONH_2$ | $NMe_2$ |
| H | 8-Cl | 5-OMe | H | H | $CONMe_2$ | $NH_2$ |
| H | 8-Cl | 5-OMe | H | H | $CONHMe$ | $NH_2$ |
| H | 8-$NH_2$ | 5-OBz | H | CN | $CONHMe$ | $HNMe$ |
| H | 8-Cl | 5-OCOMe | H | $CONHEt$ | $CONHEt$ | piperazino |
| 7-NHEt | 8-$CF_3$ | 5-OMe | H | $CONH_2$ | $CONH_2$ | HNPr |
| 7-$NMe_2$ | H | 5-OMe | Et | H | $CONMe$ | $NMe_2$ |
| H | 8-Pr | 5-OPr | H | $CONHMe$ | $CONHMe$ | NHEt |
| H | H | 5-OMe | $MeOCH_2$ | $CONHMe$ | $CONHMe$ | $NMe_2$ |
| H | H | 5-OCOMe | Et | $CONHMe$ | $CONHMe$ | $NMe_2$ |
| H | H | 5-OMe | Et | H | $CONH_2$ | $NMe_2$ |
| H | H | 5-OCOBu | Me | H | $CONHEt$ | $NMe_2$ |
| H | H | 5-OEt | Me | H | $CONHMe$ | $NH_2$ |
| H | H | 5-OMe | NMe | H | $CONHMe$ | $N(CH_2CH_2OMe)_2$ |
| H | 8-Cl | 5-OMe | Pr | H | $CONMe_2$ | $NMe_2$ |
| H | H | 5-OH | Me | CN | $CONH_2$ | $NMe_2$ |
| H | H | 5-OCOMe | H | H | $CONHMe$ | HNMe |
| H | 8-Cl | 5-OH | MeOCH(Me) | CN | $CONHMe$ | $NMe_2$ |
| H | 8-Cl | 5-OMe | $MeOCH_2$ | $CONHEt$ | $CONHEt$ | $NMe_2$ |
| H | 8-$CF_3$ | 5-OMe | Me | $CONHMe$ | $CONHMe$ | $NEt_2$ |
| 7-OMe | H | 5-OMe | Me | $CONHMe$ | $CONHMe$ | $NMe_2$ |
| 7-$CF_3$ | 8-$CF_3$ | 5-OMe | H | $CONH_2$ | $CONH_2$ | $NMe_2$ |
| H | 8-$CF_3$ | H | Me | $CONHEt$ | $CONHEt$ | pyrrolo |
| H | H | 5-OCOMe | H | CN | $CONHMe$ | NHMe |
| H | H | 5-OMe | H | H | $CONH_2$ | pyrrolidino |
| H | 8-Cl | 5-OMe | H | $COOMe$ | $CONH_2$ | $MeN(CH_2CH_2OMe)$ |
| H | 8-NHCOMe | 5-OMe | H | $CONH_2$ | CN | $MeNCH_2CH_2OMe$ |
| 7-Me | 8-Cl | 5-OH | $HOCH(C_5H_{11})$ | $CONHMe$ | $CONHMe$ | HNBu | flushed with nitrogen several times, then monomethylamine (ca. 20 ml.) is distilled into the reaction vessel at −70° C. The mixture is maintained at −70° for 18½ hours during which time yellow crystals separated from the amber solution. Ten milliliters of monoglyme (freshly distilled from $CaH_2$) are injected through the rubber cap (into the reaction vessel), followed by a suspension of $NaBH_4$ 80 mg.) in monoglyme (ca. 5 ml.). Stirring at −70° C. is continued for 50 mins., then the mixture is removed from the cold bath and warmed to room temperature for ten minutes. The resultant dark brown solution is poured into water (200 ml.) and acidified with acetic acid (25 ml.) to produce a yellow precipitate which is extracted from the aqueous solution with chloroform. Evaporation of the chloroform gives a gum which is dissolved in dry methanol. Hydrogen chloride is bubbled into the methanol solution which is then vigorously boiled for 0.5–1.0 hour and evaporated to a yellow foam.

Extraction of the yellow foam with 2 N HCl at room temperature gives a clear yellow solution which is extracted with chloroform. Evaporation of the washed and dried chloroform extract affords the amine alcohol as its hydrochloride salt. Further quantities are obtained by treatment of the acid insoluble material with 2 N HCl, and by adjusting the pH of the acid extracts to pH 6.0. Extraction of the turbid liquor with chloroform gives the free base. The hydrochloride salt exhibits maxima in the ultraviolet region at U.V.:

(260), 345 (0.01 N NCl)
(260), 360 (0.01 N NaOH)

The infrared spectrum shows diamide and β-diketone groups to be present. The product gives a positive, (red brown) reaction with ferric chloride.

Repetition of this procedure using 26.4 g. of the product of Example LXXXVIII 500 ml. mono-methylamine, 6.54 g. sodium borohydride, but no monoglyme gives 26.7 g. of the amino alcohol product.

The sodium borohydride reduction procedures of Examples XCII and XCIII are applied to the reaction mixtures of Example LXXXIX to produce the corresponding 3-hydroxy compounds of Formula XVI–B.

EXAMPLE XCIV (A) Modified Michael reaction general process for isoxazole amides 2 - [(5¹ - (3¹,4¹-di(N-methylcarboxamido-isoxazolyl)-(N,N - dimethylamino) - methyl]-3-hydroxy-5-methoxy-8 - chloro - 4,10 - dioxo - 1,2,3,4,4a,9,9a,10 - octahydroanthracene.—The product of Example LXXXVIII 2-[(5¹ - (3¹,4¹ - di - (N-methylcarboxamido) - isoxaxolyl) methylidene] - 5 - methoxy-8-chloro-3,4,10-trioxo-1,2,3,4,4a,9,9a,10-octahydroanthracene, (200 mg.) is dissolved in freshly distilled dimethylamine (ca. 50 ml.) at 0° in an atmosphere of nitrogen, and the solution maintained at 0° C. for 3 to 4 hours. The mixture is then cooled to −15°, sodium borohydride (30 mg.) added with careful exclusion of air, and the resultant mixture stirred at −15° for 20 minutes to produce a clear brown solution. The solution is then poured into glacial acetic acid in ice and extracted with chloroform. Hydrogen chloride is bubbled into the washed and dried chloroform extracts which is then evaporated to dryness to produce a yellow foam. Extraction of the foam with 2 N HCl gives a clear yellow solution. The aqueous acid solution is extracted twice with chloroform, and the aqueous layer adjusted to pH 6.0 and extracted twice with chloroform. The extracts are dried with anhydrous sodium sulfate, then HCl gas added to produce a yellow solution. Evaporation of the yellow chloroform solution gives the amino alcohol as the hydrochloride.

Application of this procedure to the remaining products of Examples LXXXVIII and XCI produces the corresponding 3-hydroxy derivatives.

Similarly, the Example LXXXVIII products are converted to the 3-hydroxy derivatives of Example XCI by by substituting the appropriate amine for dimethylamine.

(B) Procedure for isoxazole ester groups

2 - [(5' - (3',4' - dicarbethoxy)-isoxazolyl) (N,N-dimethylamino) - methyl] - 3-hydroxy-5-methoxy-8-chloro-4,10 - dioxo - 1,2,3,4,4a,9,9a,10-octahydroanthracene.—2-[5' - (3',4-dicarbethoxy) - isoxazoly)methylidene]-5-methoxy-8-chloro-3,4,10-trioxo - 1,2,3,4,4a,9,9a,10- octahydroanthracene (2.5 g.), prepared according to Example LXXXVI is dissolved in 450 ml. of Ansul Ether (121) with warming. The solution is cooled to room temperature and sodium hydride (500 mg., 53% dispersion in mineral oil) added. The mixture is stirred under nitrogen for 30 minutes then evaporated under reduced pressure at 40° C. to a reddish-brown residue.

The residue is dissolved in an excess of dimethylamine at 0° C. and stored at 0° C. overnight. The reddish-brown solution is then stirred and treated with powdered sodium borohydride (750 mg.) at −18° C. for 20 minutes then poured into a mixture of acetic and (250 ml.), ice (1000 g.) and chloroform (250 ml.) and stirred for 15 minutes. The chloroform layer is separated, washed several times with water and dried over anhydrous sodium sulfate. Evaporation of the chloroform gives the product as a brown foam which is purified by digestion for 30 minutes at room temperature in 2 N HCl. The solution is filtered, neutralized with sodium bicarbonate and the free base extracted with chloroform. Removal of the chloroform, after drying over anhydrous sodium sulfate yields the product as a yellow gum.

By means of this procedure the remaining products of Example LXXXVI and those of LXXXV are converted to the following compounds by substituting the appropriate amine $HNR_3R_4$ for dimethylamine.

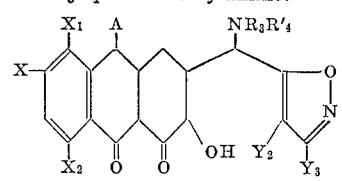

| X | $X_1$ | $X_2$ | A | $Y_2$ | $Y_3$ | $NR_3R_4$ |
|---|---|---|---|---|---|---|
| H | H | H | Me | H | COOEt | $NMe_2$ |
| H | 8-Et | 5-OMe | H | COOEt | COOEt | HNCOMe |
| H | 8-NHCOMe | 5-OMe | H | COOEt | COOEt | $NMe_2$ |
| H | 8-NMe₂ | 5-OMe | Me | COOEt | COOEt | HNBz |
| H | H | 5-OMe | H | H | COOMe | $NH_2$ |
| 7-NHCOMe | H | 5-OMe | Me | COOEt | COOEt | HNMe |
| 7-NEt₂ | H | 5-OMe | Et | CN | COOMe | $NEt_2$ |
| 7-Me | H | 5-OMe | Me | COOPr | COOPr | HNBu |
| 7-NMe₂ | H | 5-OMe | Me | COO-i-Pr | COO-i-Pr | $NMe_2$ |
| 7-OEt | H | 5-OEt | MeOCH₂ | $CNH_2$ | COOEt | $NMe_2$ |
| 7-CF₃ | H | 5-OMe | 5-OMe | CN | COOEt | thiomorpholino |
| H | 8-Cl | 5-OPr | H | CN | COOEt | $NMe_2$ |
| H | 8-CF₃ | 5-OMe | Me | CN | COOEt | $NMe_2$ |
| H | H | 5-OMe | H | H | COOMe | morpholino |
| 7-OCOMe | H | 5-OMe | H | H | COOEt | $NMe_2$ |
| 7-Me | H | 5-OH | Me | COOPr | COOPr | $NMe_2$ |
| 7-NMe₂ | 8-Cl | 5-OH | H | CN | COOEt | $HN(CH_2CH_2OMe)$ |
| 7-NH₂ | 8-Cl | 5-OMe | H | COOMe | CN | $NPr_2$ |

TABLE—Continued

| X | X₁ | X₂ | A | Y₂ | Y₃ | NR₃R₄ |
|---|----|----|---|----|----|-------|
| H | 8-NHCOMe | 5-OMe | Me | COOPr | COOPr | NMe₂ |
| H | 8-Cl | 5-OMe | Me | CN | COOBz | N(CH₂CH₂OMe)₂ |
| H | 8-Cl | 5-OBz | H | CN | COOMe | N(CH₂CH₂OPr)₂ |
| 7-i-Pr | H | 5-OMe | H | H | COOPr | HNCOMe |
| H | H | 5-OCOEt | H | CN | COOEt | HNCOMe |
| H | 8-CF₃ | H | Me | CN | COOMe | NMe₂ |
| H | 8-Cl | 5-OMe | H | H | COOBz | NH₂ |
| H | 8-Cl | 5-OMe | H | H | COOi-amyl | NH₂ |
| H | 8-NH₂ | 5-OBz | H | CN | COOBu | HNMe |
| H | 8-Cl | 5-OCOMe | H | CN | COOEt | piperazino |
| 7-NHEt | 8-CF₃ | 5-OMe | H | COOMe | COOMe | NMe₂ |
| 7-NHCOPr | H | H | Me | COOPr | COOPr | pyrrolidino |
| 7-i-Pr | H | 5-OH | H | COOMe | COOMe | (2-carbethoxy) pyrrolidino |
| 7-NMe₂ | H | 5-OMe | Et | H | COOEt | NMe₂ |
| H | 8-Pr | 5-OPr | H | COOEt | COOEt | HNPr |
| H | H | 5-OMe | MeOCH₂ | COOEt | COOEt | NMe₂ |
| H | H | 5-OCOMe | Et | COOEt | COOEt | NMe₂ |
| H | H | 5-OMe | Et | H | COOMe | N(CH₂CH₂OEt)₂ |
| H | H | 5-OCOBu | Me | H | COOMe | NMe₂ |
| H | H | 5-OEt | Me | H | COOPr | NHMe |
| H | H | 5-OMe | Me | H | COO-i-Pr | N(CH₂CH₂OMe)₂ |
| H | 8-Cl | 5-OMe | Pr | H | COOMe | N[(CH₂)₃OMe]₂ |
| H | H | 5 OH | Me | CN | COOMe | NMe₂ |
| H | H | 5-OCOMe | H | CN | COOMe | NEt₂ |
| H | 8-Cl | 5-OH | MeOCH(Me) | CN | COOMe | NMe₂ |
| H | 8-Cl | 5-OMe | MeOCH₂ 0 | COOEt | COOEt | NMe₂ |
| H | 8-CF₃ | 5-OMe | Me | COOPr | COOPr | NPr₂ |
| 7-OMe | H | 5-OMe | Me | COOEt | COOEt | NMe₂ |
| 7-CF₃ | 8-CF₃ | 5-OMe | H | COOMe | COOMe | NMe₂ |
| H | 8-CF₃ | H | Me | CN | COOEt | pyrrolo |
| H | 8-Cl | 5-OMe | H | COOMe | CONH₂ | MeN(CH₂CH₂OMe) |
| H | 8-NHCOMe | 5-OMe | H | CONH₂ | CN | MeNCH₂CH₂OMe |
| 7-Me | 8-Cl | 5-OH | HOCH(C₅H₁₁) | CONHMe | CONHMe | HNBu |

EXAMPLE XCV

2 - [(5¹ - (3¹,4¹ - di - (N - methylcarboxamido) - isoxazolyl) (N,N - dimethylamino) - methyl] - 3 - formyloxy - 5 - methoxy - 8 - chloro - 4,10 - dioxo - 1,2, 3,4,4a,9,9a,10-octahydroanthracene To 0.74 g. of the product of Example XCIV–A dissolved in 6 ml. pyridine at 0° is added 3 ml. acetoformic anhydride. The mixture is stirred for one half hour then poured into CHCl₃, washed with water twice and saturated sodium chloride once, and dried over Na₂SO₄. The filtered solution is treated with activated carbon and concentrated to dryness several times with repeated addition of toluene to remove the pyridine. The residue is then taken up in chloroform, HCl bubbled in, the solution concentrated and the residue triturated with chloroformethyl acetate.

The remaining products of Example XCIV amides and esters alike, and the products of Examples XCII and XCIII converted to their formyloxy derivatives by the same procedure.

EXAMPLE XCVI

2-[(5¹ - 3¹,4¹ - di(N - methylcarboxamido) - isoxazolyl) (N,N - dimethylamino)methyl] - 5 - methoxy-8-chloro-4,10-dioxo-1,2,3,4,4a,9,9a,10-octahydroanthracene Under a nitrogen atmosphere a solution of 5 g. of the title product of Example XCV and 30 ml. of 98% formic acid is treated for two minutes with 1.5 g. of zinc dust. The reaction mixture is filtered through Supercel and the filtrate is evaporated under reduced pressure with addition of toluene to give a residue. The residue is dissolved in chloroform, the solution saturated with hydrogen sulfide gas, and filtered through Supercel. The filtrate is reduced to a gum, dissolved in chloroform and the solution saturated with dry hydrogen chloride and filtered. The filtrate is evaporated to a gum, redissolved in a small volume of chloroform and chromatographed on Florisil. The first fraction (fluorescent) is collected, evaporated to a gum and redissolved in a small volume of chloroform. It is converted to the hydrochloride by treatment with dry HCl and the solution concentrated. The residual gum is triturated with ethyl acetate to give a crystalline yellow solid. Upon recrystallization from ethyl acetate and chloroform the pure product is obtained; M.P. 243–245° C.

The 3-formyloxy groups of the remaining compounds of Example XCV are removed by this same procedure to give the corresponding 4,10-dioxooctahydroanthracenes.

EXAMPLE XCVII

2-[(5¹-(3¹,4¹ - di - (N - methylcarboxamido)-isoxazolyl) (N - methyl - N - formylamino) - methyl] - 3 - formyloxy - 5 - methoxy - 8 - chloro - 4,10 - dioxo - 1,2,3,4, 4a,9,9a,10-octahydroanthrancene Acetoformic anhydride (5 ml.) is added dropwise to a vigorously stirred solution of the precursor amino alcohol of Example XCIII in dry pyridine (30 ml.) at 0° C. The mixture is held at 0° C. for an additional 30 minutes then poured into 200 ml. of cold water. The aqueous solution is extracted with chloroform, the chloroform extract washed with water, dried with anhydrous sodium sulfate, then evaporated to give the diformylated product as a yellow foam. The product is purified by chromatography on acid washed Florisil using 5% methanol in chloroform as eluant.

The product is characterized by low solubility in acids, a red-brown color reaction with ferric chloride, ultra-violet absorption maxima at 340 mμ in acid and 355 mμ in alkaline solution, and a peak at 5.75μ in the infrared region which is not present in the infrared curve of the starting amino alcohol.

Upon repetition of this procedure using 26.7 g. of the amino alcohol of Example XCIII 240 ml. pyridine, 120 ml. of acetoformic anhydride and 1 liter of water there is obtained 29.0 g. of crude diformyl product.

The [(N-monosubstituted amino)methyl]3-hydroxy-substituted octahydroanthracenes of Examples XCIII and XCIV are converted to their diformyl derivatives in like manner.

EXAMPLE XCVIII

2-[5¹-(3¹,4¹ - di - (N - methylcarboxamido)isoxazolyl)-N - methyl - N - formylamino)-methyl]-5-methoxy-8-chloro - 4,10-dioxo - 1,2,3,4,4a,9,9a,10 - octahydroanthracene (A) The diformylated product of Example XCVII (750 mg.) is dissolved in methanol (75 ml.) and zinc chloride (230 mg.) added. Zinc dust (750 mg.) and formic acid (98%; 1.2 ml.) are added to the amber solution and the mixture stirred for 17.5 hours. It is then filtered and the filtrate evaporated. The residue is shaken with chloroform and 2 N hydrochloric acid (20 ml.) to decompose the zinc chelate. Evaporation of the chloroform gives the product as a yellow foam. It is insoluble in aqueous acid, produces a red brown color with ferric chloride and exhibits maxima in the ultra-violet region at 345 and 350 mμ in acid and alkaline solutions, respectively. It exhibits no absorption at 5.75μ in the infrared region.

For purification, the crude reaction product, free of zinc, is dissolved in chloroform and chromatographed on acid washed Florisil. The column is developed with chloroform and then eluted successively with chloroform, 1% methanol in chloroform and 1.5% methanol in chloroform; several aliquots being collected at each dilution. All aliquots are examined by descending paper chromatography in the system carbon tetrachloride saturated with formamide as mobile phase and, as stationary phase, paper dipped in a solution of 40% formamide in methanol then blotted dry. Each aliquot having material of $R_f$ value 0.2–0.25 is collected, combined and evaporated to dryness to give a yellow foam composed chiefly of the desired 3-desoxy product contaminated with products of $R_f$ 0.85–0.9 and the 3-hydroxy derivative with $R_f$ 0.00.

The Florisil column is then stripped with methanol to give, upon evaporation, a dark yellow foam consisting mainly of 2-[(5$^1$-(3$^1$,-4$^1$-di(N-methylcarboxamido)isoxazolyl)-(N-methyl-N-formylamino)methyl] - 3 - hydroxy-5-methoxy-8-chloro - 4,10 - dioxo-1,2,3,4,4a,9,9a,10-octahydroanthracene.

The 3-desoxy compound is chromatographed on a partition column in the following manner. A suspension of SuperCel in a mixture of 40 parts formamide-60 parts methanol is packed into a column under a positive nitrogen pressure to give a hard packed column. A solution of the 3-desoxy compound, dissolved in the minimum volume of formamidemethanol is added to the top of the column then washed down the column about 4 mm. The top of the column is covered with sand. The mobile phase, carbon tetrachloride saturated with formamide, is added and under a positive nitrogen pressure the column is run at a fast rate until the mobile phase overtakes the compound. The aliquots collected are examined by paper chromatography. Those containing the product with $R_f$ 0.2–0.25 and characterized by a blue-green fluorescence in the ultraviolet, a red-brown color reaction with ferric ions, are combined, shaken with water then with saturated sodium chloride solution. The carbon tetrachloride solution is dried with anhydrous sodium sulfate then evaporated to a yellow foam which is crystallized from acetonehexane to give the pure 3-desoxy product as pale yellow prisms and clusters; M.P. 278–280° dec.

Ultraviolet absorption maxima (H+/MeOH): 345 mμ, ε 13,500; (OH−) 351 mμ, ε 13.800. The infrared curve shows 3 amide groups: 2 secondary amides and formamide.

*Analysis.*—Calcd. for $C_{25}H_{27}O_7N_4Cl$ (percent): C, 56.50; H, 5.13; N, 10.5; Cl, 6.68. Found (percent): C, 56.37; H, 5.21; N, 10.48; Cl, 6.74.

The product is hydrolyzed to the corresponding 5-hydroxy compound by treatment with 48% HBr (950 mg. in 10 ml.) on a steam bath until a clear solution results. The cooled solution is extracted with chloroform, the extract washed with water, dried and evaporated. The residue is chromatographed on acid washed Florisil, eluted with 1% methanol/CHCl₃ to give a yellow gum which is crystallized from acetone; M.P. sinters at 295° C., does not melt below 300° C.

The 3-0 formyl group of the products of Examples XCV and XCVII are removed in like manner to produce the corresponding 3-desoxyisoxazolyl amide and ester compounds.

(B) A solution of the diformylated product of Example XCVII (29.0 g.), fused zinc chloride (13.1 g.) and acetic acid (700 ml.) is vigorously stirred for 15 minutes. Zinc dust (29.0 g.) is then added and the mixture stirred at room temperature for one hour. The excess zinc is removed by filtration, the filter cake washed with acetic acid and the combined filtrate and washings evaporated to dryness. The residue is shaken with 50 ml. chloroform and 50 ml. of 2 N hydrochloric acid to decompose the zinc chelate. The chloroform solution is washed several times with acid, followed by water, then evaporated to produce a yellow foam. Purification by partition chromatography as described above on a SuperCel column (CCl₄/DMF) gives 9.76 g. of product in the main fraction. The corresponding desdimethylamino compound (1.0 g.) is also obtained M.P. 178–180° C., from ethyl acetate.

Further purification of the remaining combined eluates affords an additional 1.6 g. of the desired product, plus 1.2 g. of the 4-desdimethylamino compound and 600 mg. of the geometric isomer of the desired product which has the reverse stereochemistry at C-4a (M.P. 306°–308° C.). An amorphous residue (6.5 g.) of the two isomers is also obtained. The isomers have identical ultraviolet and infrared spectra but are distinguishable by paper chromatography in the system carbon tetrachloride:acetic acid: water (10:7:3). The desired product has $R_f$ 0.55 and its isomer $R_f$ 0.4.

EXAMPLE XCIX

2 - [(5' - (3',4' - di - (N - methylcarboxamido)isoxazolyl) - (N - methylamino)-methyl] - 5 - methoxy-8-chloro - 4,10 - dioxo - 1,2,3,4,4a,9,9a,10 - octahydroanthracene The title product of Example XCVIII (500 mg.) dissolved in 60 ml. anhydrous methanol is saturated with dry hydrogen chloride then refluxed for 18 hours under nitrogen. The mixture is evaporated to dryness, the residue taken up in water and extracted with chloroform. The extract is washed with water, dried with anhydrous sodium sulfate and evaporated to give the hydrochloride salt of the N-monomethyl amine product. It is purified by crystallization from methanol as yellow prisms. Ultraviolet absorption maxima (H+) 345 mμ: (OH−) 350 mμ, ε=13,600; M.P. 244–246° dec.

*Analysis.*—Calcd. for $C_{24}H_{27}O_6N_4Cl.HCl.CH_3OH$ (percent): C, 52.54; H, 5.65; N, 9.80; Cl, 12.41. Found (percent): C, 52.29; H, 5.69; N, 9.86; Cl, 12.50.

This product is acetylated by conversion to the free base by treatment with aqueous sodium bicarbonate. The free base is separated, dissolved in 30 ml. of acetic anhydride and the mixture refluxed for one hour. Evaporation to dryness gives the crude N-acetyl derivative which is purified by chromatography on acid washed Florisil and elution with 1% methanol/chloroform. The eluate is taken to dryness, the residue dissolved in 30 ml. warm benzene and the product precipitated therefrom by the slow addition of hexane, M.P. 200–206° C.

By means of this procedure the remaining N-formyl derivatives of Example XCVIII are converted to the corresponding N-monosubstituted amines and N-acetyl derivatives.

EXAMPLE C

2-[(5' - (3',4' - di - (N-methylcarboxamido)isoxazolyl)-(N,N-dimethyl-amino)methyl] - 5 - methoxy-8-chloro-4,10-dioxo-1,2,3,4,4a,9,9a,10-octahydroanthracene The hydrochloride salt of the N-monomethylamino product of Example XCIX (1.5 g.) is dissolved in 75 ml. of ethylacetate-water (2–1) with stirring. Sodium bicarbonate (1.5 g.) is then added followed by the dropwise addition under nitrogen of dimethylsulfate (660 mg.) in 15 ml. ethylacetate over a one hour period at room temperature. The reaction mixture is stirred vigorously throughout the addition and 45 minutes thereafter. The two layers are separated, the ethylacetate phase washed once with saturated sodium bicarbonate then water and evaporated to dryness. The residue is purified by chromatography on Florisil using chloroform as eluant. The free base has the $R_f$ value 0.65–0.7 in the system:cyclohexane (4):benzene (1):saturated with formamide as mobile phase and paper dipped in a solution of 40% formamide in methanol then blotted dry as the stationary phase. (The unchanged N-mono-methylamine compound has $R_f$ value of 0.25–0.3 in this system.)

The desired product, M.P. 168–171° C. from acetone, and its geometrical isomer, M.P. 286–287° C. (dec.) from acetone, are obtained in 55% and 8% yield, respectively.

Analysis.—Calcd. for $C_{25}H_{29}O_6N_4Cl$ (percent): C, 58.08; H, 5.65; N, 10.93; Cl, 6.86. Found (desired product) (percent): C, 58.30; H, 5.77; N, 10.61; Cl, 6.65. (Geometrical isomer) (percent): C, 57.85; H, 5.98; N, 10.53; Cl, 6.79.

The dimethylamino product exhibits absorption maxima in the ultraviolet (H+) 345 m$\mu$; (OH−) 352 m$\mu$. The infrared curve shows two secondary amide groups and $\beta$-diketone groups to be present. M.P. 144–146° dec.

The remaining N-monosubstituted amines of Example XCIX are methylated in like manner.

EXAMPLE CI n-Butyl-4-oxo-5-methoxy-8-chloro-10-hydroxy-1,2,3,4-tetrahydroanthracene-2-($\alpha$-dimethylamino)-acetate

*Method A.*—Anhydrous sodium acetate (1.15, 0.014 mole) is added to a solution of n-butyl-5-methoxy-8-chloro-4,10-dioxo - 1,2,3,4,4a,9,9a,10 - octahydroanthracene-2-($\alpha$-dimethylamino)acetate (4.35 g., 0.01 mol) (prepared according to the procedure of Example LXXIII) in 30 ml. ethylacetate and 60 ml. glacial acetic acid and the mixture is cooled to 0°–5° C. and 11 ml. of a 1 M solution of bromine in glacial acetic acid is added slowly, with stirring. Upon completion of the bromine addition the entire mixture is poured into benzene and the benzene solution washed with sodium chloride solution containing a little sodium sulfite followed by four successive washings with water. The benzene layer is dried over anhydrous sodium sulfate and evaporated to dryness to give a foam; n-butyl-4a-bromo-5-methoxy-8-chloro-4,10-dioxo - 1,2,3,4,4a,9,9a,10 - octahydroanthracene-2-($\alpha$-dimethylamino)acetate.

The bromodiketone is dissolved in 35 ml. of freshly distilled collidine and the solution heated at reflux for 12 minutes under a nitrogen atmosphere. The solution is cooled and decanted from the solid collidine hydrobromide. The solid is washed with ether-benzene and the washings added to the collidine solution. The solution is stripped in vacuo at a temperature not above 50° C. The residue is suspended in water, the pH adjusted to about 5, and the product extracted with chloroform. The chloroform solution is dried over anhydrous sodium sulfate then evaporated to dryness. The product is chromatographed on acid-washed Florisil, if desired, for purification.

*Method B.*—0.01 mole of n-butyl-5-methoxy-8-chloro-4,10 - dioxo - 1,2,3,4,4a,9,9a,10 - octahydroanthracene-2-($\alpha$-dimethylamino)acetate (4.36 g.) is dissolved in 25 ml. of chloroform, diluted with 100 ml. of ether. The mixture is stirred, irradiated with a 500 watt lamp and treated with 0.1 ml. of a mixture of 0.5 ml. bromine and 3.5 ml. carbon tetrachloride. As soon as the solution becomes colorless after addition of the bromine, the remainder of the bromine solution is added over a period of 15 minutes without further irradiation and with cooling. After one hour at room temperature the solvent is removed in vacuo. The residue is taken up in 50 ml. of benzene and then evaporated to dryness to remove traces of chloroform. The residue is taken up in 30 ml. of methanol, a solution of 0.25 g. of sodium dithionite in 20 ml. of 20% NaOH added and the mixture refluxed for three hours. The mixture is then acidified while still hot with hydrochloric acid, the product filtered off, washed with water and dried.

By application of the procedures of methods A and B, the 4,10-dioxo-octahydroanthracene amino acids of Examples LXXIII, LXXVIII, LXXXII, LXXXIII and LXXXVII, the 2-[(isoxazolyl) (amino)methyl]-4,10-dioxo-octahydroanthracenes of Examples XCVI, XCVIII, XCIX and C are aromatized. In the case of reactants which contain primary amino and/or hydroxy groups, these sensitive groups are protected by acylation or benzylation. Hydroxyl groups are also protected by formation of alkyl ethers, if desired.

The esters thus produced by methods A and B above are hydrolyzed to the corresponding acids by mild acid hydrolysis. Alternatively mild alkaline hydrolysis, e.g. with an alkali metal carbonate or bicarbonate, followed by neutralization of the alkali metal salt can be used.

EXAMPLE CII 4-oxo-5-methoxychloro-10-hydroxy-1,2,3,4-tetrahydroanthracene-2-($\alpha$-dimethylaminoacetonyl)-$\gamma$,$\gamma$-dinitrile Malonodinitrile, 0.015 mole, is dissolved in 100 ml. dry dimethyl formamide and treated with 0.015 mole sodium hydride (as a 50% dispersion in oil), added in portions over a 30 minute period. After hydrogen evolution ceases, 0.01 mole of the mixed anhydride of 4-oxo-5-methoxy-8-chloro-10-hydroxy-1,2,3,4-tetrahydroanthracene-2-($\alpha$ - dimethylamino) acetic acid with neopentylchloro carbonate (Example CIV in 100 ml. of dry di-methylformamide is added). The mixture is stirred for 16 hours at room temperature and then concentrated at reduced pressure to remove the solvent. The residue is taken up in 200 ml. of chloroform. The chloroform solution is extracted six times with 1.5 N hydrochloric acid, four times with water (acid-free), two times with saturated sodium chloride solution and dried over anhydrous sodium sulfate. Evaporation of the solvent provides the desired substance as residue.

The corresponding $\gamma$-cyano-$\gamma$-carbethoxy and $\gamma$-carboxamido-$\gamma$-carbethoxy compounds are obtained in the same way, substituting equimolar proportions of cyanoacetic ester and malonic ester half amide for the malononitrile.

In the same way, malonic monobutyl ester mono-N-t-butyl amide, malonic monoethyl ester monocarboxamide and malonic mononitrile mono-N-t-butyl amide are substituted in equimolar proportion for the malononitrile in separate experiments, to obtain, respectively, the corresponding $\gamma$-mono-N-t-butyl-carboxamido-$\gamma$-carbobutoxy,
$\gamma$-mono-carboxamido-$\gamma$-carbethoxy and
$\gamma$-mono-N-t-butyl-carboxamido-$\gamma$-cyano compounds. Each of the N-t-butylamide compounds is dissolved in concentrated sulfuric acid (0.4 g. in 2 ml.) and the solutions allowed to stand for one hour at room temperature. Careful dilution with 2 volumes of water, with cooling, causes precipitation of butyl - 4 - oxo-5-methoxy-8-chloro-10-hydroxy-1,2,3,4-tetrahydroanthracene - 2-($\alpha$ - dimethylaminoacetonyl)-$\gamma$-carboxamide-$\gamma$-carboxylate, and
4-oxo-5-methoxy - 8 - chloro-10-hydroxy-1,2,3,4-tetrahydroanthracene - 2 - ($\alpha$-dimethylaminoacetonyl)-$\gamma$-dimethylaminoacetonyl-$\gamma$-carboxamide-$\gamma$-nitrile, respectively.

EXAMPLE CIII

Methyl - 4 - oxo-5-methoxy-8-chloro-10-hydroxy-1,2,3,4-tetrahydroanthracene - 2 - [$\alpha$-dimethylaminoacetonyl]-$\gamma$-carboxamide-$\gamma$-carboxylate A solution of 2.64 g. (0.02 mole) of magnesium ethoxy malonic half methyl ether half amide and 40 cc. of 1,2-dimethoxyethane is added as rapidly as safety permits to an ethereal solution of 0.02 mole of ethyl magnesium bromide. With cooling and efficient stirring the mixed anhydride of 4-oxo-5-methoxy-8-chloro-10-hydroxy-1,2,3,4-tetrahydroanthracene-2-[($\alpha$-dimethylamino)acetic acid] and n-butyl chloro carbonate, 0.02 mole, in 40 cc. of 1,2-dimethoxyethane is added dropwise. The reaction mixture is stirred overnight at room temperature, and is then treated with 2.0 cc. of glacial acetic acid. The volatile components are evaporated under reduced pressure and the residue is taken up in 100 cc. of chloroform. The chloroform solution is first washed three times with 25 cc.

portions of 1 N HCl and then three times with 25 cc. portions of water. The chloroform solution is dried over anhydrous sodium sulfate, filtered, and evaporated under reduced pressure to give the desired product. It is recrystallized from a hot solution of ethyl acetate and hexane.

EXAMPLE CIV

Hydrochloride salt of 4-oxo-5-methoxy-8-chloro-10-hydroxy - 1,2,3,4 - tetrahydroanthracene-2-($\alpha$-dimethylamino)acetic acid anhydrides with lower (alkyl)carbonates To a magnetically stirred suspension of 1.17 g. (0,0031 mole) of the title acid of Example LXXVI in 100 ml. of chloroform is added 0.86 ml. (0.63 g., 0.0062 mole) of triethylamine. After the acid dissolves the solution is cooled to 0° and 0.76 g. (0.0062 mole) of i-propylchloroformate is added. The solution is stirred at 0° for two hours then extracted rapidly with two portions of water and one portion of saturated sodium chloride solution. The chloroform solution is dried over anhydrous sodium sulfate, then hydrogen chloride is bubbled into the solution for two minutes. The chloroform is then evaporated under reduced pressure and the residual yellow solid triturated with ethyl acetate. The product, removed by filtration, consists of yellow crystals.

The ethyl, n-butyl, neopentyl and i-butyl mixed anhydrides are also prepared by the above procedure from the appropriate chloroformate esters.

Similarly, the remaining amino acid compounds of Example LXXVI are reacted with the lower(alkyl)-chloroformates to give the respective mixed anhydrides.

EXAMPLE CV

Ethyl - 4 - oxo-5-methoxy-8-chloro-10-hydroxy-1,2,3,4-tetrahydroanthracene - 2 - ($\alpha$-dimethylaminoacetonyl)-$\gamma$-carboxamide-$\gamma$-carboxylate (A) A solution of 0.01 mole 4-oxo-5-methoxy-8-chloro-10-hydroxy-1,2,3,4-tetrahydroanthracene - 2-($\alpha$-dimethylamino)acetic acid and 0.02 mole triethylamine in 50 ml. dry chloroform is cooled in an ice-salt bath and 0.02 mole ethylchlorocarbonate is added rapidly with continuous stirring. Stirring is then continued for 30 minutes after which the solvent is removed in the cold under reduced pressure.

(B) The 4-oxo - 5 - methoxy-8-chloro-10-hydroxy-1,2,3,4 - tetrahydroanthracene-2-($\alpha$-dimethylamino)acetic-carbonic anhydride, prepared in A above is dissolved in 30 ml. acetonitrile, 0.02 mole of magnesium ethoxy malonic half ethyl ester half amide is added. During the addition the temperature is maintained at —5–0° C. with cooling as required. The mixture is allowed to come to room temperature and to stand overnight. The solvent is removed, the residue dissolved in CHCl$_3$ and extracted 3 times with 3 N HCl, three times with water and once with brine. The chloroform solution is then dried with anhydrous sodium sulfate and concentrated at reduced pressure to obtain the desired product as residue.

EXAMPLE CVI

The products of Example CIV are converted to the malonic acid derivatives of Formula XIX by the procedure of Example CV-B. In this manner the following malonic acid derivatives are produced from the appropriate magnesio malonic acid derivative EtO—CH(Y$_4$)(X$_4$).

| X | X$_1$ | X$_2$ | A | NR$_3$R$_4$ | Y$_4$ | X$_4$ |
|---|---|---|---|---|---|---|
| H | 8-Cl | 5-OBz | Me | NMe$_2$ | COOMe | CN |
| 7-OMe | H | H | Me | NMe$_2$ | COOBu | CONH$_2$ |
| 7-OH | H | H | Me | NEt$_2$ | CN | CN |
| 7-Et | 8-Cl | 5-OMe | H | NBz$_2$ | CN | CONH$_2$ |
| 7-OMe | H | H | Pr | NMe$_2$ | COOMe | CN |
| 7-OMe | H | 5-OMe | Pr | HNMe | COOMe | CN |
| 7-OBz | H | 5-OBz | Me | HNMe | COOEt | CONHEt |
| 7-NHCOMe | H | 5-OMe | Me | piperidino | COOMe | COONH$_2$ |
| 7-NMe$_2$ | H | 5-OH | Et | HNBu | COOEt | CONH$_2$ |
| H | H | H | Me | NMe$_2$ | COOEt | CONH$_2$ |
| H | 8-Et | 5-OMe | H | HNMe | COOEt | CONHMe |
| H | 8-NMe$_2$ | 5-OMe | Me | HNBz | COOEt | CONHMe |
| H | 8-NH$_2$ | 5-OMe | Me | NMe$_2$ | CN | CONHBu |
| H | 8-Cl | 5-OH | Me | N(CH$_2$CH$_2$OMe)$_2$ | COOEt | CONH$_2$ |
| 7-Me | H | 5-OH | Et | NBz$_2$ | COOEt | CONH$_2$ |
| 7-i-Pr | 8-Cl | 5-OH | Et | HNMe | COOEt | CONHBu |
| 7-Et | 8-Et | 5-OH | H | HNMe | COOEt | CONHPr |
| H | 8-NHCOMe | 5-OMe | H | NMe$_2$ | COOEt | CONH-t-Bu |
| 7-Et | H | 5-OMe | H | HNMe | CN | CONH$_2$ |
| H | H | 5-OCOBu | Me | HNEt | COOEt | CN |
| H | H | 5-OCOMe | Et | HNEt | CN | CONH$_2$ |
| H | H | 5-OEt | Me | NBu$_2$ | COOBu | CN |
| H | H | 5-OMe | MeOCH$_2$ | NMe$_2$ | COOPr | CONH$_2$ |
| H | 8-NHCOMe | 5-OMe | H | MeNCH$_2$CH$_2$OMe | COOMe | CONH$_2$ |
| H | 8-Cl | 5-OH | MeOCH(Me) | N[(CH$_2$)$_3$OMe]$_2$ | COOMe | CN |
| H | 8-Cl | 5-OMe | MeOCH$_2$ | NMe$_2$ | CN | CONH$_2$ |
| H | H | 5-OH | Me | NEt$_2$ | CH | CONHMe |
| 7-CF$_3$ | H | 5-OMe | H | NPr$_2$ | COOMe | CONH$_2$ |
| 7-Et | 8-Et | 5-OH | H | NMe$_2$ | COOEt | CONH$_2$ |
| 7-CF$_3$ | 8-CF$_3$ | 5-OMe | H | NMe$_2$ | COOMe | CONH$_2$ |
| 7-NH$_2$ | 8-Cl | 5-OMe | H | NMe$_2$ | COOBu | CONHMe |
| 7-NHMe | H | 5-OMe | Me | NMe$_2$ | COOEt | CONH-t-Bu |
| 7-OMe | H | 5-OMe | Me | morpholino | CN | CONH$_2$ |
| H | H | 5-OMe | H | NH$_2$ | COOMe | CONH$_2$ |
| 7-CF$_3$ | 8-Pr | 5-OPr | Me | thiomorpholino | CN | CN |
| H | 8-Cl | 5-OMe | Et | piperazino | COOMe | CONH$_2$ |
| 7-OMe | H | H | Et | NMe$_2$ | COOBu | CONHBu |
| 7-OCOEt | 8-Me | H | EtOCH(Me) | NH$_2$ | COOEt | CONHEt |
| 7-Me | 8-Me | 5-OH | H | NMe$_2$ | COOMe | CONH$_2$ |
| H | 8-Cl | 5-OMe | Pr | pyrryl | COOMe | CONH$_2$ |

Note: In the above preparations the reaction is conducted at a temperature 10° above the freezing point of the amine reactant if freezing occurs at Dry Ice/acetone bath temperatures.

In the above table Me=CH$_3$, Et=C$_2$H$_5$, Pr=C$_3$H$_7$, Bu=C$_4$H$_9$, Bz=CH$_2$C$_6$H$_5$. Upon hydrolysis the free acids are, of course, obtained.

EXAMPLE CVII

Ethyl 4 - oxo-5-methoxy-10-hydroxy-1,2,3,4-tetrahydroanthracene-2-($\alpha$-dimethylaminoacetonyl) - $\gamma$ - (N-t-butyl-carboxamide)-$\gamma$-carboxylate In still another modification, 1.035 g. of 4-oxo-5-methoxy-10-hydroxy - 1,2,3,4 - tetrahydroanthracene-2-($\alpha$-dimethylamino)acetic acid is suspended in 100 ml. of chloroform and 0.67 g. (0.93 ml., 2 equivalents+10% excess) of triethylamine added. To the resulting clear solution, cooled to 0° C., 0.81 g. (2 equivalents+10% excess) of distilled iso-propylchloroformate is added and the mixture stirred magnetically at 0° C. for 2 hours. The chloroform is then evaporated under reduced pressure, the temperature being kept near 0° C. during the evaporation. The yellow gum thus obtained crystallizes on standing and exhibits the expected anhydride absorption in the infrared.

To the crude anhydride is added 3.84 g. (5 eq.) of the magnesium salt of ethyl t-butylmalonamate (freshly prepared as described below), followed by 100 ml. of distilled acetonitrile. The solids rapidly dissolve and the solution is stirred at room temperature for 0.5 hr. The acetonitrile is then evaporated at room temperature under reduced pressure and the residual gum dissolved in 200 ml. of chloroform. The chloroform solution is extracted six times with 1.5 N hydrochloric acid, four times with water (acid-free), two times with saturated sodium chloride solution and dried over anhydrous sodium sulfate. Evaporation of the solvent yields the acylmalonamate as a yellow gum.

The magnesium salt of ethyl t-butylmalonamate

A mixture of 3.75 g. of the malonamate, 0.49 g. (1 eq.) of powdered magnesium, 365 ml. of absolute alcohol, and 0.15 ml. of carbon tetrachloride is stirred magnetically at room temperature. The vigorous reaction which occurs within a few minutes subsides in about 20 minutes. To the thick slurry 10 ml. of absolute ether is added and stirring continued at room temperature until all the magnesium is dissolved. The solution is filtered through SuperCel and the solvents evaporated under reduced pressure in the cold. The resulting foam is crushed and dried under high vacuum.

The following compounds of Formula XIX wherein $X_4CO$—NH (t-butyl) and $Y_4$=—COOEt are thus prepared.

| X | $X_1$ | $X_2$ | A | $NR_3R_4$ |
|---|---|---|---|---|
| H | 8-Cl | 5-OMe | Me | $Me_2N$ |
| H | 8-Cl | 5-OMe | Et | $Me_2N$ |
| H | 8-Cl | 5-OMe | Pr | $Me_2N$ |
| H | 8-Cl | 5-OBz | Me | $Me_2N$ |
| H | H | 5-OMe | Et | $Me_2N$ |
| H | 8-Cl | 5-OMe | $MeOCH_2$ | $Me_2N$ |
| H | 8-Cl | 5-OMe | Me | $Et_2N$ |
| H | 8-$NMe_2$ | 5-OMe | Me | BzNH |
| H | 8-NHCOMe | 5-OMe | H | $NMe_2$ |
| 7-OMe | H | H | Me | $Me_2N$ |
| 7-OMe | H | H | Pr | $Me_2N$ |
| 7-OBz | H | 5-OBz | Me | HNMe |
| 7-i-Pr | 8-Cl | 5-OH | Et | MeNH |
| 7-OMe | H | 5-OMe | Me | morpholino |
| 7-$CF_3$ | H | 5-OMe | H | $NPr_2$ |

EXAMPLE CVIII

Dl - 2 - decarboxamido-6-demethyl-12a-deoxy-5a,6-anhydrotetracycline-2-(N-t-butylcarboxamide)-10-methyl ether The sample of crude acylmalonamate obtained in Example CVI is dissolved in 50 ml. of dry dimethylformamide in a flask equipped with a magnetic stirrer, reflux condenser, and nitrogen inlet. To the yellow solution is added 1.0 g. of 35% sodium hydride in bayol (mineral oil). After the initial reaction subsides (6 min.), 5 drops of methanol is added and the flask plunged into a 148° C. oil bath. At ca. 82° C. a vigorous reaction begins as evidenced by the bubbling and the deepening color. After 6 min. in the bath, the temperature is 110° C., the solution an orange-red, and the bubbling somewhat decreases. At 119° C. (7 min. in bath), 0.20 g. of 53% sodium hydride is added. The rapid bubbling which occurs rapidly subsides and after 4 min. (121°) the mixture is cooled and poured with stirring into 15 ml. of acetic acid, affording an amber solution. The solvent is evaporated under reduced pressure, the residual dark gum is washed with hexanol to remove bayol, dissolved in n-butanol and extracted two times with water. The combined water extracts are then extracted once with butanol and the organic solutions combined. After two additional water extractions the butanol is evaporated under reduced pressure to a red gum having intense absorption above 400 mµ in the ultraviolet. The gum is taken up in 1:1 chloroform-carbon tetrachloride and chromatographed on silicic acid. Elution with chloroform yields a gum which crystallizes when triturated with methanol. Recrystallization from chloroform-methanol produces yellow-orange needles.

EXAMPLE CIX

Dl-6-demethyl-12a - deoxy-5a,6-anhydrotetracycline (removal of 10-methyl ether and N-t-butyl groups)

The 10-methyl ether of Example CVIII is transferred to a small flask and dissolved in 15 ml. of 48% HBr. Nitrogen is bubbled through the solution for 3 min. at room temperature and the mixture then heated on a steam bath for 15 min., nitrogen being bubbled through during this entire period. The solution is cooled and poured into 100 ml. of water, an orange precipitate being obtained. The entire mixture is transferred to a separatory funnel and washed three times with hexane to remove the bayol. The mixture is then neutralized to pH 4–5 with 10% sodium hydroxide. Some precipitate dissolves during the neutralization. The mixture is extracted 5 times with n-butanol and the combined organic layers extracted 3 times with small portions of water. Evaporation of the butanol under reduced pressure gives 0.72 g. of a partially crystalline dark gum. This gum is chromatographed on an acid-washed-SuperCel partition column (250 x 30 mm.) (see below), to give tetracyclic material as an orange foam. Trituration of this foam with methanol affords dl-6-demethyl-12a-deoxy-5a,6-anhydrotetracycline as small orange crystals.

*The SuperCel column.*—The phases are prepared by shaking together a mixture of chloroform, ethyl formate, formic acid, water, and ethanol in a ratio of 4–3–2–2.5–1. The upper layer is used as the stationary phase.

Acid-washed SuperCel is slurried in the stationary phase and the column packed under pressure. Excess stationary phase is drawn off and the crude material put onto the column with a small amount of stationary phase followed by the mobile phase. The 12a-deoxy-5a,6-anhydrotetracycline is followed by virtue of its dull orange fluorescence.

Alternatively, thin layer chromatography on silica gel with the system methanol-chloroform (1:1) is used.

EXAMPLE CX 6-demethyl-12a-deoxy-7-chloro-5a,6-anhydrotetracycline-10-methyl ether A solution of 4.94 g. of ethyl-4-oxo-5-methoxy-8-chloro-10 - hydroxy - 1,2,3,4 - tetrahydroanthracene - 2 - (α - dimethylaminoacetonyl)-γ-carboxamide-γ-carboxylate (the product of Example CV and 25 cc. of dry N,N-DMF is cautiously treated with 2.4 g. (0.10 mole) of sodium hydride as a 50% dispersion in mineral oil. When the exothermic reaction has subsided, 5-drops of methanol are added and the reaction mixture is heated on a steam bath until 5 minutes after hydrogen evolution ceases. (Alternatively, the reaction mixture is stirred at room temperature for 3 days.) 50 cc. of glacial acetic acid is then carefully added and the dimethylformamide is removed from the reaction mixture by evaporation at 1 mm. pressure (bath temperature 50–75°). The residue, taken up in methanol, is chromatographed on a carboxylic acid ion exchange resin. The fractions containing the product are readily distinguished from the starting materials by their strong fluorescence. The combined fluorescent fractions are stripped to dryness and the product crystallized from dimethylformamide-water.

The remaining products of Example CVI are respectively cyclized to the 5a,6-anhydro tetracycline type products of Formula XXI.

Following the same prodedure the corresponding tetrahydroanthracene - 2 - (α - dimethylaminoacetonyl) -γ,γ-dinitrile is converted to 2-decarboxamido-6-demethyl-12a-deoxy - 7 - chloro - 1 - imido - 5a,6-anhydrotetracycline-2-nitrile-10-methyl ether; the corresponding γ-nitrile-γ-carbethoxy compound is converted to 6-demethyl-12a-deoxy - 7 - chloro - 5a,6-anhydro-tetracycline-2-nitrile-10-methyl ether; the corresponding 5-benzyloxy-8-chloro compound is converted to 6-demethyl-12a-deoxy-7-chloro-5a,6-anhydrotetracycline 10-benzylether.

In the case of 12a-deoxytetracyclines bearing a nitrile group, the crude residue obtained from the glacial acetic acid acidified reaction mixture by removal of the solvent is crystallized directly from dimethylformamide-water or tetrahydrofuran-water. The product thus obtained is, if necessary, purified further by partition chromatography in the following manner.

Formic acid:chloroform:ethanol (2:2:1) are thoroughly mixed together then allowed to stand for two days. During this period, partial esterification occurs, and a two-phase system results. The phases are separated. The aqueous formic acid layer is used to wet powdered cellulose, the stationary phase of the chromatographic column.

The crude product is dissolved in the ethyl formate:chloroform:ethanol layer and put through the column. The 12a-deoxy nitrile band is recognized by its dull orange fluorescence in ultraviolet light. The product is recovered by evaporation of the solvent and crystallized from dimethylformamide-water or tetrahydrofuran-water.

Following the procedure of Example CIX the 10-ether groups are converted to hydroxyl groups. Ester, amide and nitrile groups present are also hydrolyzed to the corresponding acids.

EXAMPLE CXI

3' - carbethoxy - 6 - demethyl - 12a - deoxy-7-chloro-5a,6-anhydro - 2,3 - tetracycline - 4',5' - isoxazole-10-methyl ether 2 - [5' - (3',4'-dicarbethoxy-isoxazolyl) (N,N-dimethylamino)methyl] - 4 - oxo-5-methoxy-8-chloro-10-hydroxy-1,2,3,4-tetrahydroanthracene (prepared according to the procedure of Examples XCIV and CI) (500 mg.) dissolved in 5 ml. of dry redistilled dimethylformamide is treated with an excess (290 mg. of 50% dispersion in oil) of sodium hydride. Immediate vigorous effervescence of hydrogen occurs with formation of a red-brown solution of the sodium salt. The mixture is warmed on an oil bath to 92–100° C. for 3 minutes. The reaction is vigorous with evolution of hydrogen and formation of a light amber solution. When gas evolution ceases the mixture is sealed and stirred at room temperature for 2 hours during which time an amber solution with a green fluorescence develops and yellow crystals separate. The mixture is acidified with 5 ml. of acetic acid then evaporated to dryness in vacuo. The crude product is dissolved in chloroform, the chloroform solution washed twice with water then dried and evaporated to dryness. The crude cyclized product crystallizes and is dissolved in methanol. The methanol solution is extracted with hexane and the hexane extract back extracted with methanol. The combined methanol solutions are concentrated, diluted with ether and seeded. The product separates as red prisms and is removed by filtration. Evaporation of the filtrate gives additional product.

The remaining isoxazolyl tetrahydroanthracene esters of Example CI are cyclized to their corresponding 5a,6-anhydrotetracycline isoxazole derivatives in like manner. Those compounds in which $Y_2$ is cyano produce the corresponding 1-imidotetracycline which is converted to the keto compound by the method of Example CXXI.

EXAMPLE CXII

Fused isoxazoles

The isoxazolyl tetrahydroanthracene amide products of Example CI are converted to their tetracycline isoxazolyl derivatives by the procedure exemplified below using triethyloxonium fluoborate and sodium hydride.

The methanol solvate of 2-[5'-(3',4'-di(N-methylcarboxamido)(isoxazolyl) - N - methyl - amino)-methyl]-4-oxo - 5 - methoxy-8-chloro-10-hydroxy-1,2,3,4-tetrahydroanthracene hydrochloride (the product of Example XCIX and CI) (300 mg.) is suspended in chloroform ( 50 ml.). Triethyloxonium fluoborate (224 mg.) is added under dry nitrogen and the mixture refluxed overnight. A yellow crystalline solid having a very intense green-blue fluorescence separates from the hot mixture. Sodium hydride (5 milliequivalents) is added and the mixture refluxed an additional 30 minutes. After the initial reaction subsides more sodium hydride (5 meq.) followed by methanol is added. A vigorous reaction occurs and the yellow solid dissolved. A white solid then separates. This becomes brown accompanied by a vigorous evolution of gas. The reaction mixture is poured into acetic acid, diluted with water and extracted with chloroform. (A very strong odor of methyl isonitrile is noted at this point.) The chloroform extract is washed with water, dried and evaporated to dryness to give an amber solid. It is purified by thin layer chromatography using silica gel and ethylacetate. Crystallization from methanol gives yellow-orange needles of 3'-N-methylcarboxamido-4-(N-methyl-N-ethylamino)-6 - demethyl - 12a-deoxy-7-chloro-5a,6-anhydro-2,3-tetracyclino-4',5'-isoxazole-10-methyl ether.

Alternatively, substitution of other trialkyl-oxonium fluoborates for triethyloxonium fluorate produces the corresponding 4 - (N-alkyl-N-methylamino) compound. Trimethyl-, tri-n-butyl-, tripropyloxonium fluoborates produce the corresponding N,N-dimethyl-, N-methyl-N-butyl- and N-methyl-N-propyl-amino compounds.

In the case of compounds containing additional active hydrogen, one additional molar proportion of sodium hydride is added per mole of active hydrogen.

The following fused isoxazole compounds are thus produced.

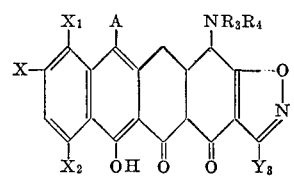

| X | X₁ | X₂ | A | Y₃ | NR₃R₄ |
|---|----|----|---|-----|-------|
| H | H | H | Me | CONMe₂ | NMe₂ |
| H | 8-NMe₂ | 5-OMe | Me | COOEt | HNBz |
| H | 8-NMCOMe | 5-OMe | H | COOEt | NMe₂ |
| N | 8-NHCOMe | 5-OMe | Me | COOPr | NMe₂ |
| H | 8-Cl | 5-OMe | Me | COOBz | N(CH₂) |
| 7-i-Pr | H | 5-OMe | Et | COOMe | (2-carbethoxy) pyrrolidino |
| H | H | 5-OCOEt | H | COOEt | HNCOMe |
| H | H | 5-OMe | H | COOMe | morpholino |
| 7-NHCOMe | H | 5-OMe | Me | COOEt | HNMe |
| 7-NHCOMe | H | 5-OMe | Me | CONHMe | HNMe |
| H | 8-CF₃ | H | Me | CONH₂ | NMe₂ |
| H | 8-CF₃ | H | Me | COOEt | NMe₂ |
| H | 8-Cl | 5-OMe | H | COO-i-amyl | NH₂ |
| H | 8-Cl | 5-OMe | H | CONMe₂ | NH₂ |
| 7-NEt₂ | H | 5-OMe | Et | COOMe | NEt₂ |
| 7-Me | H | 5-OMe | Me | COOPr | HNBu |
| 7-NMe₂ | H | 5-OMe | Me | COO-i-Pr | NMe₂ |
| H | 8-NH₂ | 5-OBz | H | COOBu | HNMe |
| H | 8-Pr | 5-OPr | H | COOEt | HNPr |
| 7-OEt | H | 5-OEt | MeOCH₂ | COOEt | NMe₂ |
| 7-CF₃ | H | 5-OMe | H | COOEt | thiomorpholino |
| H | 8-Cl | 5-OPr | H | COOEt | NMe₂ |
| H | 8-Cl | 5-OCOMe | H | COOEt | piperazino |

TABLE—Continued

| X | $X_1$ | $X_2$ | A | $Y_3$ | $NR_3R_4$ |
|---|---|---|---|---|---|
| H | 8-$CF_3$ | H | Me | CONHEt | $NMe_2$ |
| H | 8-$CF_3$ | 5-OMe | Me | CONHEt | $NMe_2$ |
| H | 8-$CF_3$ | H | H | CONHEt | pyrrolo |
| H | H | 5-OCOMe | H | COOMe | $NEt_2$ |
| H | H | 5-OMe | H | COOMe | $NH_2$ |
| 7-OCOMe | H | 5-OMe | H | COOEt | $NMe_2$ |
| 7-$NM_2$ | 8-Cl | 5-OMe | H | CN | $NPr_2$ |
| 7-$NMe_2$ | 8-Cl | 5-OH | H | COOEt | $HN(CH_2CH_2OMe)$ |
| H | H | 5-OMe | $MeOCH_2$ | COOEt | $NMe_2$ |
| H | H | 5-OMe | $MeOCH_2$ | CONHMe | $NMe_2$ |
| H | H | 5-OCOMe | Et | COOEt | $NMe_2$ |
| H | H | 5-OMe | Et | COOMe | $N(CH_2CH_2OEt)_2$ |
| H | H | 5-OCOBu | Me | COOMe | $NMe_2$ |
| H | H | 5-OCOBu | Me | CONHEt | $NMe_2$ |
| H | H | 5-OEt | Me | COOPr | HNMe |
| H | H | 5-OMe | Me | COO-i-Pr | $N(CH_2CH_2OMe)_2$ |
| H | 8-Cl | 5-OMe | H | CONHMe | HNMe |
| H | 8-Cl | 5-OBz | H | COOMe | $N(CH_2CH_2OPr)_2$ |
| H | 8-Et | 5-OMe | H | COOEt | $NH_2$ |
| 7-$CF_3$ | 8-$CF_3$ | 5-OMe | H | COOMe | $NMe_2$ |
| H | 8-$CF_3$ | H | Me | COOEt | pyrrolo |
| H | 8-Cl | 5-OH | MeOCH(Me) | COOMe | $NMe_2$ |
| 7-OMe | H | 5-OMe | Me | COOEt | $NMe_2$ |
| H | 8-NHCOMe | 5-OMe | H | CN | $MeNCH_2CH_2OMe$ |
| 7-Me | 8-Cl | 5-OH | $HOCH(C_5H_{11})$ | CONHMe | HNBu |

EXAMPLE CXIII $3^1$-carboxy-6-demethyl-12a-deoxy-7-chloro-5a,6-anhydro-2,3-tetracyclino-$4^1,5^1$-isoxazole-10-methyl ether

*Method A.*—$3^1$-carbethoxy - 6 - demethyl-12a-deoxy-7-chloro-5a,6-anhydro - 2,3 - tetracyclino-$4^1,5^1$-isoxazole-10-methyl ether, 2 g., is refluxed in 50 ml. of a 1:5:2 mixture of sulfuric acid:acetic acid:water for 9 hours. The mixture is then poured into 10 volumes of water, neutralized to Congo red and concentrated to dryness under reduced pressure. The product is extracted from the resulting salt mixture with boiling ethanol and recovered by concentrating the separated extract at reduced pressure until crystallization occurs.

*Method B.*—2 g. of the Method A ester starting compound is stirred for one hour at room temperature in 50 ml. of 1:3 by volume 48% HBr:acetic acid, and the mixture is then concentrated in vacuum to obtain the product in the form of a hydrobromide salt.

*Method C.*—The procedure of Method B is repeated but using a temperature of at least 70° C. Concomitant cleavage of the 10-methyl ether group occurs to give the phenol.

The remaining products of Example CXI and CXII are similarly hydrolyzed to give the corresponding free carboxy acids.

EXAMPLE CXIV 2-decarboxamido-6-demethyl-12a-deoxy-7-chloro-5a,6-anhydrotetracycline-2-nitrile-10-methyl ether

*Method A.*—One gram of $3^1$-carbethoxy-6-demethyl-12a-deoxy-7-chloro-5a,6-anhydro - 2,3 - tetracyclino-$4^1,5^1$-isoxazole-10-methyl ether (Example CXI) in 40 ml. of 50% ethanol containing 4 ml. of conc. $NH_4OH$ and 2 g. of copper powder is refluxed under nitrogen for 15 minutes. The resulting copper chelate precipitate is filtered and then dissolved in aqueous sulfuric acid. Extraction of the mixture with chloroform followed by water-washing, drying and concentration gives the product.

*Method B.*—A solution of 4.87 g. (0.01 mole) of $3^1$-(N-methylcarboxamido) - 6 - demethyl - 12a - deoxy-7-chloro - 5a,6 - anhydro-tetracyclino - $4^1,5^1$ - isoxazole-10-methyl ether together with 3.36 g. (0.06 mole) potassium hydroxide, 2.68 g. $ZnCl_2$ in methanol is heated under reflux for one hour. During this period the starting compound is hydrolyzed and the carboxylate anion loses carbon dioxide with concomitant cleavage of the isoxazole ring. The reaction mixture is then neutralized by addition of 1.8 g. (0.03 mole) of glacial acetic acid, and evaporated under reduced pressure. The residue is shaken with a mixture of chloroform and water, the chloroform layer is separated, and the water layer is exhaustively extracted with fresh chloroform. All chloroform extracts are combined, and dried over anhydrous sodium sulfate. After filtration, the chloroform is evaporated to obtain the desired product as residue. It is purified by recrystallization from hot aqueous methanol.

Any 1,2-tetracyclino isomer present in the starting compound is also converted to the desired product in the foregoing procedure.

*Method C.*—The $3^1$ - (N - methylcarboxamido)-6-demethyl-12a-deoxy-5a,6-anhydro - 2,3 - tetracyclino-$4^1,5^1$-isoxazole-10-methyl ether of Example CXII is dissolved in 5% ethanolic magnesium ethoxide containing 10% water, three molar equivalents of base being used. The mixture is warmed at 50° C. for one hour and is then carefully acidified and worked up as in Method A to give the corresponding tetracycline derivative.

*Method D.*—The analogous 7-chloro-10-benzyl ether and other derivatives are also prepared following the above procedures, substituting the corresponding fused isoxazoles of Example CXI for the above employed starting compounds.

*Method E.*—The product of Example CXI is dissolved in dimethoxyethane and treated with 3 equivalents of $LiN(CH_3)_2$ at 50° C. for one hour. The mixture is then worked according to Method C.

EXAMPLE CXV 4-oxo-5-methoxy-8-chloro-10-hydroxy-1,2,3,4-tetrahydroanthracene - 2 - [α-(N,N-dimethylamino)acetonyl - γ-nitrile]

This product is prepared from 2-[($5^1$-($3^1$-carbethoxy)-isoxazolyl)-(N,N-dimethylamino)methyl]-4-oxo - 5 - methoxy-8-chloro-10-hydroxy-1,2,3,4 - tetrahydroanthracene (prepared by the procedure of Example XCVI) by hydrolysis to the carboxylic acid and cleavage of the isoxazole ring by the methods of Example CXIV.

Application of this procedure to the remaining products of Example XCVI produces the corresponding derivatives of Formula XXII wherein $Y_2$ is hydrogen.

Alternatively, this product is prepared from 2-[5′-(3′-N - methylcarboxamido) - isoxazolyl) - (N,N - dimethylamino)methyl] - 4 - oxo - 5 - methoxy-8-chloro-10-hydroxy-1,2,3,4-tetrahydroanthracene by hydrolysis to the 3-carboxylic acid by the procedure of Example CXIII–A followed by cleavage of the isoxazole ring by the method of Example CXIV–A.

EXAMPLE CXVI

5 - oxo - 5 - methoxy-8-chloro-10-hydroxy-1,2,3,4-tetrahydroanthracene - 2 - [α-(N-formyl-N-methylamino) acetonyl-γ-N-methylcarboxamide-γ-nitrile]

The title product of Example XCVIII aromatized by the procedure of Example CI (2.0 g.) dissolved in 40 ml. of dry redistilled dimethylformamide is treated with an excess (360 mg. of 50% dispersion in oil) of sodium hydride. Immediate vigorous effervescence of hydrogen occurs with formation of a red-brown solution of the sodium salt. The mixture is stirred at 20° C. for 10 minutes then warmed on an oil bath to 90° C. for 25 minutes. The reaction is vigorous with evolution of hydrogen and formation of a light amber solution. When gas evolution ceases, the mixture is cooled, acidified with 2 N HCl and extracted with chloroform. The chloroform solution is evaporated and the residue chromatographed on acid washed Florisil. Elution of the column with 1% methanol in chloroform gives reactant. Elution with 5–10% methanol in chloroform produces the desired acyl malonate as an amorphous solid. It is obtained in crystal form by chromatography on silicic acid with the above solvents, followed by crystallization from ethylacetate/hexane.

A chloroform solution of the acyl malonate (500 mg.) when saturated with HCl, refluxed overnight then evaporated to dryness produces 2-(5′-(2′-amino-3′-N-methylcarboxamido - 4′-oxo) 1′-(N-methyl) Δ2′-pyrrolinyl-4-oxo - 5 - methoxy - 8-chloro-10-hydroxy-1,2,3,4-tetrahydroanthracene.

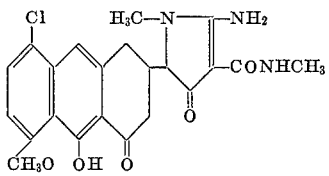

The residue is taken up in chloroform, the solution washed with water then chromatographed on acid washed Florisil. Elution with 5% methanol in chloroform gives a yellow gum which is obtained as crystals from ethylacetate.

The remaining isoxazolyl tetrahydroanthracene amides and esters of Examples XCVI, XCVIII, XCIX and C aromatized according to the procedure of Example CI are converted to their corresponding acylmalonate derivatives in like manner.

In the case of compounds containing additional active hydrogen, one additional molar proportion of sodium hydride is added per mole of active hydrogen.

Acyl malonate compounds of the following formula are thus produced.

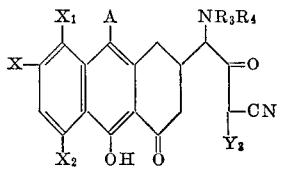

EXAMPLE CXVII

4 - oxo - 5 - methoxy-8-chloro-10-hydroxy-1,2,3,4-tetrahydroanthracene - 2-[α-(N,N-dimethylamino)acetonyl-γ-N-methylcarboxamide-γ-nitrile]

This product is prepared from the title product of Example XCVI (aromatized according to the procedure of Example CI–B) by the procedure of Example CXVI.

EXAMPLE CXVIII

4 - oxo - 5 - benzyloxy - 10-hydroxy-1,2,3,4-tetrahydroanthracene - 2 - α - (N,N-dimethylamine)-acetonyl-γ-nitrile-γ-N-methylcarboxamide This product is prepared from the corresponding aromatized (process of Example CI) product of Example XCVI by treatment with copper and ammonium hydroxide (Method A, Example CXIV).

EXAMPLE CXIX 2-decarboxamido-6-demethyl-12a-deoxy-7-chloro-5a,6-anhydrotetracycline-2-nitrile-10-methyl ether A solution of (0.01 mole) of 4-oxo-5-methoxy-8-chloro - 10 - hydroxy - 1,2,3,4-tetrahydroanthracene-2-(α-dimethylaminoacetonyl) - γ - carbomethoxy-γ-nitrile and 25 cc. of dry N,N-dimethylformamide is cautiously treated with (0.10 mole) and sodium hydride as a 50% dispersion in mineral oil. When the exothermic reaction has subsided, the reaction mixture is heated on a steam bath until 15 minutes after hydrogen evolution ceases. 50 cc. of glacial acetic acid is then carefully added and the dimethylformamide is removed from the reaction mixture by evaporation at 1 mm. pressure (bath temperature 50–75°). The residue is taken up in chloroform, the chloroform solution washed with water and brine. The organic soltuion is dried and evaporated under reduced pressure to give the desired product. Alternatively, the product is purified by chromatography on Florisil using chloroform as solvent and eluting therefrom with chloroform containing 2% methanol. The fractions containing the desired product are identified by their fluorescence.

Following the same procedure the corresponding tetrahydroanthracene-2-(α-dimethylaminoacetonyl) - γ,γ - dinitrile is converted to 2-decarboxamido-1-imido-6-demethyl-12a-deoxy - 7 - chlor-5a,6-anhydrotetracycline-2-nitrile-10-methyl ether; the corresponding γ-carboxamido, γ-carbethoxy compound is converted to 6-demethyl-12a-deoxy-7-chlor-5a,6-anhydrotetracycline-10-methyl ether; and the corresponding γ-cyano, γ-carbethoxy compound is converted to 2-decarboxamido-6-demethyl-12a-deoxy-7-chlor-5a,6-anhydrotetracycline-2-nitrile-10-methyl ether.

EXAMPLE CXX 3-hydroxy-4-oxo-5-methoxy - 8 - chloro - 10 - hydroxy-1,2,3,4-tetrahydroanthracene - 2 - [α - (N,N-dimethylamino)acetonyl-γ-nitrile]

This compound is prepared from the product of Example XCIV 2-[(5′-(3′,4′-di-(N-methylcarboxamido)-isoxazolyl)(N,N-dimethylamino)methyl] - 3 - hydroxy-4-oxo-5-methoxy-8-chloro-10-hydroxy - 1,2,3,4 - tetrahydroanthracene by the procedures of Examples CI and CXIV–A. The remaining products of Example XCIV and those of Examples XCI and XCII are similarly converted to their corresponding derivatives.

EXAMPLE CXXI 2-(decarboxamido)-6-demethyl-12a-deoxy-5a,6-anhydrotetracycline-2-nitrile-10-methyl ether A solution of 0.01 mole of 4-oxo-5-methoxy-10-hydroxy-1,2,3,4-tetrahydroanthracene - 2 - (α - dimethylaminoacetonyl)-γ-(N-methylcarboxamido)-γ-nitrile and 25 cc. of dry N,N-dimethylformamide is cautiously treated with 0.10 mole of sodium hydride as a 50% dispersion in mineral oil. When the exothermic reaction has subsided, the reaction mixture is heated on a steam bath until 15 minutes after hydrogen evolution ceases. 50 cc. of glacial acetic acid is then carefully added and the dimethylformamide is removed from the reaction mixture by evaporation at 1 mm. pressure (bath temperature 50–75°). The residue is extracted with hexane, then water. The product is purified by chromatography on acid washed Florisil using chloroform then chloroform-5% methanol as eluant. The deep green fluorescent material collected is the desired product.

Following the same procedure the corresponding acetonyl-γ-nitrile derivatives of Examples CXX are converted to the corresponding 1-imidotetracyclines and then to the corresponding tetracyclines by heating with two equivalents of magnesium chloride at 60° C. in aqueous solution for one hour. The mixture is then acidified to pH 4, extracted with n-butanol and the butanol solution evaporated to dryness to yield the product.

The tetrahydroanthracene reactants bearing a hydroxy group in the 3-position are first converted to their 3-formate or acetate derivatives prior to cyclization according to the procedures presented below. The resulting 12a-(O-acetate)tetracyclines are converted to the corresponding tetracyclines by mild hydrolysis with 1 N to 2 N NaOH at about 40° C. in the presence of a metal; e.g. zinc, which forms a chelate with the tetracycline (0.01 mole acetate, 0.02 mole zinc chloride in 200 ml. 2 N NaCH at 80° C. for 5–10 minutes). The metal is removed by treatment with hydrogen sulfide at pH 3.5 followed by filtration. The tetracycline product is recovered by extraction with n-butanol.

The 12a-(O-formates) are hydrolyzed under mild acid conditions (1–2 N HCl) at 40°–60° C. for 5–10 minutes and isolated as described above.

3-FORMATE DERIVATIVES

To a solution of the desired 3,10-dihydroxy-4-oxo-1,2,3,4-tetrahydroanthracene 2-[α-(amino)acetonyl-γ-nitrile] 0.05 mole) in pyridine (0.2 mole) at 0° C. there is added 0.1 mole acetoformic anhydride. The mixture is stirred for ½ hour then poured into chloroform. The resulting solution is washed with water followed by brine and dried over anhydrous sodium sulfate. The dried solution is treated with charcoal then evaporated to dryness several times with repeated addition of toluene to remove pyridine. The residue is taken up in chloroform, hydrogen chloride bubbled in and the solution concentrated. The residue is triturated with chloroform-ethylacetate to give the product.

3-ACETATE DERIVATIVES

To 0.05 equivalent of the appropriate 3,10-dihydroxy-4-oxo-1,2,3,4-tetrahydroanthracene 2[α-(amino)acetonyl-γ-nitrile] compound dissolved in 0.2 mole of anhydrous pyridine there is added 0.1 equivalent of acetic anhydride. The mixture is stirred for 15 minutes at 60°–100° C. then poured into an excess of ice water. The acetyl derivative is separated by filtration if solid, washed thoroughly with water and dried. When the product is not a solid, it is separated by chloroform extraction, the extract washed with water, dried and evaporated to dryness.

EXAMPLE CXXII

The procedure of Example CXXI is applied to the products of Examples CXV–CXXI (wherein $Y_2$ of formula XXIII is hydrogen) to produce the corresponding 1-imido-2-decarboxamido tetracyclines.

The 1-imido groups are converted to keto groups by the means of magnesium chloride in aqueous solution as described in Example CXXI.

EXAMPLE CXXIII 12a-deoxy-6-demethyl-5a,6-anhydrotetracycline-10-methyl ether (A) To a well-stirred mixture of 10 g. (0.025 mole) of 2-decarboxamido-12a-deoxy-6-demethyl-5a,6-anhydrotetracycline-2-nitrile-10-methyl ether in 100 ml. of glacial acetic acid is added 18 ml. of conc. $H_2SO_4$. After cooling the solution to 15° C., 9 g. (0.160 mole) of isobutylene is bubbled into the mixture. Constant agitation is maintained throughout this procedure and is continued for 16 hours after its completion, during which time the mixture is maintained at 5° C. The mixture is then extracted with petroleum ether. The acetic acid layer is then poured into one liter of ice-water and the solution then neutralized with dilute sodium hydroxide solution, extracted with three 250 ml. portions of chloroform, the combined extracts water-washed and dried over anhydrous sodium sulfate. The product, N-t-butyl-12a-deoxy-6-demethyl-5a,6-anhydrotetracycline-10-methyl ether is obtained crystalline by evaporation of the solvent.

The product (0.4 g.) is dissolved in 2 ml. of 85 percent sulfuric acid and the solution allowed to stand for one hour at room temperature, after which it is carefully diluted with 2 volumes of water, employing external cooling to control the exothermic reaction. Upon standing for an additional 16 hours, a crystalline precipitate forms and is collected. The product is a mixture of predominantly 6-demethyl - 12a - deoxy - 5a,6 - anhydrotetracycline-10-methyl ether together with a small amount of starting compound which is separated using chromatographic techniques.

(B) The 10-methyl ether is converted to 12a-deoxy-6-demethyl-5a,6-anhydrotetracycline as follows: 2 g. are heated at 100° C. in 50 ml. 48% HBr for 45 minutes. Concentration of the mixture yields the desired product as a hydrobromide, which may be converted to the amphoteric compound by treatment in aqueous solution with an equivalent proportion of sodium bicarbonate.

EXAMPLE CXXIV 12a-hydroxylation of 12a-deoxy-5a,6-anhydrotetracyclines

A solution of about 30 g. of the 12a-deoxy-5a,6-anhydrotetracycline in 350 ml. of methanol containing 26.6 grams of cerium chloride heptahydrate is treated by passing oxygen gas through the solution for 30 hours.

The product is isolated by passing the reaction mixture through a column consisting of two layers, the first, an anion exchange resin (an amine anion resin prepared by the method of the example of U.S. Pat. 2,630,429, which is converted to the acetate salt by treatment with aqueous acetic acid and subsequent water washing to remove excess acetic acid) and the second, a cation exchange resin (a carboxylic acid resin-H+ cycle, prepared by polymerizing methacrylic acid with 5% divinylbenzene in the presence of 1% benzoyl peroxide catalyst at 60° C. for 24 hours). The eluate from the column contains unreacted 12a-deoxy starting compound as acetate salt. Elution of the carboxylic acid resin with dilute hydrochloric acid followed by concentration of the eluate yields the tetracycline product as the hydrochloride salt.

EXAMPLE CXXV 6-demethyl-5a,6-anhydrotetracycline-10-methyl ether

This product is prepared from the corresponding 12a-deoxy compound of Example CXXIII by the 12a-hydroxylation procedure of the preceding example.

EXAMPLE CXXVI 6-demethyl-5a,6-anhydrotetracycline

To a well-stirred mixture of 10 g. (0.025 mole) of 6-demethyl-5a,6-anhydrotetracycline-2-nitrile in 100 ml. of glacial acetic acid is added 18 ml. of conc. $H_2SO_4$. After cooling the solution to 15° C., 9 g. (0.160 mole) of isobutylene is bubbled into the mixture. Constant agitation is maintained throughout this procedure and is continued for 16 hours after its completion, during which time the mixture is maintained at 5° C. The mixture is then extracted with petroleum ether. The acetic acid layer is then poured into one liter of ice-water and the solution then neutralized with dilute sodium hydroxide solution, extracted with three 250 ml. portions of chloroform and the combined extracts water-washed and dried over anhydrous sodium sulfate. The product, N-t-butyl-6-demethyl-5a,6-anhydrotetracycline is obtained by evaporation of the solvent.

The product (0.4 g) is dissolved in 2 ml. of 85 percent sulfuric acid and the solution allowed to stand for one hour at room temperature, after which it is carefully diluted with 2 volumes of water, employing external cooling to control the exothermic reaction. Upon standing for an additional 16 hours, a crystalline precipitate forms and is collected. The product is a mixture of predominantly 6-demethyl-5a,6-anhydrotetracycline together with a small amount of starting compound which is separated using chromatographic techniques.

EXAMPLE CXXVII 6-demethyl-7-chlor-5a,6-anhydrotetracycline (A) 6-demethyl-7-chlor-5a,6-anhydrotetracycline - 10-methyl ether, 2 g. is heated at 100° C. with 50 ml. 48% hydrobromic acid for 45 minutes. Concentration of the mixture yields the desired product in the form of the hydrobromide salt. It is converted to the amphoteric compound by treatment with an equivalent of sodium bicarbonate in aqueous solution.

(B) 6-demethyl-7-chlor-5a,6-anhydrotetracycline - 10-benzyl ether, 2 g., is dissolved in 150 ml. glacial acetic acid and hydrogenated at about 40 p.s.i. hydrogen pressure at room temperature in the presence of 2 g. 5% palladium on carbon catalyst until an equimolar proportion of hydrogen has been consumed. The mixture is then filtered and concentrated at reduced pressure to obtain the product as residue.

The racemic mixture obtained by the foregoing procedures are resolved as described in the preceding example.

EXAMPLE CXXVIII 6-demethyl-5a,6-anhydrotetracycline-10-methyl ether

6 - demethyl - 4 - amino-5a,6-anhydrotetracycline-10-methyl ether hydrochloride, 2 g., (prepared as described in Example CXXVI) is dissolved in 10 cc. of water containing 2 g. of sodium bicarbonate at 25–30° C. The solution is blanketed with nitrogen and 2.1 g. of dimethyl sulfate in 10 cc. of ethyl acetate is added over a period of three hours with good stirring. After an additional two hours stirring the solution is made acid to Congo red, concentrated under reduced pressure and the residue extracted with hot ethanol. Evaporation of the ethanol extract gives the desired product.

EXAMPLE CXXIX 4-desdimethylamino-4-N - methyl, N - (β-hydroxyethyl) amino-12a-deoxy - 6 - demethyl-7-chlor-5a,6-anhydrotetracycline This product is prepared from 4-desdimethylamino-4-N - methyl, N - (β-methoxyethyl)amino-12a-deoxy-6-demethyl-7-chlor-5a,6 - anhydrotetracycline-10-methyl ether by heating with 48% HBr or 50% HI (25 ml. per gram of the tetracycline) at 100° C. for 45 minutes, followed by concentration as in Example CXXVII. 4-desdimethylamino-4-N - methyl, N - (β-methoxyethyl)amino-6-demethyl-7-chlor - 5a,6-anhydrotetracycline-10-methyl ether is subjected to the same reaction to produce the 12a-hydroxy compound corresponding to the foregoing product.

EXAMPLE CXXX 6-demethyl - 12a-deoxy-7-chlor-5a,6-anhydroetracycline-10-methyl ether 2-decarboxamido - 6 - demethyl-12a-deoxy-7-chloro-1-imido-5a,6-anhydrotetracycline-2-nitrile-10-methyl ether (Example CX), 10 g., in 100 ml. glacial acetic acid is treated, with vigorous stirring, with 18 ml. concentrated sulfuric acid. The solution is cooled to 15° C. and 9 g. isobutylene is introduced. Stirring is continued for 16 hours at 5° C. and the mixture is then extracted with petroleum ether. The acetic acid layer is separated, poured into a liter of ice-water, and neutralized with dilute sodium hydroxide. This mixture is extracted three times with 250 ml. portions of chloroform, and the extracts are combined, water-washed, dried with sodium sulfate, and evaporated to dryness.

The residue is dissolved in 2 ml. 85 percent sulfuric acid and the solution is held at room temperature for one hour and then diluted with two volumes of water, with cooling. This solution is next heated to 60° C. for two hours and then permitted to stand for 16 hours while cooling to room temperature. The resulting crystalline precipitate is separated and dried.

EXAMPLE CXXXI 4-oxo-5,10-dimethoxy-8-chloro-9-methyl-1,2,3,4-tetrahydro-2-anthraldehyde (A) 2-chloroformyl-4-oxo-5,10-dimethoxy-8-chloro - 9-methyl-1,2,3,4-tetrahydroanthracene (prepared according to the procedure of Muxfeldt, Ber. 92, 3122–50) (0.01 mole) is dissolved in 100 ml. of dry xylene to which is added 0.5 g. of freshly prepared 5% palladium on barium sulfate catalyst and 0.1 ml. of quinoline sulfur regulator prepared as described in "Organic Reactions" (1948) volume 4, page 368. Additional 0.5 g. quantities of catalyst are added as needed to maintain a steady, rapid flow of hydrogen chloride throughout the course of the reaction. The mixture is then heated to 120–140° C. and hydrogen gas is passed through the solution employing a gas diffusion tube to insure intimate contact of the gas with the solution. The exit gases are absorbed in an accurately measured volume of standard aqueous sodium hydroxide solution. Aliquots of this standard solution are withdrawn and titrated during the course of the reaction. When approximately 90% of the calculated quantity of hydrogen chloride has been absorbed in the sodium hydroxide solution, further evolution of gas becomes very slow. The reaction mixture is now cooled to room temperature, filtered and the solvent distilled in vacuo leaving the desired aldehyde as residue.

(B) Alternatively, the reduction may be conducted as follows: 0.01 mole of lithium-tri-t-butoxyaluminohydride (prepared as described in J. Am. Chem. Soc. vol. 78, page 252, 1956) in 25 ml. tetrahydrofuran is added slowly to the acid chloride in 75 ml. tetrahydrofuran maintained at about −70° C. The reaction mixture is permitted to warm to room temperature and poured onto crushed ice. The mixture is extracted with chloroform, and the organic phase is separated and concentrated to obtain the product.

(C) The modified Rosenmund reduction procedure employing toluene as solvent and unpoisoned palladium on barium sulfate as catalyst described by Kende et al., J. Am. Chem. Soc. 83, 439 (1961) also produces the same product.

EXAMPLE CXXXII 4-oxo-5,10-dimethoxy-9-methyl-1,2,3,4-tetrahydro-2-anthraldehyde 2-chloroformyl-4-oxo-5,10-dimethoxy - 9 - methyl-1,2,3,4-tetrahydroanthracene (prepared according to Muxfeldt, Ber. 92, 3122–50, but with elimination of the chlorination step) is reduced according to the procedure of the preceding example, Part A.

Also, following the Muxfeldt procedure but using the appropriate succinic acid ester, and benzaldehyde or acetophenone derivatives or homolog thereof as reactant, with or without the chlorination step, the 1,2,3,4-tetrahydro-2-anthraldehydes listed below are prepared.

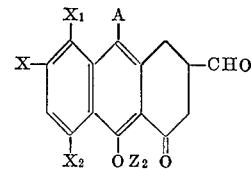

| X | X₁ | X₂ | A | Z₂ |
|---|---|---|---|---|
| H | H | H | Me | Me |
| H | 8-Et | 5-OMe | Me | Me |
| H | 8-NMe₂ | 5-OMe | Me | Bz |
| H | 8-NHMe | 5-OMe | Me | Bz |
| 7-i-Pr | H | 5-OH | Et | Et |
| 7-Et | 8-Et | 5-OH | i-Pr | Bz |
| H | H | 5-OH | Et | Pr |
| 7-Pr | H | 5-OMe | Et | Pr |
| 7-NEt₂ | H | 5-OMe | Et | Bz |
| 7-NMe₂ | H | 5-OMe | Me | Me |
| 7-Me | 8-Me | H | Bu | Me |
| H | 8-NHBu | 5-OBz | H | Me |
| 7-CF₃ | H | 5-OMe | Et | Pr |
| H | H | 5-OMe | Et | Pr |
| 7-OCOMe | H | 5-OMe | H | Me |
| 7-Me | 8-Me | 5-OH | H | Et |
| H | H | 5-OH | Me | Bz |
| 7-Me | H | 5-OH | Me | Me |
| H | H | 5-OMe | Me | Me |
| H | H | 5-OMe | Me | Bu |
| H | H | 5-OMe | Et | Bu |
| H | 8-CF₃ | H | Me | Me |
| 7-CF₃ | 8-CF₃ | 5-OMe | Me | Me |
| H | 8-CF₃ | 5-OMe | Me | Me |
| 7-Bu | H | 5-OMe | Me | Bu |
| 7-OMe | 8-CF₃ | 5-OEt | Me | Me |
| H | H | 5-OBz | Me | Me |

EXAMPLE CXXXIII 4-oxo-5,10-dihydroxy-8-chloro-9-methyl-1,2,3,4-tetrahydro-2-anthraldehydes The 5,10 - dimethoxy-tetrahydro-2-anthraldehyde compound of Example CXXXI (1 mM.) is mixed into a cold solution of 20 ml. acetic acid and 80 ml. concentrated hydrochloric acid and allowed to stand at room temperature for three hours under nitrogen. The solution, originally a red color, becomes yellow and the product crystallizes. The crystals are separated, taken up in chloroform and adsorbed on a column of acid silica gel. Upon washing with chloroform the weak yellow band which moves rapidly down the column is eluted and discharged. There follows a slow moving, narrow deep yellow band which is eluted with petroleum ether. Evaporation to dryness yields the product.

In like manner the ethers of Example CXXXII are converted to their respective hydroxy derivatives. Benzyl ethers can, of course, be debenzylated by catalytic hydrogenation according to well known procedures.

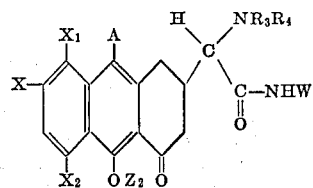

| X | $X_1$ | $X_2$ | A | $Z_2$ | $NR_3R_4$ | W |
|---|---|---|---|---|---|---|
| H | H | H | Me | Me | $NMe_2$ | $C_6H_{11}$ |
| H | 8-Et | 5-OMe | Me | Me | $NMe_2$ | $CH_3$ |
| H | 8-$NMe_2$ | 5-OMe | Me | Bz | $NMe_2$ | $C_2H_5$ |
| H | 8-NHMe | 5-OMe | Me | Bz | $NBu_2$ | $CH_3$ |
| 7-i-Pr | H | 5-OH | Et | Et | morpholino | p-toly |
| 7-Et | 8-Et | 5-OH | i-Pr | Bz | thiomorpholino | p-anisoxy |
| H | H | 5-OH | Et | Pr | $NMe_2$ | p-(Buo)$C_6H_4$ |
| 7-Pr | H | 5-OMe | Et | Pr | piperidino | $C_6H_{11}$ |
| 7-$NEt_2$ | H | 5-OMe | Et | Bz | $NBu_2$ | $C_6H_{11}$ |
| 7-$NMe_2$ | H | 5-OMe | Me | Me | $NMe_2$ | Bz |
| 7-Me | 8-Me | H | Bu | Me | MeNEt | $C_6H_{11}$ |
| H | 8-NHBu | 5-OBz | H | Me | $NMe_2$ | $C_6H_{11}$ |
| 7-$CF_3$ | H | 5-OMe | Et | Pr | $NEt_2$ | n-$C_3H_7$ |
| H | H | 5-OMe | Et | Pr | $NEt_2$ | o-$C_3H_7$ |
| 7-OCOMe | H | 5-OMe | H | Me | $NEt_2$ | Bz |
| 7-Me | 8-Me | 5-OH | H | Et | $N(CH_2CH_2OMe)_2$ | $C_6H_5$ |
| H | H | 5-OH | Me | Bz | $NMe_2$ | o-(Cl)$C_6H_4$ |
| 7-Me | H | 5-OH | Me | Me | $NMe_2$ | $C_2H_5$ |
| H | H | 5-OMe | Me | Me | $NMe_2$ | $C_6H_{11}$ |
| H | H | 5-OMe | Me | Bu | $NMe_2$ | Et |
| H | H | 5-OMe | Et | Bu | $NEt_2$ | Et |
| H | 8-$CF_3$ | H | Me | Me | $NMe_2$ | $C_2H_5$ |
| 7-$CF_3$ | 8-$CF_3$ | 5-OMe | Me | Me | $NMe_2$ | $C_2H_5$ |
| H | 8-$CF_3$ | 5-OMe | Me | Me | $NMe_2$ | $C_2H_5$ |
| 7-Bu | H | 5-OMe | Me | Bu | pyrrolo | $C_6H_{11}$ |
| 7-OMe | 8-$CF_3$ | 5-OEt | Me | Me | $NMe_2$ | $C_2H_5$ |
| H | H | 5-OBz | Me | Me | $NPr_2$ | $C_6H_{11}$ |

EXAMPLE CXXXIV

4 - oxo - 5,10 - dimethoxy - 8 - chloro - 9 - methyl-1,2,3,4-tetrahydroanthracene-2-($\alpha$ - dimethylamino - N - cyclohexylacetamide)

(A) A solution of 0.01 mole of 4-oxo-5,10-dimethoxy-8-chloro-9-methyl-1,2,3,4-tetrahydro - 2 - anthraldehyde (Example CXXXI), 0.02 mole of dimethylammonium acetate, 2.0 cc. of water, and 20 cc. of 1,2-dimethoxyethane is cooled to 0° in an ice bath. Cyclohexyl-iso-nitrile (1.09 g., 0.01 mole) is added in one portion. The reaction mixture is stirred and allowed to warm to room temperature, and the volatile components are removed by means of a rotary evaporator operating in a water bath maintained at 40–70°. The residue is taken up in water, adjusted to pH 7.5 and extracted three times with 25 cc. portions of chloroform. The three combined extracts are dried with anhydrous sodium sulfate, filtered, and evaporated to obtain the desired product as residue. It is further purified by recrystallization from a hot solution of ethyl acetate and hexane.

(B) In the same way the corresponding $\alpha$-dimethylamino-N-t-butylacetamide and N - methylacetamide are prepared by substituting the appropriate isonitrile for cyclohexyl-isonitrile.

EXAMPLE CXXXV

Following the procedure of Example CXXXIV the following tetrahydroanthracene-2-($\alpha$-amino acetic acid amides) are prepared using the appropriate reactants.

EXAMPLE CXXXVI

4 - oxo - 5,10 - dimethoxy - 9 - methyl - 1,2,3,4-tetrahydroanthracene - 2 - [($\alpha$ - methyl - acetylamino)-N - cyclohexylacetamide]

To a solution of 0.01 mole of 4-oxo-5,10-dimethoxy-9-methyl - 1,2,3,4 - tetrahydro - 2 - anthraldehyde (Example CXXXII, 0.01 mole of methylammonium acetate in 20 cc. of diethyleneglycol dimethyl ether at 0° C. is added 1.09 g. (0.01 mole) of cyclohexyl isonitrile in one portion. The reaction mixture is stirred and allowed to warm to room temperature. The volatile components are removed in vacuo at 40°–70° C. The residue is taken up in water, adjusted to pH 7.5 and extracted with three 25 cc. portions of chloroform. The combined extracts are dried with anhydrous sodium sulfate, filtered and evaporated to dryness. The residue is purified by recrystallization from hot ethyl acetate-hexane solution.

Application of this procedure to the products of Example CXXXIII produces the corresponding amides.

EXAMPLE CXXXVII

4 - oxo - 5,10 - dimethoxy - 9 - methyl - 1,2,3,4-tetrahydroanthracene - 2 - ($\alpha$ - dimethylamino-N,N-dimethyl - N - cyclohexylacetamidine)

(A) Cyclohexyl isonitrile (1.01 mole) is added in one portion to a solution of (0.01 mole) of 4-oxo-5,10-dimethoxy - 9 - methyl - 1,2,3,4 - tetrahydro - 2 - anthraldehyde, (0.01 mole) of dimethylammonium acetate and 0.45 g. (0.01 mole) dimethylamine in 2.0 cc. water and 20 cc. of 1,2 - dimethoxyethane at 25° C. The mixture is thoroughly stirred then allowed to stand for 4 hours. The mixture is worked up according to the procedure of Example CXXXIV to give the amidine product.

(B) In the same way, the corresponding 2-($\alpha$-dibenzylamino-N,N-dibenzyl-N'-methyl acetamidine); the 2-($\alpha$-di - n - butylamino - N, N - dibutyl-N'phenylacetamidine); the 2 - ($\alpha$ - piperidyl - N,N-pentamethylene-N'-cyclohexylacetamidine; and the 2 - ($\alpha$ - di - ($\beta$ - methoxyethyl)-N,N-di - $\beta$ - methoxyethyl) - N' - o - tolylacetamidine) are prepared by substituting the appropriate secondary amine, secondary amine acetate salt and isonitrile in the above procedure.

EXAMPLE CXXXVIII

4 - oxo - 5 - benzyloxy - 9 - methyl - 10 - hydroxy - 1, 2,3,4 - tetrahydroanthracene - 2 - (α-di-propylamino- N, N - di - propyl - N' - cyclohexylacetamidine)

To a solution of 0.01 mole of 4-oxo-5-benzyloxy-9-methyl - 1,2,3,4 - tetrahydro-2-anthraldehyde, 1.01 g. (0.01 mole) of di-propylamine and 1.38 g. (0.01 mole) of di-propylammonium chloride in 2.0 cc. water and 20 cc. of methanol at room temperature there is added 1.09 g. (0.01 mole) of cyclohexylisonitrile. The mixture is stirred thoroughly then allowed to stand at room temperature for five hours. The title amidine product is isolated by the procedure of Example CXXXIV.

EXAMPLE CXXXIX

4 - oxo 5,10 - dimethoxy - 8 - chloro - 9 - methyl- 1,2,3,4 - tetrahydroanthracene - 2 - (α - dimethylamino) - acetic acid A solution of 0.01 mole of 4 - oxo - 5, 10 - dimethoxy- 8-chloro-9-methyl - 1,2,3,4 - tetrahydroanthracene - 2- (α - dimethylamino - N - cyclohexylacetamide), the product of Example CXXXIV, and 100 cc. of concentrated hydrochloric acid is heated under reflux for two hours. The reaction mixture is cooled in an ice bath, and is then diluted with 100 cc. of water. Concentrated aqueous ammonia (sp. gr. .90) is cautiously added until a nearly neutral solution is obtained. The resultant precipitate of the desired product is filtered and washed with water to remove inorganic salts and cyclohexylamine. The product is then recrystallized from methanol.

The remaining N-substituted acetamides of Example CXXXIV and those of Examples CXXXV and CXXXVI are converted to their respective amino acids by this procedure.

In like manner, hydrolysis of the amidine compounds of Examples CXXXVII and CXXXVIII produces the respective amino acids.

Alternatively, the amides are hydrolyzed by heating with 5% NaOH in the presence of zinc dust for 6 hours. The hydrolyzate is acidified with acetic acid and the product isolated by the procedure of Example LXXVII.

EXAMPLE CXL

Ethyl - 4 - oxo - 5,10 - dimethoxy - 8 - chloro - 9 - methyl- 1,2,3,4 - tetrahydroanthracene - 2 - (α - dimethylaminoacetonyl) - γ - (N - t - butyl carboxamide) - γ - carboxylate The product of Example CXXXIX is converted to 4-oxo - 5,10 - dimethoxy - 8 - chloro - 9 - methyl - 1,2,3,4-tetrahydroanthracene - 2 - (α - dimethylaminoacetonyl)-γ-(N-t-butylcarboxamide)-γ-carboxylate by the procedure of Example CVII.

In like manner the products of Examples CXXXVII and CXXXVIII are converted to their corresponding acylmalonamates.

EXAMPLE CXLI

The procedure of Example CIV is applied to the products of Example CXXXIX to give mixed anhydrides with the lower(alkyl)carbonates: ethyl-, isopropyl-, butyl-, isobutyl- and neopentyl chloroformate.

EXAMPLE CXLII

Application of the procedure of Example CV–B to the mixed anhydrides of Example CLXI produces the malonic acid derivatives of Formula XIX. In this manner the following malonic acid derivatives are prepared from the appropriate magnesio malonic acid derivative

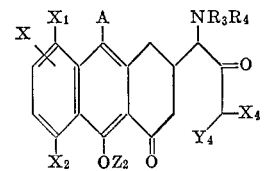

| X | $X_1$ | $X_2$ | A | $Z_2$ | $NR_3R_4$ | $Y_4$ | $X_4$ |
|---|---|---|---|---|---|---|---|
| H | H | H | Me | Me | $NMe_2$ | H | $CONH_2$ |
| H | 8-et | 5-OMe | Me | Me | $NMe_2$ | CN | CONH(t-Bu) |
| H | 8-$NMe_2$ | 5-OMe | Me | Bz | $NMe_2$ | COOMe | CN |
| H | 8-NHMe | 5-OMe | Me | Bz | $NBu_2$ | COOMe | $CONH_2$ |
| 7-i-Pr | H | 5-OH | Et | Et | morpholino | COOEt | CONHBu |
| 7-Et | 8-Et | 5-OH | i-Pr | Bz | thiomorpholino | COOEt | CONHMe |
| H | H | 5-OH | Et | Pr | $NMe_2$ | COOEt | CONH(t-Bu) |
| 7-Pr | H | H | Et | Pr | piperidino | CN | CN |
| 7-$NEt_2$ | H | 5-OMe | Et | Bz | $NBu_2$ | COOBu | CN |
| 7-$NMe_2$ | H | 5-OMe | Me | Me | $NMe_2$ | COOBu | CN |
| 7-Me | 8-Me | H | Bu | Me | MeNEt | CN | CONHPr |
| 8-NHBu | H | 5-OBz | H | Me | $NMe_2$ | CN | $CONH_2$ |
| 7-$CF_3$ | H | 5-OMe | Et | Pr | $NEt_2$ | COOMe | $CONH_2$ |
| H | H | 5-OMe | Et | Pr | $NEt_2$ | COOMe | CN |
| 7-OCOMe | H | 5-OMe | H | Me | $NEt_2$ | CN | $CONH_2$ |
| 7-Me | 8-Me | 5-OH | H | Et | $N(CH_2CH_2OMe)$ | COOMe | CONHEt |
| H | H | 5-OH | Me | Bz | $NMe_2$ | CN | $CONH_2$ |
| 7-Me | H | 5-OH | Me | Me | $NMe_2$ | CN | $CONH_2$ |
| H | H | 5-OMe | Me | Me | $NMe_2$ | COOMe | CONH(t-Bu) |
| H | H | 5-OMe | Me | Bu | $NMe_2$ | COOMe | CONH(t-Bu) |
| H | H | 5-OMe | Et | Bu | $NEt_2$ | COOMe | CN |
| H | 8-$CF_3$ | H | Me | Me | $NMe_2$ | COOMe | $CONH_2$ |
| 7-$CF_3$ | 8-$CF_3$ | 5-OMe | Me | Me | $NMe_2$ | COOMe | $CONH_2$ |
| H | 8-$CF_3$ | 5-OMe | Me | Me | $NMe_2$ | COOMe | $CONH_2$ |
| 7-Bu | H | 5-OMe | Me | Bu | pyrrolo | CN | CONH(t-Bu) |
| 7-OMe | 8-$CF_3$ | 5-OEt | Me | Me | $NMe_2$ | COOMe | $CONH_2$ |

EXAMPLE CXLIII 7-chloro-12a-deoxy-5a,6-anhydrotetracycline

The crude acylmalonamate of Example CXL is cyclized to dl-2-decarboxamido-7-chloro-12a-deoxy-5a,6-anhydrotetracycline - 2 - (N-t-butylcarboxamide)-10,11-dimethyl ether by the procedure of Example CVIII.

The ether and N-t-butyl groups are then removed by the procedure of Example CIX to give the title compound.

Following this procedure, the corresponding methyl-4-oxo - 5,10 - dimethoxy - 9 - methyl - 1,2,3,4 - tetrahydroanthracene - 2 - (α - dimethylaminoacetonyl) - γ - (N - t-butylcarboxamide)-γ-carboxylate and the methyl-4-oxo-5,10 - benzyloxy - 9 - methyl - 10 - methoxy - 1,2,3,4-tetrahydroanthracene - 2 - (α - dipropylaminoacetonyl)-γ - (N - t - butylcarboxamide)-γ-carboxylate of Example CXL, are transformed to dl-12a-deoxy-5a,6-anhydrotetracycline and 4 - desdimethylamino-4-N,N-dipropylamino-12a-deoxy-5a,6-anhydrotetracycline, respectively.

EXAMPLE CXLIV

The malonic acid compounds of Example CXLII are cyclized to their respective 5a,6-anhydrotetracyclines by the procedure of Example CVIII. Those products bearing ether and N-t-butylcarboxamido groups are then hydrolyzed to their corresponding hydroxy and carboxamido derivatives by the procedure of Example CIX.

EXAMPLE CXLV

The products of Example CXLIII are hydroxylated at the 12a-position by the procedure of Example CXXIV to give:

7-chloro-5a,6-anhydrotetracycline
5a,6-anhydrotetracycline
4-desdimethylamino-4-N,N-dipropylamino-5a,6-anhydrotetracycline.

In the same manner the anhydrotetracyclines of Example CXLIV are hydroxylated at C.12a to give the corresponding tetracyclines.

EXAMPLE CXLVI

Tetracycline

A solution of 150 mg. 7-chloro-5a-6-anhydrotetracycline (Example CXLV) in 150 ml. benzene is placed in the jacket of a double-walled Pyrex cylinder, and a 100 watt mercury arc lamp is mounted in the center of the cylinder. Air is bubbled through the solution at a rate of about 300 ml. per minute while irradiating for 6 days. At the end of this period, the solution is evaporated and the residue, which contains 7-chloro-6-deoxy-6-hydroperoxy dehydrotetracycline, taken up in methanol and treated with hydrogen gas at one atmosphere in the presence of palladium for one hour. The solution is filtered and the filtrate is subjected to paper chromatography. A bioactive tetracycline spot is found, demonstrating that under the hydrogenation conditions employed the 5,5a-unsaturation as well as the 7-chloro group of the first produced 7-chloro dehydrotetracycline are also reduced.

Following this procdure, the remaining products of Example CXLV are transformed to tetracycline and 4-desdimethylamino - 4 - N,N-dipropylamino-tetracycline, respectively.

EXAMPLE CXLVII

7-chloro-5,5a-dehydro tetracycline

A solution of 2.97 g. 7-chloro-5a,6-anhydrotetracycline (Example CXLV) and 25 mg. 3,4-benzpyrene in 1200 ml. benzene is transferred to a vertical cylinder about 100 mm. in diameter closed near the lower end by a fritted glass disc to act as a sparger for oxygen introduced through a stopcock at the bottom. Into the solution is inserted a double-walled quartz Hanovia immersion well connected for circulation of cooling water between the walls; and a 450 watt Hanovia ultraviolet lamp with Pyrex glass sleeve is mounted inside the well. Oxygen is introduced through the stopcock at the rate of about 350 ml. per minute while irradiating the solution and circulating cooling water through the well jacket to maintain the reaction mixture at about 20–30° C. Crystallization is noted in the reaction mixture after about 40 minutes, and is substantially complete in about 3 hours. Oxygenation and irradiation are continued for a total of 5 hours, after which an 80% yield of 7-chloro-6-deoxy-6-hydroperoxy - 5,5a - dehydrotetracycline is recovered by filtration. Another 3% is recovered by evaporation of the filtrate.

0.1 gram of the 7-chloro-6-deoxy-6-hydroperoxy-5,5a-dehydrotetracycline is dissolved in 10 ml. methanol and the solution is shaken with 0.02 gram 10% rhodium on charcoal under one atmosphere hydrogen pressure until one molar proportion of hydrogen has been absorbed. The hydrogen is then removed under vacuum and, after filtration, the solvent is evaporated under vacuum to obtain a quantitative yield of 7-chloro-5,5a-dehydrotetracycline in the form of a yellow crystalline compound. The infrared and ultraviolet spectra are found to be identical with known 7-chloro-dehydrotetracycline. $[\alpha]_d$ in chloroform=+210°.

The remaining anhydrotetracyclines of Example CXLV are converted to the corresponding 5,5a-dehydrotetracyclines in like manner.

EXAMPLE CXLVIII

6-demethyl-5,5a-dehydrotetracycline

One gram of 6-demethyl-5a,6-anhydrotetracycline (Example CXXVI) is dissolved in 700 ml. benzene and irradiated at 25° C. in a Pyrex glass vessel with light from a fluorescent lamp for 6 days. During this period oxygen is bubbled through the solution at the rate of 200 ml. per minute.

At the end of the reaction period the yellow crystalline-6-demethyl-6-deoxy-6-hydroperoxy - 5,5a - dehydrotetracycline which deposits on the wall is separated and crystallized from chloroform.

0.1 g. of the hydroperoxide is then reduced to 6-demethyl-5,5a-dehydrocycline by the procedure of Example CXLVII.

Following this procedure the products of Examples CXXVII–CXXVIII and the 12a-hydroxylated products of Example CXXIX are converted to their respective dehydrotetracyclines.

In the case of 5a,6-anhydrotetracyclines bearing D-ring halo substituents and/or a benzyl ether group, reduction is halted when somewhat less than the calculated amount of hydrogen has been consumed. Alternatively, reduction is accomplished with an aqueous solution of an alkali metal sulfite or hydrosulfite.

EXAMPLE CXLIX

The 5a,6-anhydrotetracyclines of Example CXLV are microbiologically transformed to the corresponding 5,5a-dehydrotetracyclines by the procedure of U.S. 2,952,587.

EXAMPLE CL

The 5a,5-dehydrotetracyclines of Examples CXLVII–CXLIX converted to the corresponding tetracyclines by the procedures in the literature: U.S. 2,965,546 (microbiological reduction), and U.S. 3,005,023 (catalytic reduction).

What is claimed is:
1. A compound selected from the group consisting of those having the formula:

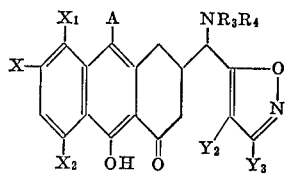

wherein X is selected from the group consisting of hydrogen, hydroxy, trifluoromethyl, amino, mono- and di-lower alkylamino, alkanoylamino containing 2 to 4 carbon atoms, lower alkyl, alkanoyloxy containing 2 to 4 carbon atoms; and OR wherein R is selected from the group consisting of lower alkyl and benzyl;

$X_1$ is selected from the group consisting of hydrogen, chloro, lower alkyl and trifluoromethyl;

$X_2$ is selected from the group consisting of hydrogen, hydroxy, and OR wherein R is as previously defined;

A is selected from the group consisting of hydrogen, lower alkyl, and $B_2OCH(B_3)$—wherein $B_2$ is lower alkyl, and $B_3$ is selected from the group consisting of hydrogen and lower alkyl;

$Y_2$ is selected from the group consisting of cyano, carbobenzoxy, lower carbalkoxy, $CONH_2$, $CONH(CH_3)$ $CONH(C_2H_5)$;

$Y_3$ is selected from the group consisting of lower carbalkoxy, cyano, carbobenzoxy, carboxy, $CONH_2$, $CONH(CH_3)$, $CONH(C_2H_5)$ and $CON(CH_3)_2$;

$R_3$ and $R_4$ when taken separately are each selected from the group consisting of hydrogen, alkanoyl containing 1 to 4 carbon atoms, and $CH_2B_1$ wherein $B_1$ is selected from the group consisting of hydrogen, lower alkyl, and mono-substituted lower alkyl, said substituent being selected from the group consisting of hydroxy and lower alkoxy;

$R_3$ and $R_4$ when taken together with the nitrogen atom to which they are attached form a nitrogen heterocyclic ring selected from the group consisting of piperazino, piperidino, morpholino, pyrrolo, thiomorpholino, pyrrolidino and 2-(lower carbalkoxy) pyrrolidino;

Provided that only one of said $R_3$ and $R_4$ substituents is elected from the group consisting of alkanoyl containing 1 to 4 carbon atoms.

2. The compound according to claim 1 wherein X is hydrogen, $X_1$ is trifluoromethyl, $X_2$ is lower alkoxy, $Y_2$ and $Y_3$ are lower carbalkoxy and A, $R_3$ and $R_4$ are lower alkyl.

3. The compound according to claim 1 wherein X is hydrogen, $X_1$ is trifluoromethyl, $X_2$ is methoxy, $Y_2$ and $Y_3$ are carbopropoxy, and A, $R_3$ and $R_4$ are methyl.

4. The compound according to claim 1 wherein $X_1$ is hydrogen, X is diloweralkylamino, $X_2$ is lower alkoxy, $Y_2$ and $Y_3$ are lower carbalkoxy, and A, $R_3$ and $R_4$ are lower alkyl.

5. The compound according to claim 1 wherein $X_1$ is hydrogen, X is dimethylamino, $X_2$ is methoxy, $Y_2$ and $Y_3$ are carboisopropoxy, and A, $R_3$ and $R_4$ are methyl.

6. The compound according to claim 1 wherein X and $X_1$ are hydrogen, $X_2$ is lower alkoxy, A is lower alkoxyloweralkyl, $Y_2$ and $Y_3$ are —$CONH(CH_3)$ and $R_3$ and $R_4$ are lower alkyl.

7. The compound according to claim 1 wherein X and $X_1$ are hydrogen, $X_2$ is methoxy, A is methoxymethyl, $Y_2$ and $Y_3$ are —$CONHCH_3$, and $R_3$ and $R_4$ are methyl.

8. The compound according to claim 1 wherein $X_1$ is hydrogen, X and $X_2$ are lower alkoxy, $Y_2$ and $Y_3$ are lower carbalkoxy and A, $R_3$ and $R_4$ are lower alkyl.

9. The compound according to claim 1 wherein $X_1$ is hydrogen, X and $X_2$ are methoxy, $Y_2$ and $Y_3$ are carbethoxy, and A, $R_3$ and $R_4$ are methyl.

References Cited

Conover et al., J. Am. Chem. Soc. (1962) vol. 84, p. 3222–4.

ALEX MAZEL, Primary Examiner

B. I. DENTZ, Assistant Examiner

U.S. Cl. X.R.

260—243, 247.2, 247.5, 268, 294, 294.3, 294.7, 559, 999

PO-1050
(5/69)

UNITED STATES PATENT OFFICE
CERTIFICATE OF CORRECTION

Patent No. 3,524,862   Dated August 18, 1970

Inventor(s) Lloyd H. Conover

It is certified that error appears in the above-identified patent and that said Letters Patent are hereby corrected as shown below:

Col. 2, lines 27-34, that portion of the formula reading

" 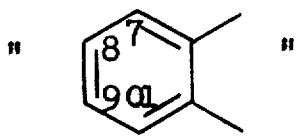 "   should read   -- 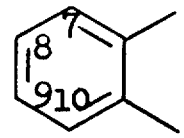 --;

line 37, "trioxo-2,3,4-" should read -- trioxo-1,2,3,4- --.
Col. 5, that portion of the first formula reading " 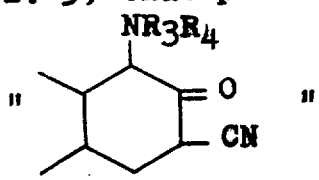 "   should read -- 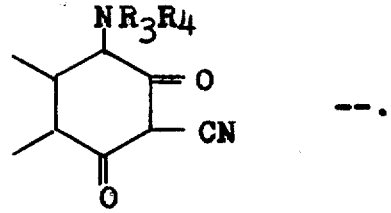 --.

Col. 13, line 32, insert -- with -- after "irradiating".
Col. 22, lines 34-42, that portion of the first formula reading " 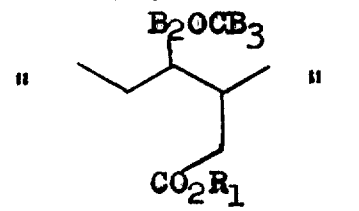 "   should read -- 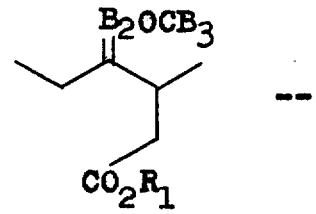 --.

Col. 28, line 48, "tetralic" should read -- tetralone --.
Col. 38, lines 53-55, "N" should read -- H --.
Col. 42, lines 26-43, all values under "D" should be disregarded.
Col. 46, line 70, "benzoyl" should read -- benzyl --.
Col. 57, line 53, "7-OM" should read -- 7-OMe --.

Col. 61, line 66, "1912" should read -- 19.12 --;
        line 66, "252" should read -- 2.52 --.

Col. 72, line 45, "NBuz" should read -- $NBu_2$ --.
Col. 74, lines 53-60, that portion of the formula reading

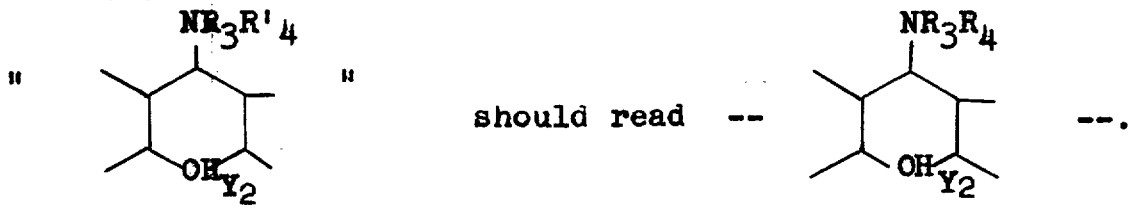

Col. 75, line 27, "MeOCH$_2$O" should read -- $MeOCH_2$ --.
Col. 80, line 11, "5-methoxychloro" should read -- 5-methoxy-8-chloro--.
Col. 83, line 29, "X$_4$CO-NH" should read -- $X_4$ = CO-NH --.
Col. 85, line 62, "N" should read -- H --.
Col. 87, line 8, "7-NM$_2$" should read -- $7-NMe_2$ --.
Col. 91, line 1, "NaCH" should read -- NaOH --.
Col. 98, line 42, "N(CH$_2$CH$_2$OMe)" should read -- $N(CH_2CH_2OMe)_2$ --.

SIGNED AND SEALED
MAR 16 1971

(SEAL)
Attest:

Edward M. Fletcher, Jr.
Attesting Officer

WILLIAM E. SCHUYLER, JR.
Commissioner of Patents

UNITED STATES PATENT OFFICE
CERTIFICATE OF CORRECTION

Patent No. 3,524,862      Dated August 18, 1970

Inventor(s) Lloyd H. Conover

It is certified that error appears in the above-identified patent and that said Letters Patent are hereby corrected as shown below:

Column 59, line 18, "McNCH$_2$CH$_2$OMe" should read -- MeNCH$_2$CH$_2$Ome --.

Signed and sealed this 20th day of July 1971.

(SEAL)
Attest:

EDWARD M. FLETCHER, JR.
Attesting Officer

WILLIAM E. SCHUYLER, JR.
Commissioner of Patents